Nov. 4, 1952 — G. T. RANDOL — 2,616,535
AUTOMOTIVE VARIABLE-DRIVE POWER TRANSMISSION
Filed June 7, 1944 — 21 Sheets-Sheet 1
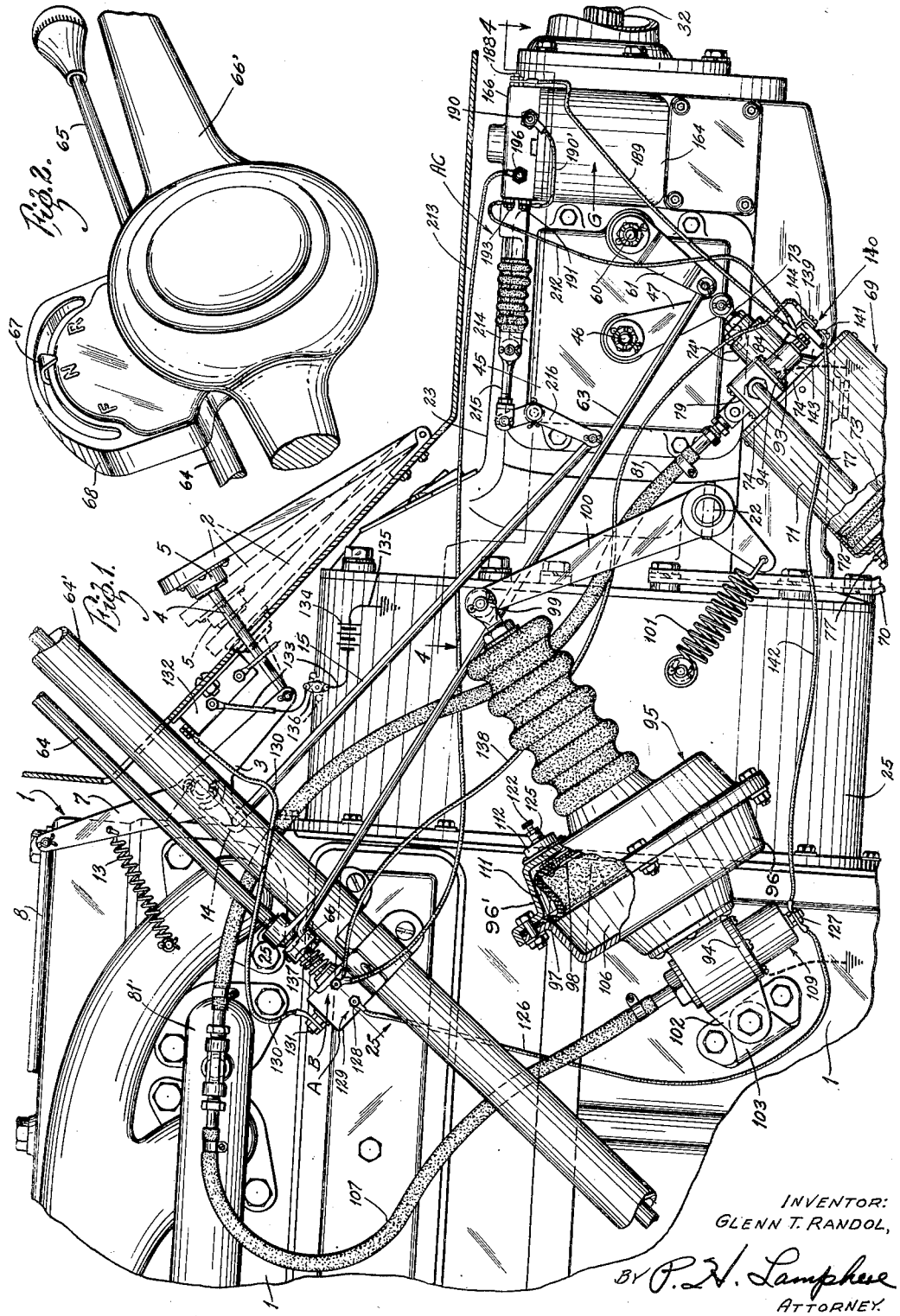
INVENTOR:
GLENN T. RANDOL,
BY P. H. Lamphere
ATTORNEY.

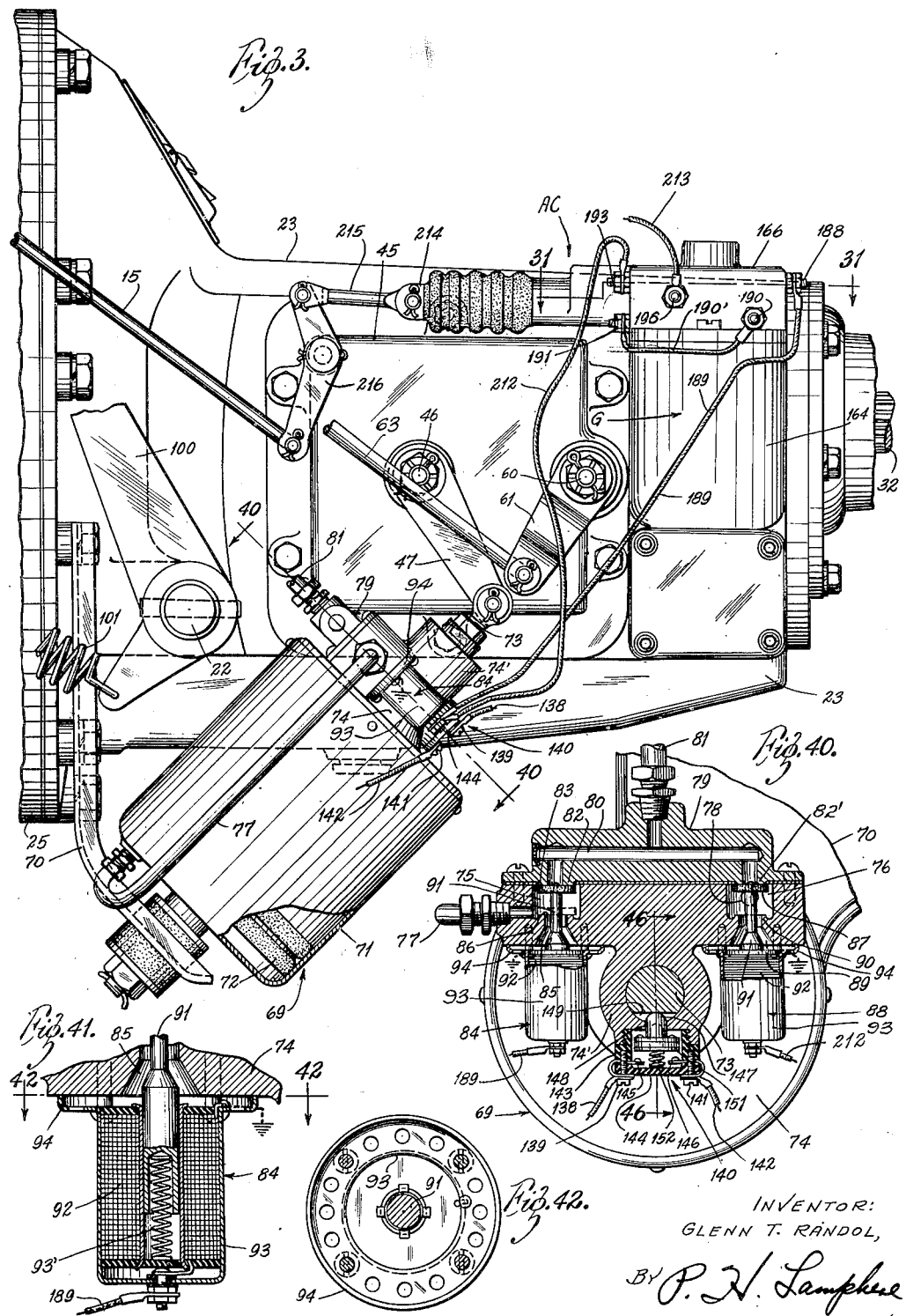

Nov. 4, 1952        G. T. RANDOL        2,616,535
AUTOMOTIVE VARIABLE-DRIVE POWER TRANSMISSION
Filed June 7, 1944        21 Sheets-Sheet 3
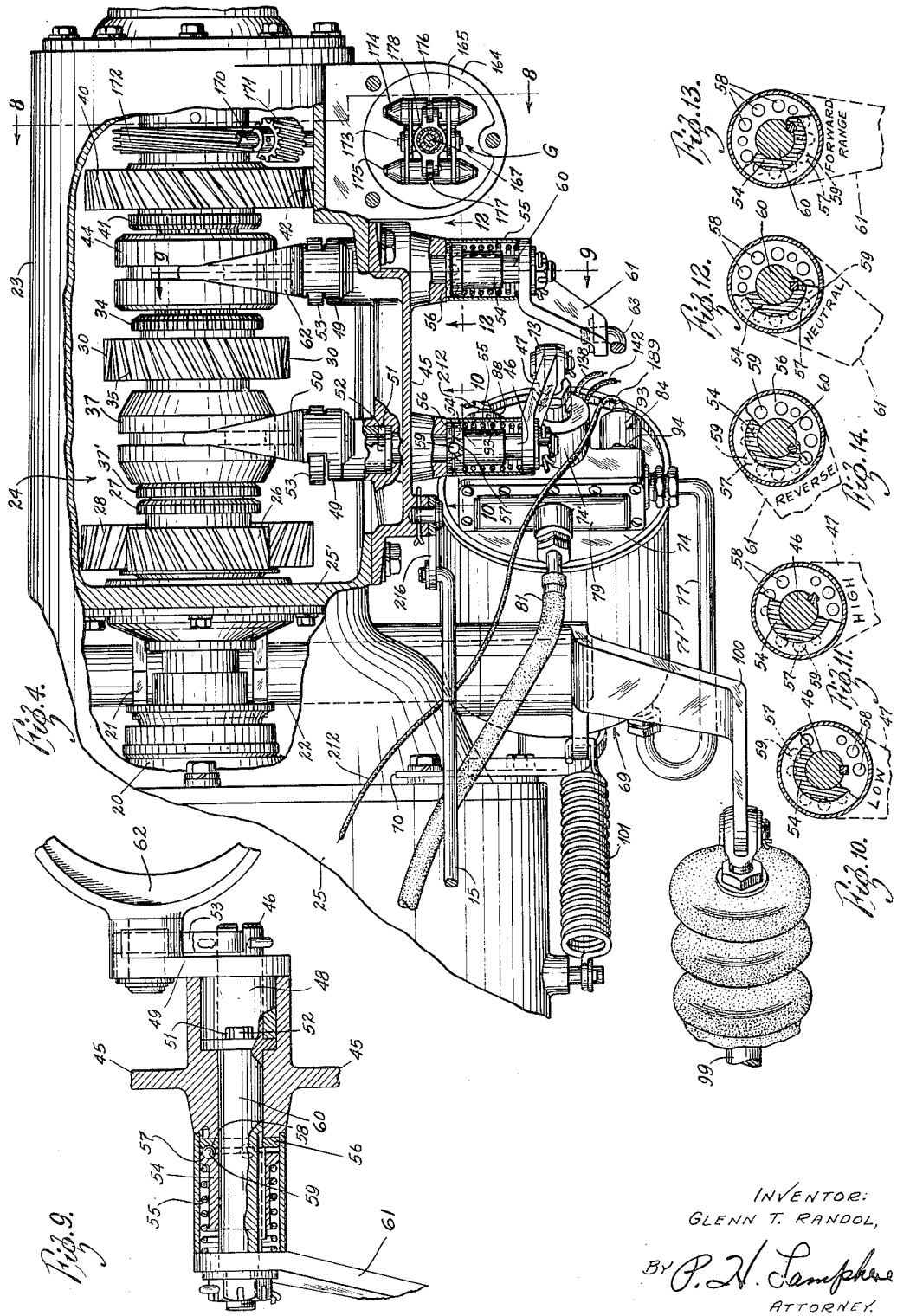
INVENTOR:
GLENN T. RANDOL,
BY P. H. Lamphere
ATTORNEY.

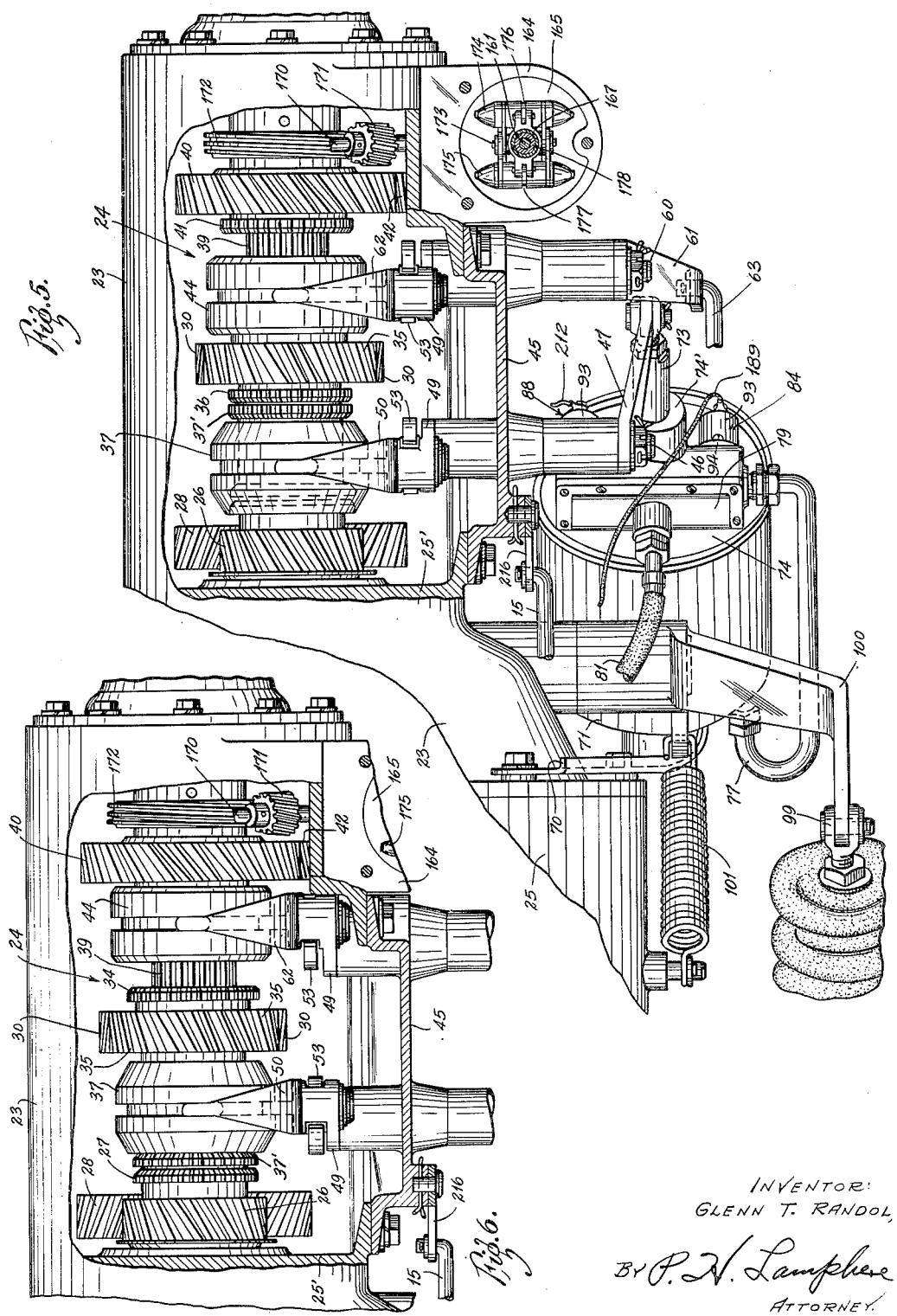

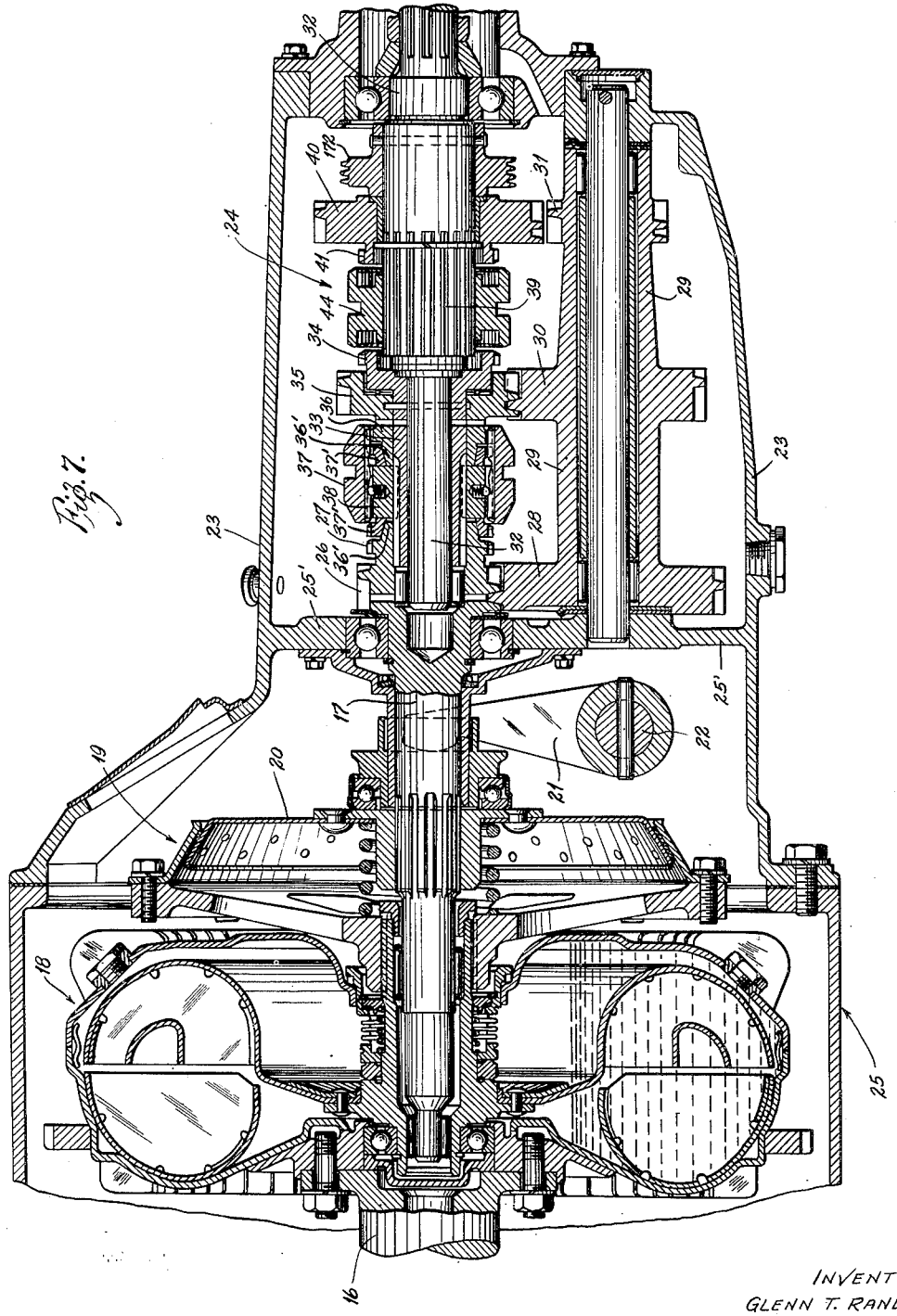

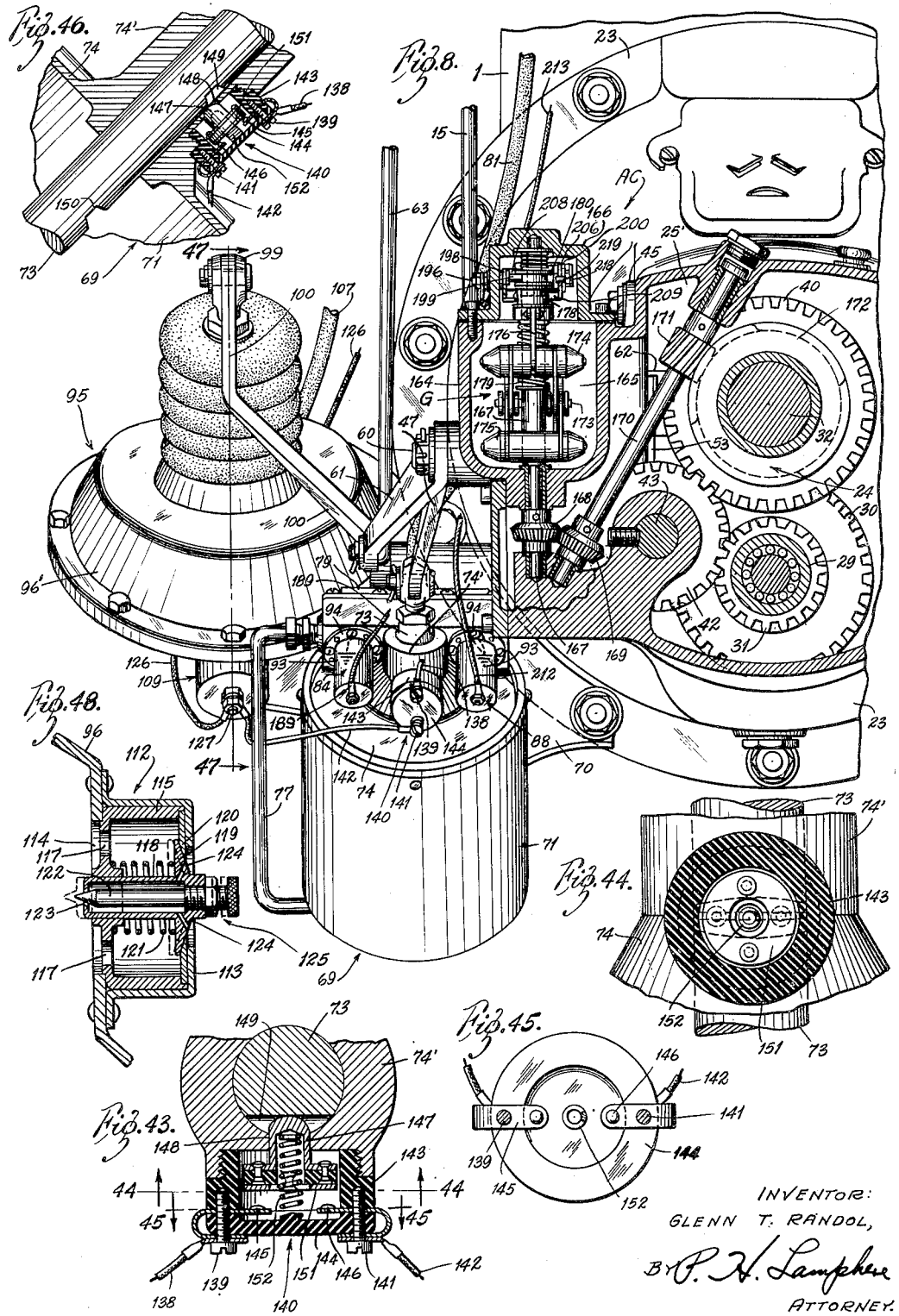

Nov. 4, 1952 — G. T. RANDOL — 2,616,535
AUTOMOTIVE VARIABLE-DRIVE POWER TRANSMISSION
Filed June 7, 1944 — 21 Sheets-Sheet 7
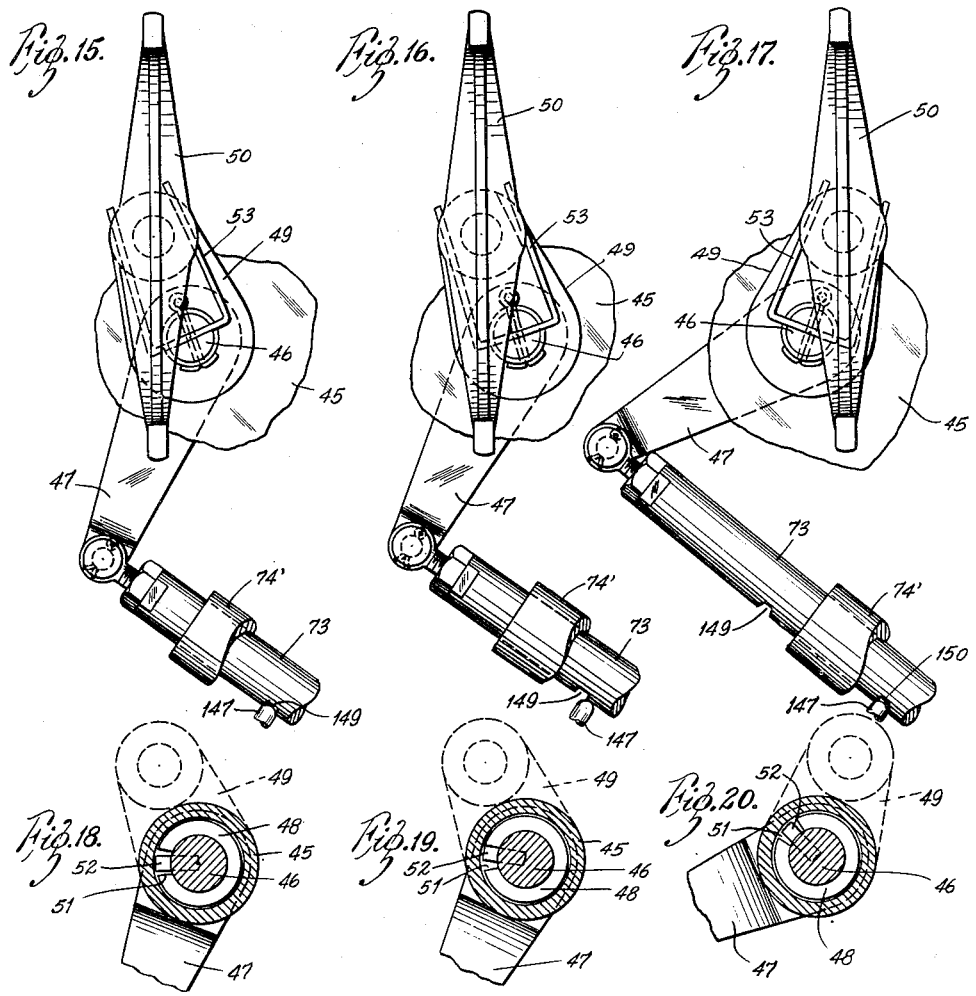
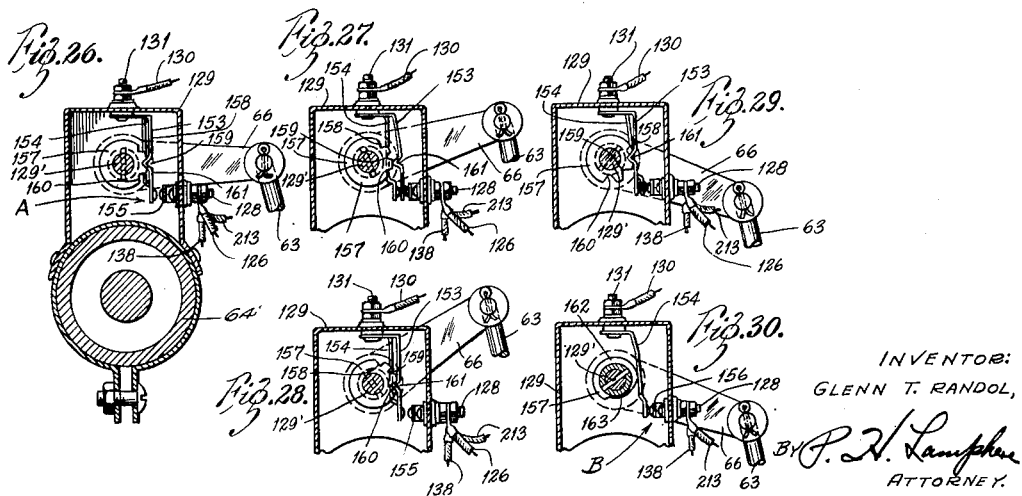
INVENTOR:
GLENN T. RANDOL,
BY P. H. Lamphere
ATTORNEY.

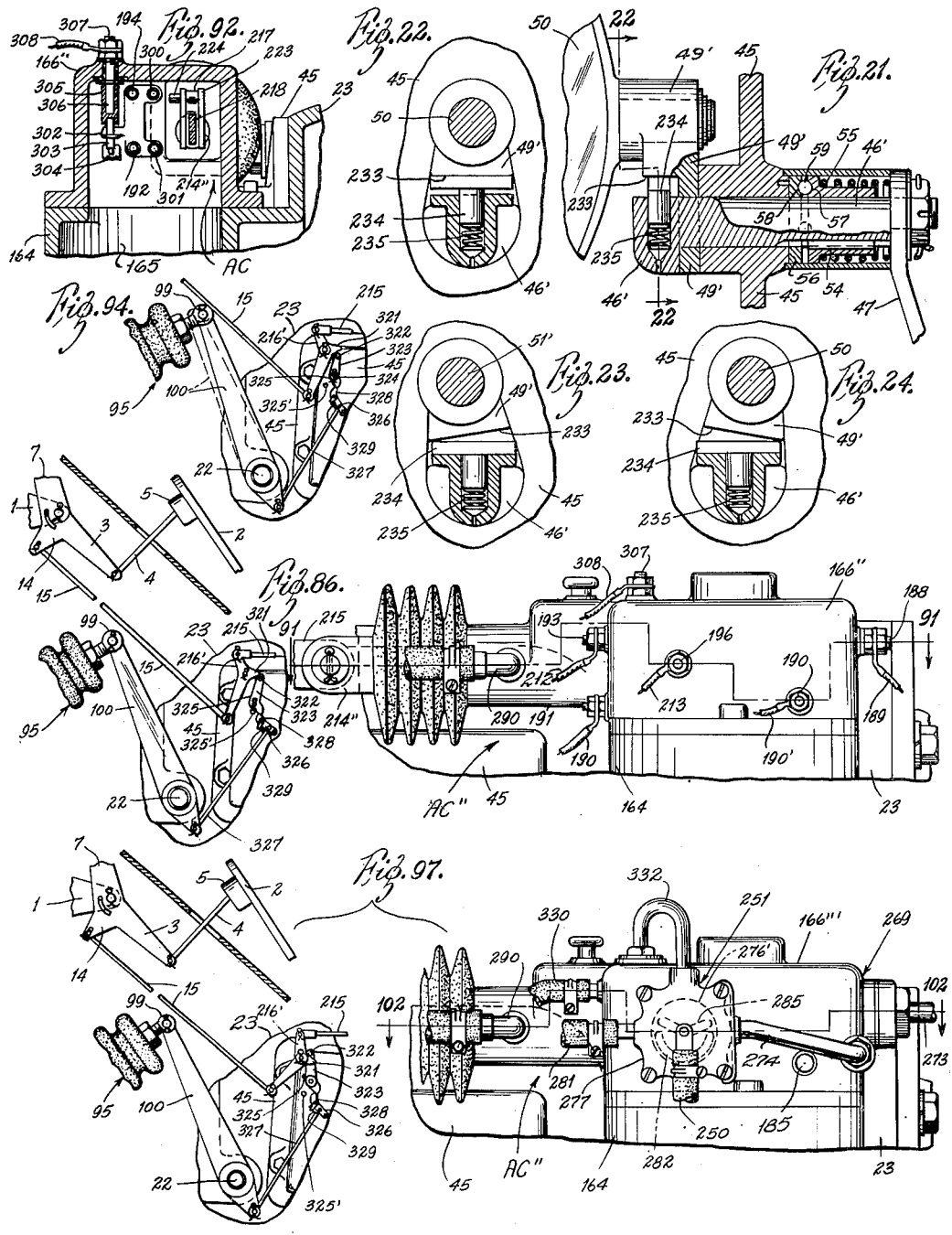

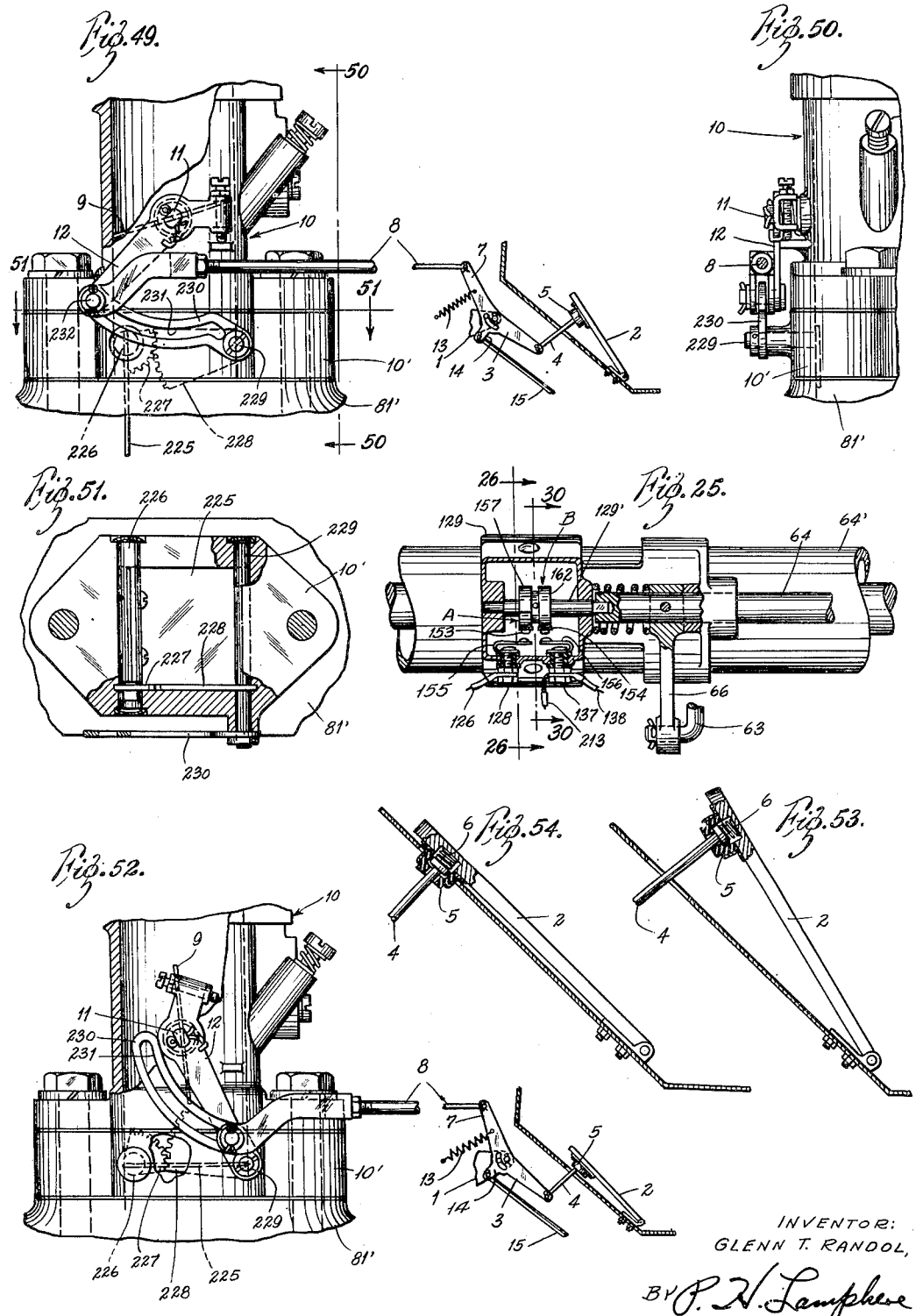

Nov. 4, 1952 — G. T. RANDOL — 2,616,535
AUTOMOTIVE VARIABLE-DRIVE POWER TRANSMISSION
Filed June 7, 1944 — 21 Sheets-Sheet 10
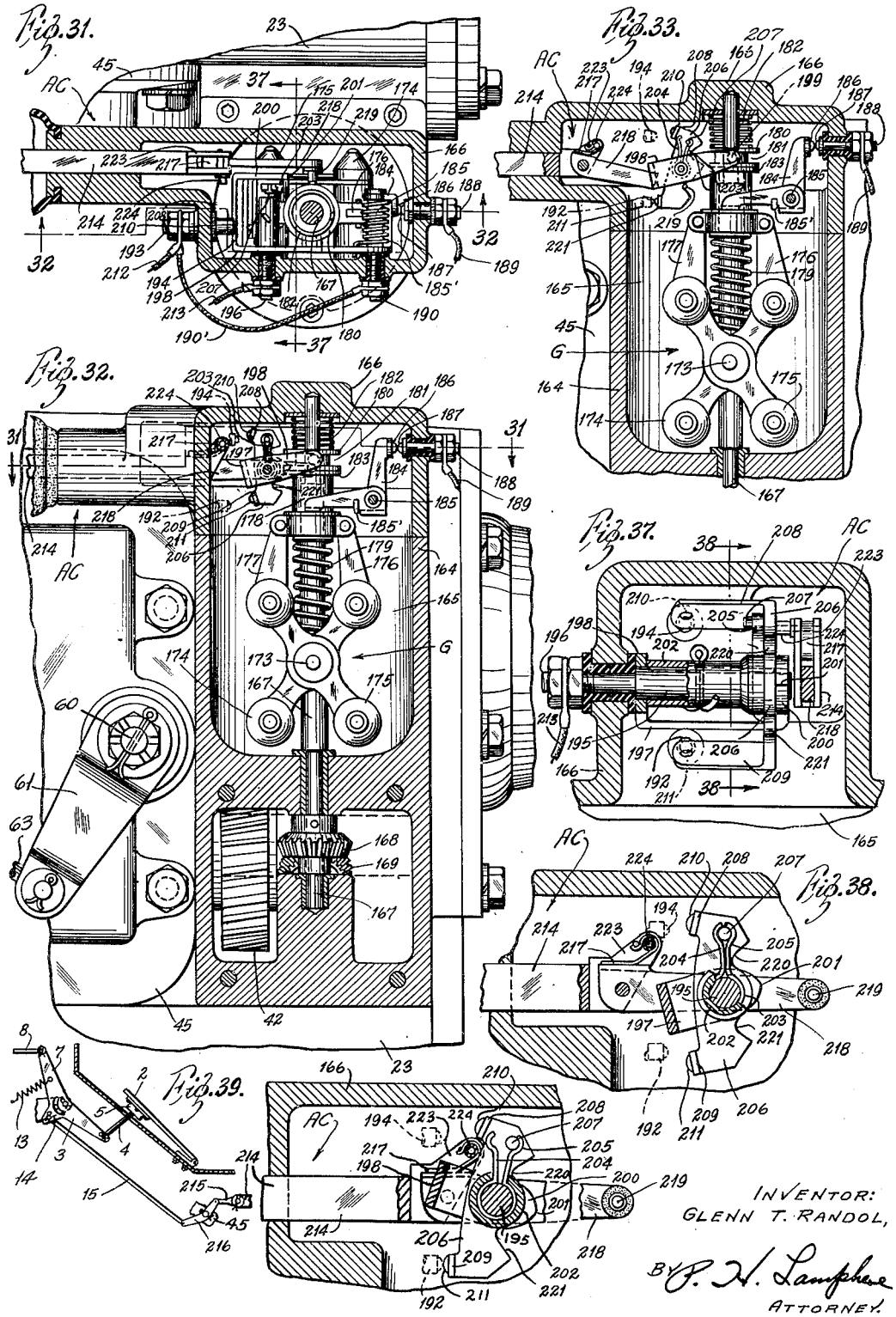
INVENTOR:
GLENN T. RANDOL,
BY P. H. Lamphere
ATTORNEY.

Nov. 4, 1952 G. T. RANDOL 2,616,535
AUTOMOTIVE VARIABLE-DRIVE POWER TRANSMISSION
Filed June 7, 1944 21 Sheets-Sheet 11
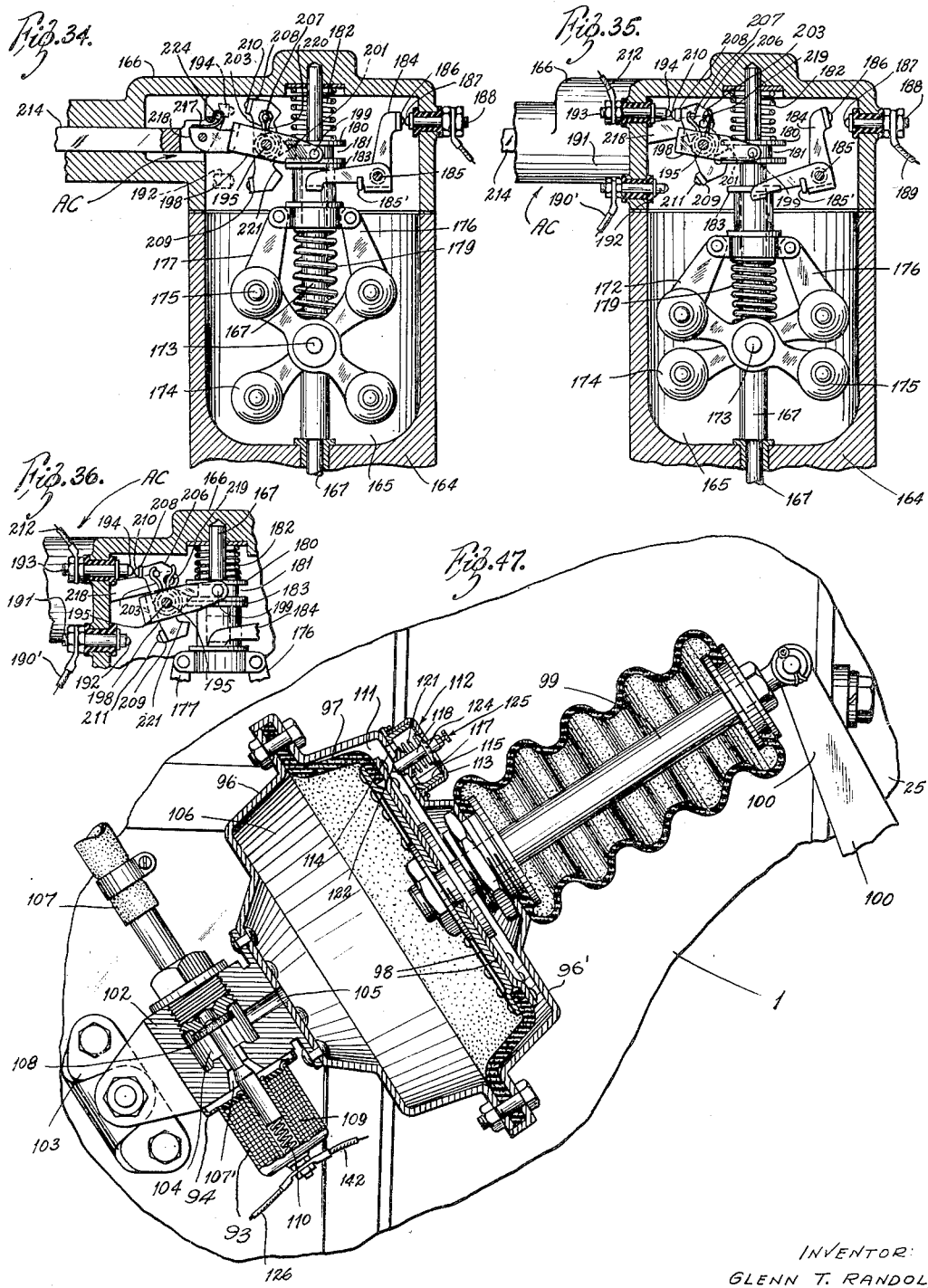
INVENTOR:
GLENN T. RANDOL,
BY P. H. Lamphere
ATTORNEY.

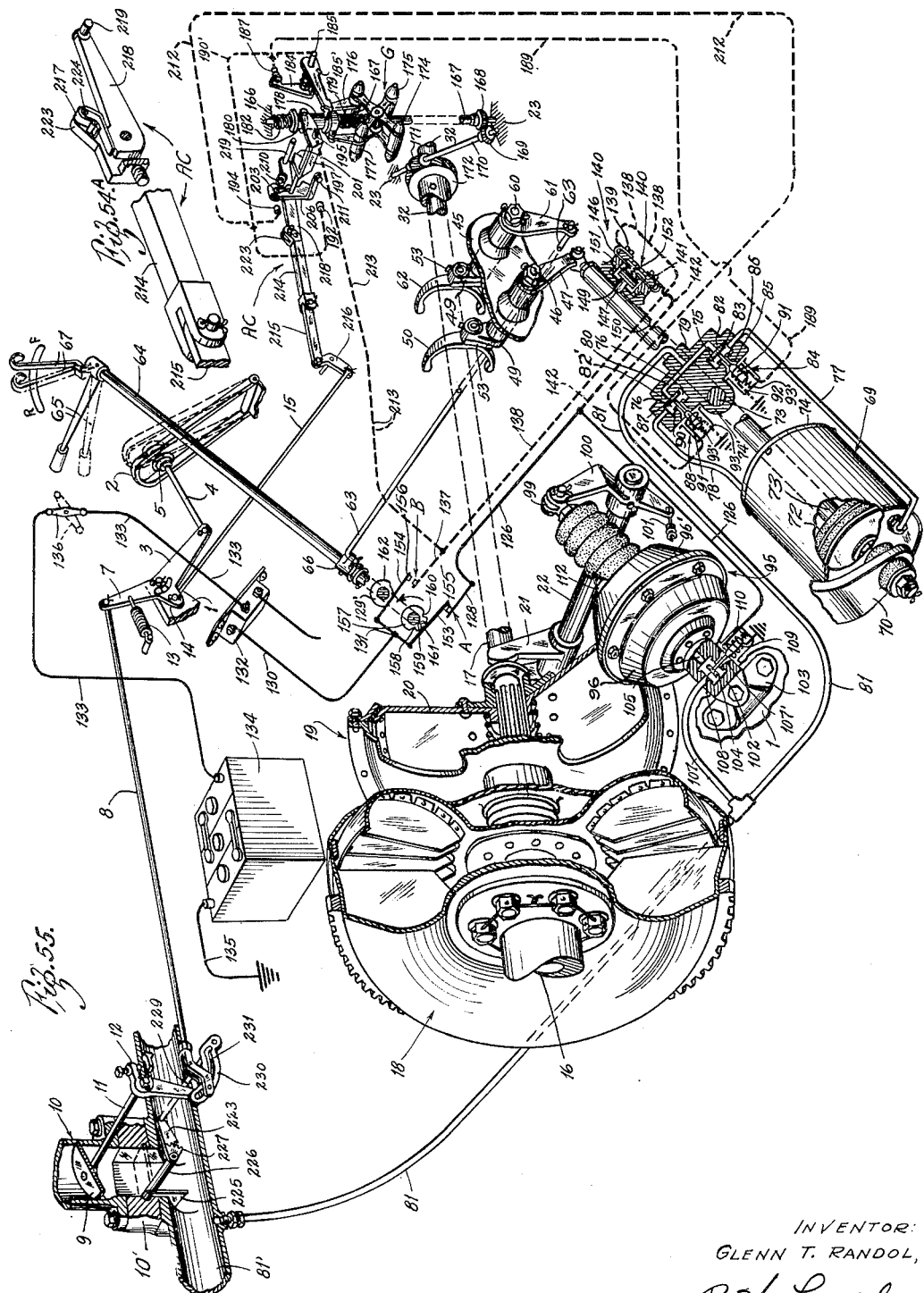

Nov. 4, 1952            G. T. RANDOL            2,616,535
AUTOMOTIVE VARIABLE-DRIVE POWER TRANSMISSION
Filed June 7, 1944                                           21 Sheets-Sheet 13
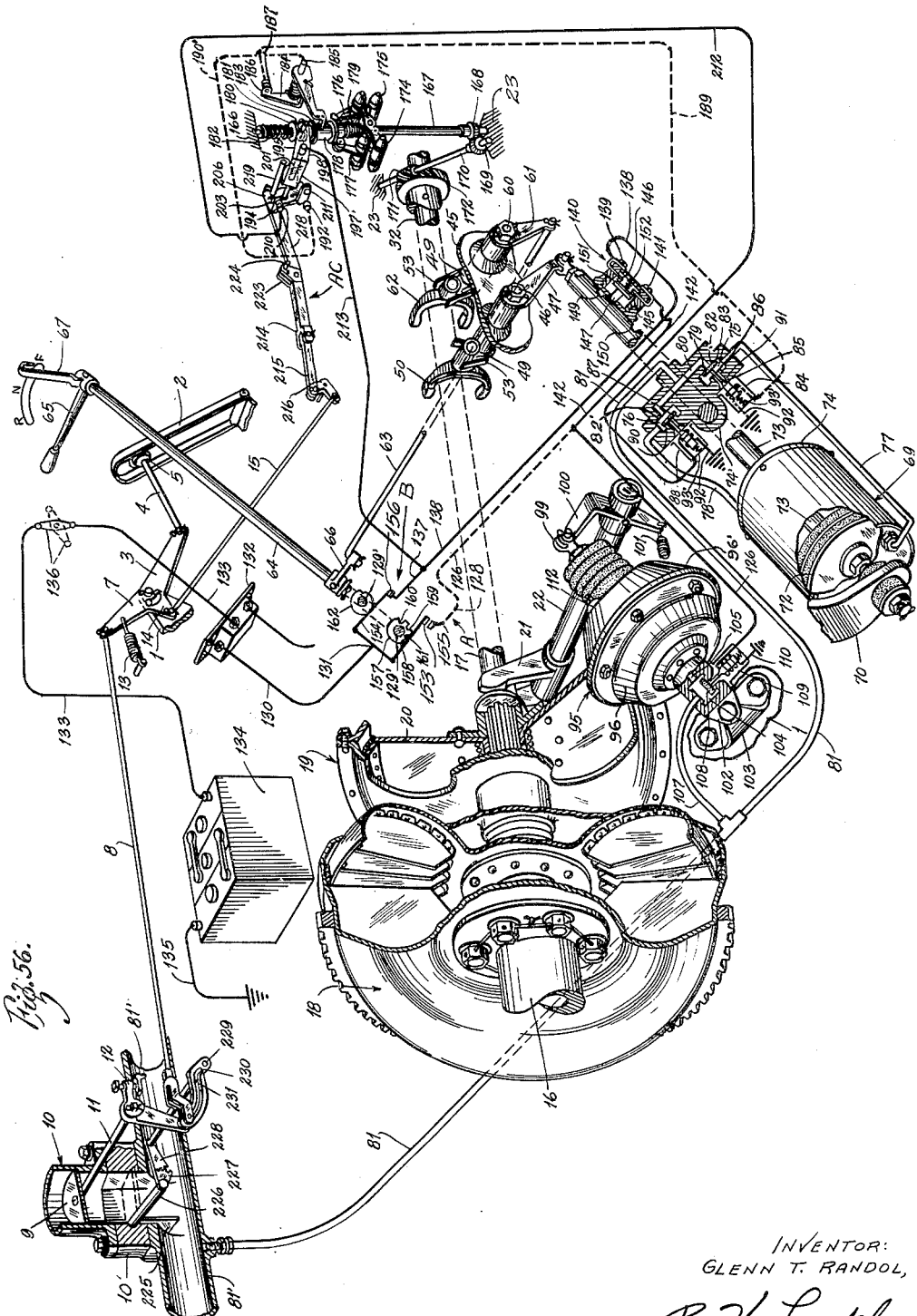
INVENTOR:
GLENN T. RANDOL,
BY P. H. Lamphere
ATTORNEY.

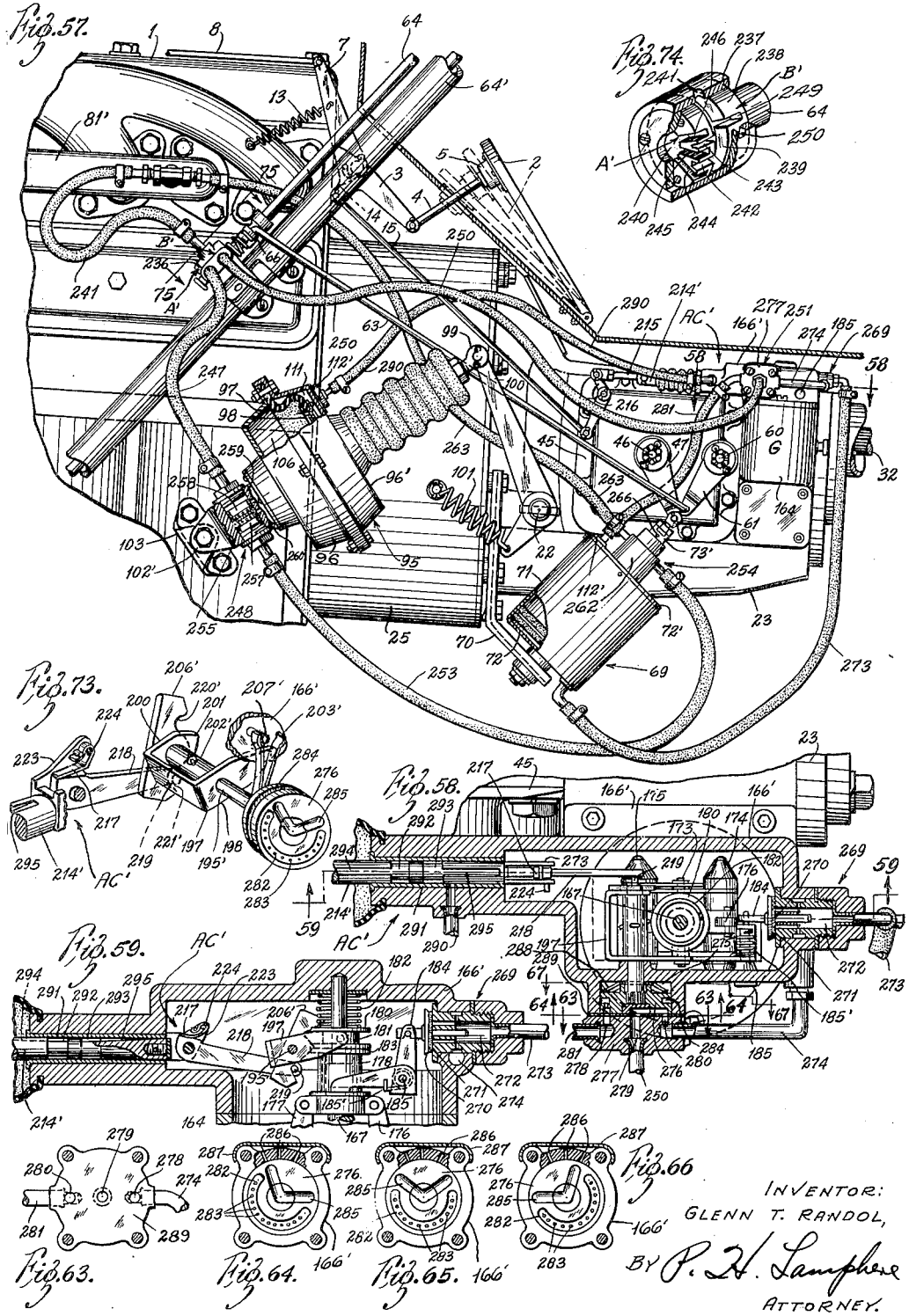

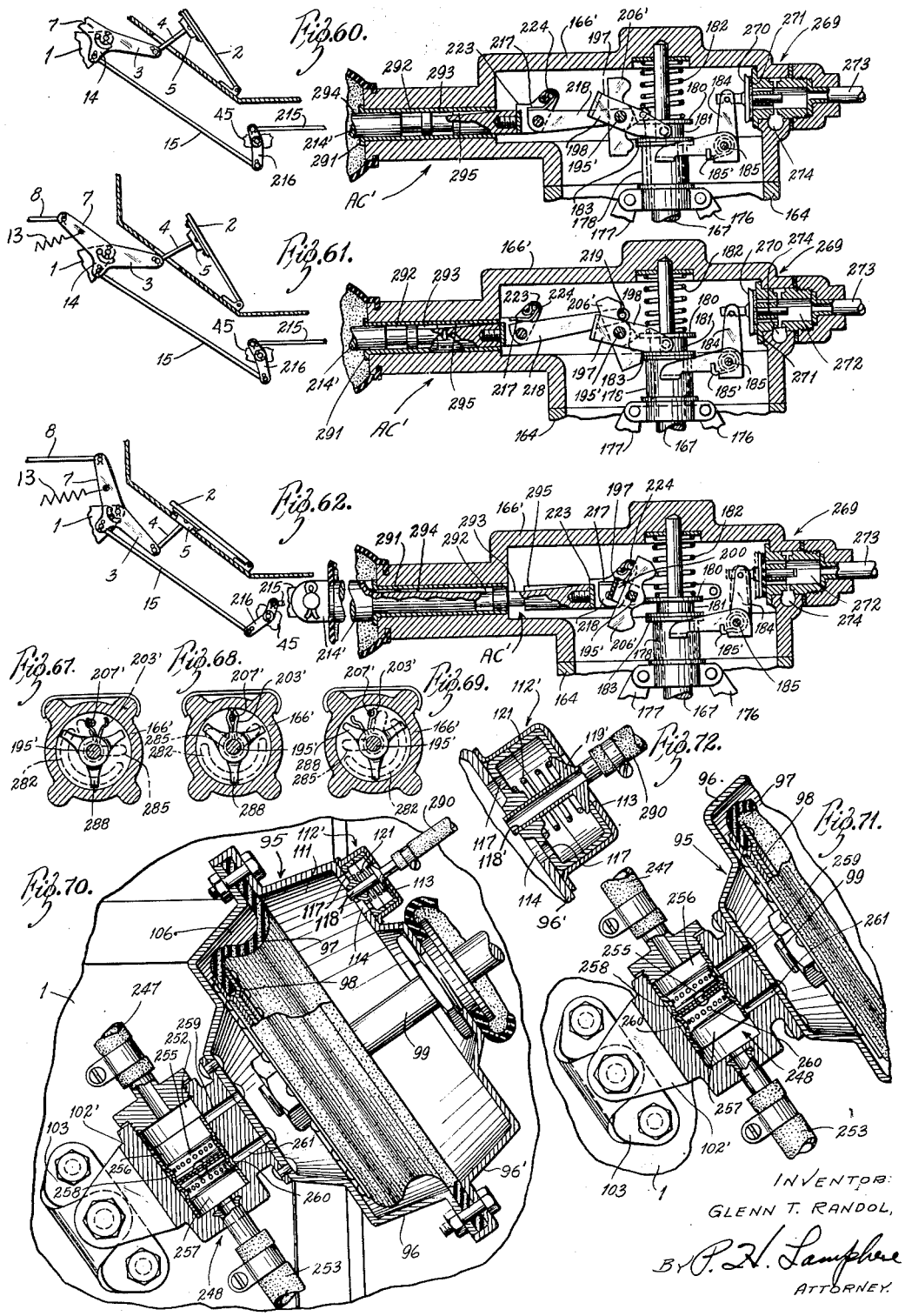

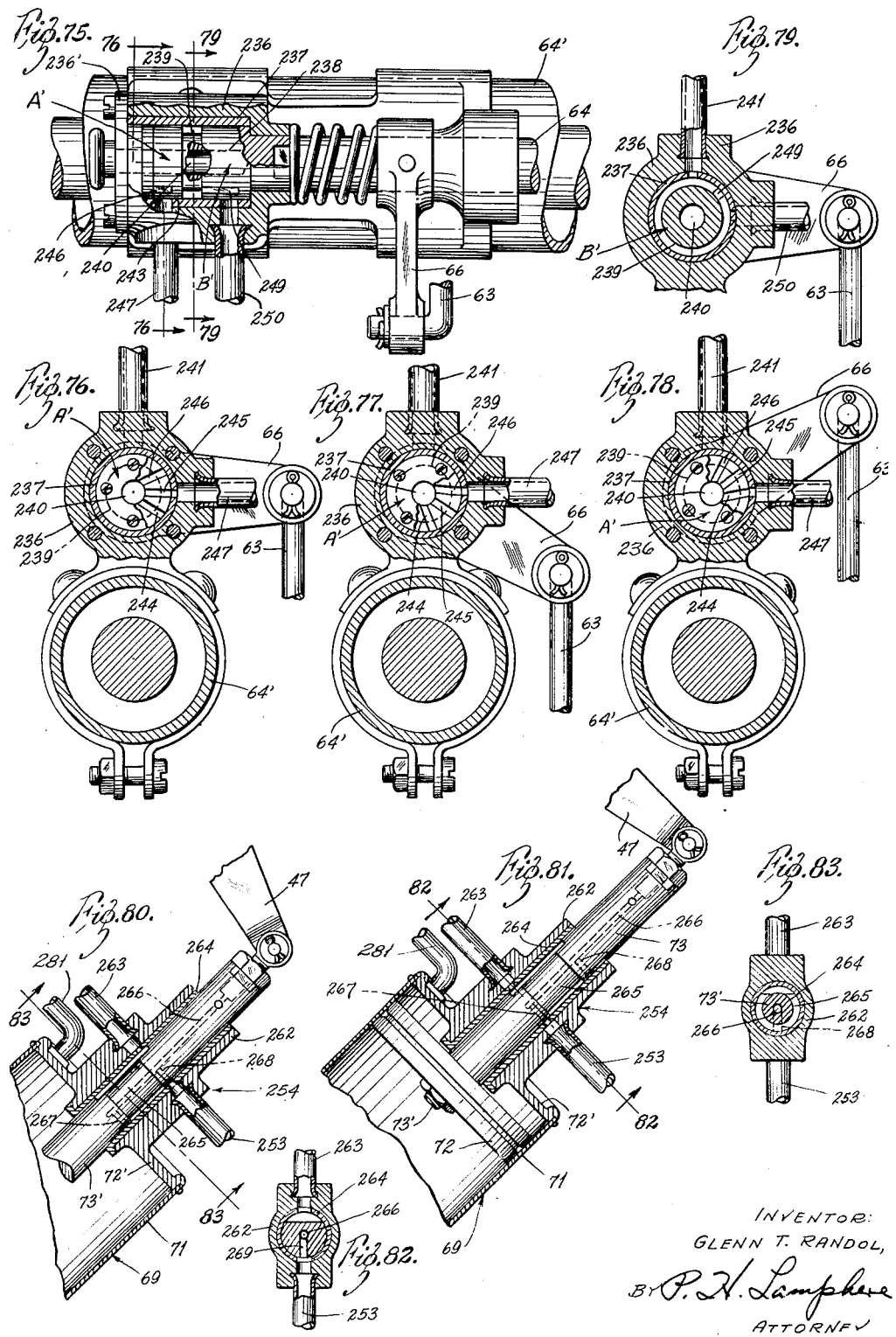

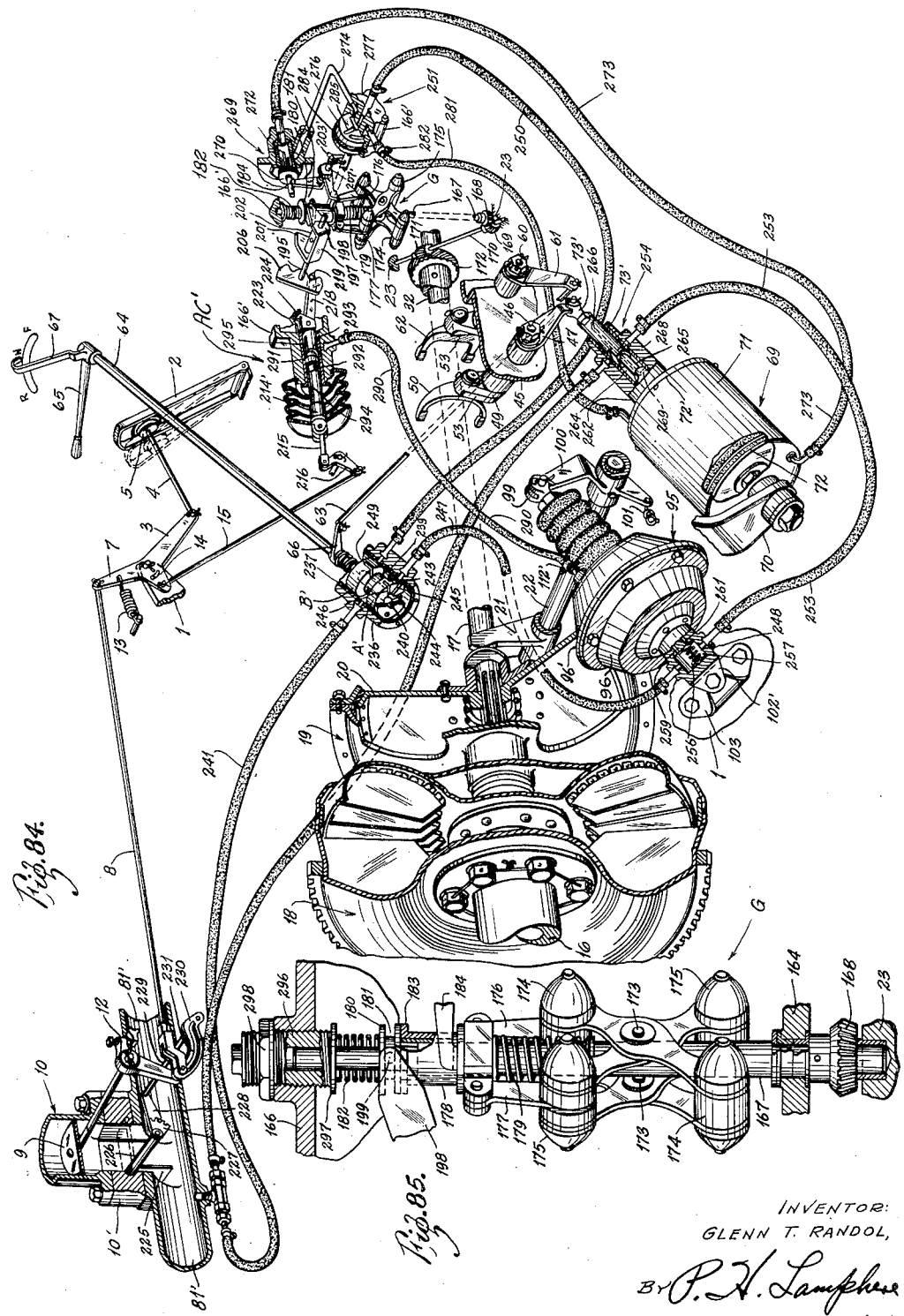

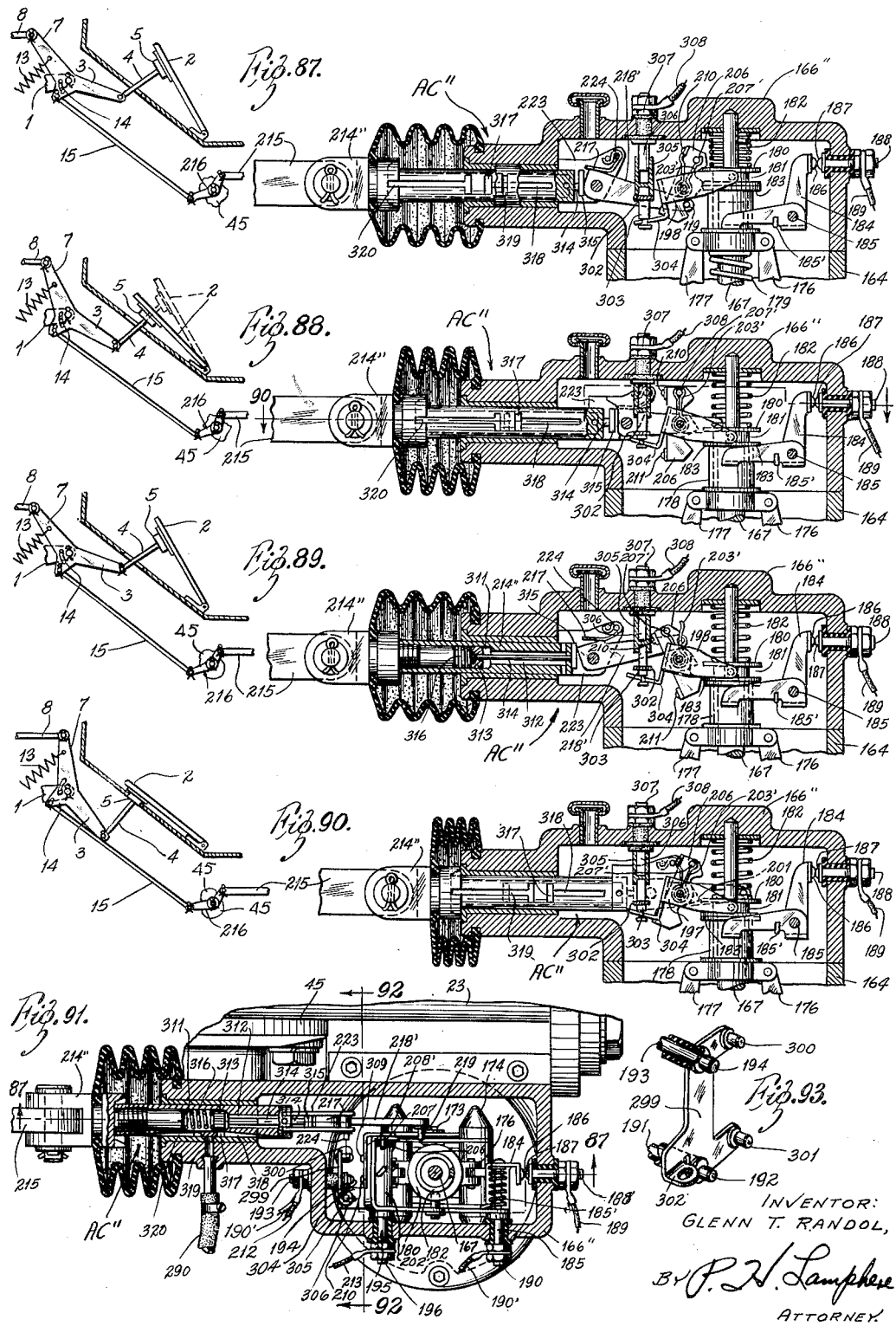

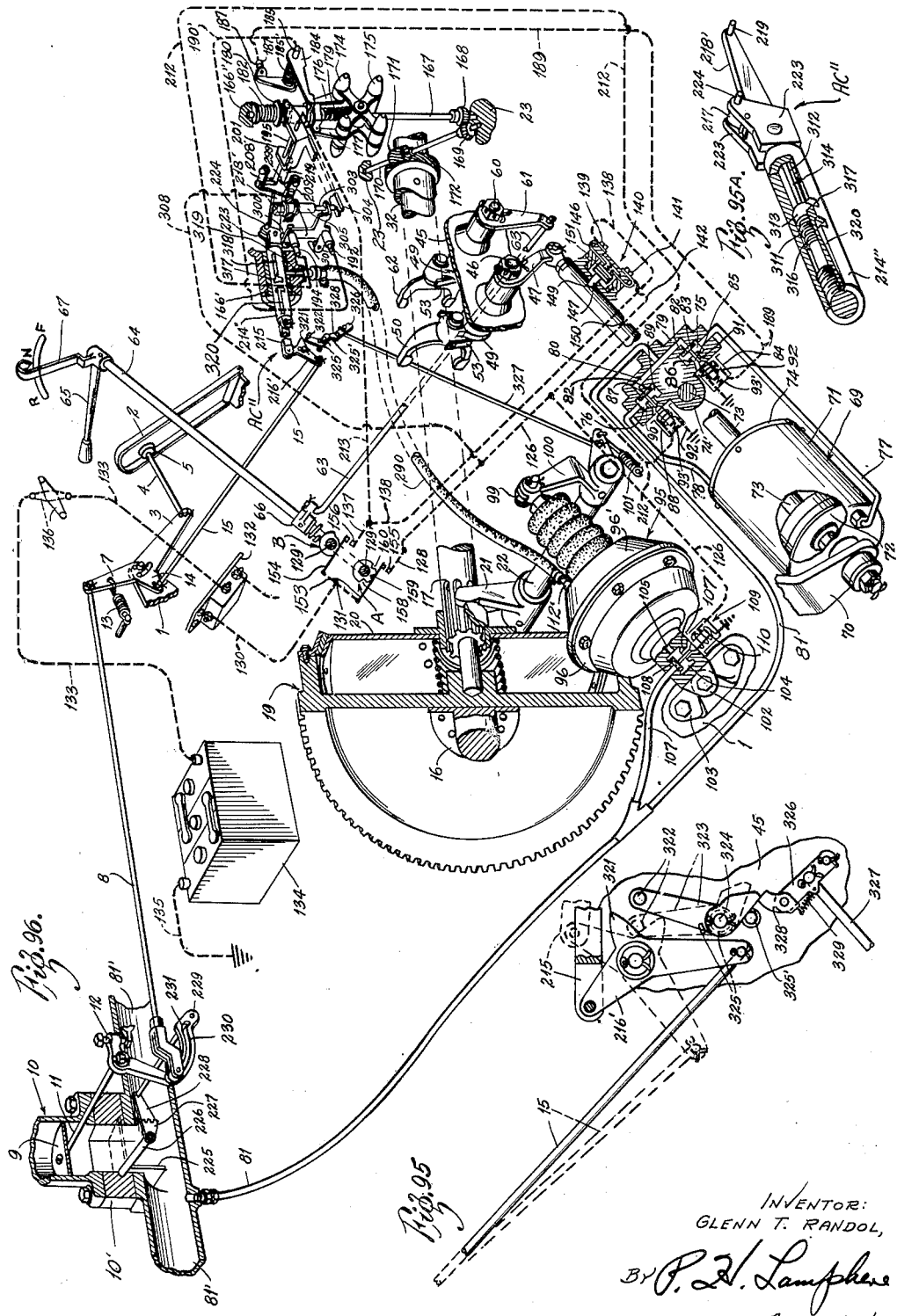

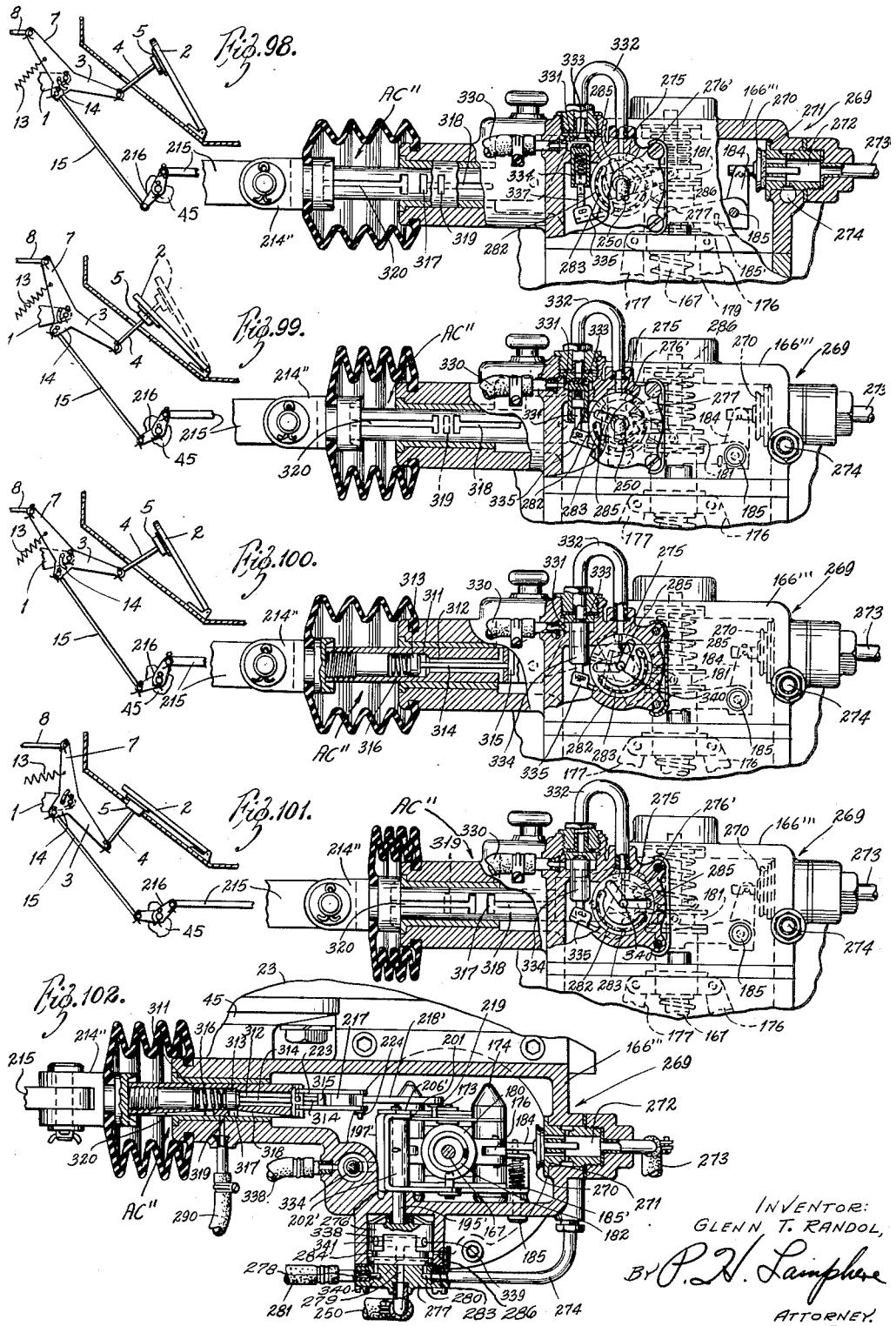

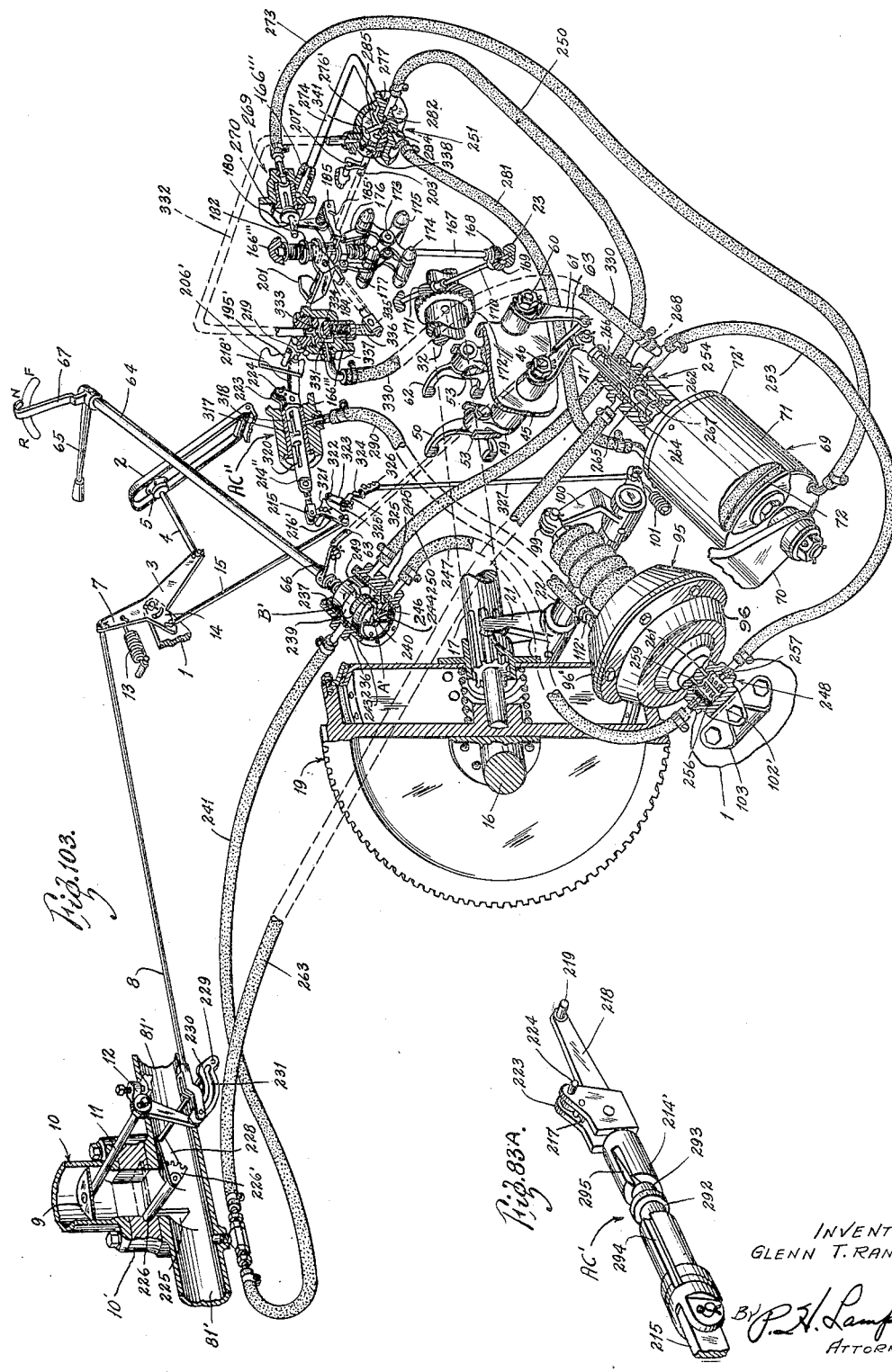

Patented Nov. 4, 1952

2,616,535

UNITED STATES PATENT OFFICE 2,616,535

AUTOMOTIVE VARIABLE-DRIVE POWER TRANSMISSION

Glenn T. Randol, St. Louis, Mo.

Application June 7, 1944, Serial No. 539,215

87 Claims. (Cl. 192—.073)

This invention relates to automotive power transmissions of the variable positive-drive type, and more particularly to improvements in the transmission drive-mechanism and associated control means for varying the drive ratios thereof.

An important object of the invention is to produce a novel three speed positive-drive power transmission for automotive vehicles controlled by a single control member manually operable to two different drive positions from a common transmission inoperative position, and wherein one of said drive positions controls the establishing of a first speed drive, and the other drive position controls the alternate establishing of a second and third speed drive by automatically-operable means controlled according to acelerator position and vehicular speed.

An object related to that last stated is to so construct the first speed drive that it may be employed as a reverse drive of an automotive vehicle.

Another object related to the first of the two objects next above is to provide means for disabling the automatically-operable means and rendering either of the speeds establishable thereby inoperative when the manually-controlled member is set in its said transmission inoperative position.

Another important object related to the first of the three objects next above is to produce in such a positive-drive transmission means operable automatically for performing a downshift from high speed to second speed upon substantially effecting maximum torque conditions on the driving mechanism of a motor vehicle within a predetermined speed range thereof, and without disturbing the second and high speed drive controlling position of the said transmission control element.

A principal object of this invention is to provide an improved means for controlling a change-speed gearing and a primary friction clutch associated therewith, so that a minimum of thought and effort will be required of the operator, yet the operator may exercise complete control over the condition of the gearing at all times.

A further primary and important object of the invention relates to an improved and novel variable-speed transmission and control whereby selective shifting from one speed to another, or from a neutral condition thereof to establish a speed, may be accomplished merely by the removal of the driving torque from the driving shaft of said transmission by means operable automatically in response to a predetermined shift-inducing movement of an energized shift actuator; and upon removal of the driving torque thereby, the actual shifting movement to establish a desired gear drive ratio is sequentially effected directly by said energized actuator and the release of energy stored thereby during its shift-inducing movement, said driving torque being automatically restored upon completion of the selected shift by said actuator which may continue energized or be de-energized thereafter as desired.

An important object related to that last stated is to effect such shifting operations solely by relaying the actuator force through a spring, and wherein the driving torque may be removed from the driving shaft of said transmission gearing to facilitate ratio changing thereof by means operable automatically in response to a predetermined shift-inducing movement of said actuator and upon removal of said torque, the shift to the desired gear ratio being completed solely by the energized spring. With the completion of the shift, said actuator is effective to cause the driving torque to be automatically restored through the transmission by said automatic means without the necessity of de-energizing the actuator if so desired.

A still further important object of the invention is to effect completely or partially the aforesaid shifting operations by spring-relayed shifting force from an energized actuator supplemented by direct force therefrom to produce maximum shifting force; and wherein the driving torque is removed from the driving shaft of said transmission gearing to facilitate a shifting operation by means operable automatically only in response to a predetermined spring-relayed shifting movement of said actuator to induce the shift; and upon removal of said torque, the shift to the desired speed gear will be wholly or partially effected by combined spring-relayed and directly applied forces from said energized shift-actuator, said actuator causing the driving torque to be automatically restored by said automatic means upon completion of the selected shift, whereupon said actuator may, thereafter, continue energized in its shifted position, or caused to become de-energized until re-energization thereof is required to effect a new shift in the manner aforesaid.

A further object related to that last stated is to effect said shifting operations by combined direct and relayed shifting forces from said energized actuator; and in the event the selected shift is only partially completed by said actuator in the manner stated, such incompleted shift will be completed solely by the relayed force.

An additional object of my invention related to the two objects immediately preceding, is to provide a double-acting pressure differential operated servomotor for establishing a variable-drive power transmission mechanism in one or the other of two speed drive conditions, said servomotor being operatively connected with said transmission by novel means including a double-acting normally pre-energized yieldable means accommodating predetermined relative movement between the power element of said servomotor and the transmission drive-mechanism to induce a speed drive change, and which is additionally energized during the aforesaid relative movement operation of the power element due to torque impressed on the drive-mechanism, and is then operative, after said power element has directly effected neutralization of the transmission, to establish the transmission in the selected speed drive condition, said yieldable connecting means including a torque interrupting control device to facilitate such speed drive changes which is operable in response to the aforesaid relative movement operation of the power element with respect to the transmission to cause interruption of torque. The expansion of the yieldable means to normal pre-energized condition in restoring the relative movement between the servomotor and transmission being effective to establish the selected speed drive wherein the control device is automatically disabled thus causing torque to be re-impressed on the transmission drive-mechanism.

A more specific object related to the object immediately preceding is to provide power means for operating the two speed drives, said power means including a double-acting vacuum operated servomotor suitably incorporated in and operatively connected to the transmission drive-mechanism, and further comprising a power element operably connected to a shift fork for controlling the speed drives. The force-transmitting means interconnecting the shift fork and power element include a double-acting spring means accommodating a predetermined relative movement between the servomotor and shifting fork such that when additionally energized during said relative movement, to subsequently effect operation of the speed drive-mechanism, said operation being effective following a neutralization of the drive-mechanism by the last portion of the working movement of the power element, and thereafter, the spring means functioning, after the speed drive gears to be engaged are brought to synchronous speed by controlling the speed of the engine of the associated vehicle, to expand and thereby effect a new speed drive condition. There is thus provided what may be termed two-stage power element speed drive changing; that is, the power element having two distinct stages of movement in effecting the transition from one speed drive to another of the transmission mechanism.

Another specific object of my invention related to the two objects last stated above is the provision of novel means associated with the servomotor power element for controlling the said torque control device whereby the limited relative movement of the power element with respect to the shift fork operates the control device to interrupt torque impressed on the transmission while said power element is applying a shifting force to change the selected speed drive, and upon neutralization of the transmission directly by the last portion of movement of the power element, expansion of the spring means to normal pre-energized condition completes the shift to establish the selected speed drive by moving the shift fork and connected drive element relatively to the power element which operation restores the relative movement condition between the power element and shift fork and automatically disables the control device causing the torque to be re-impressed on the transmission thus enabling the servomotor to repeat the above-described two-stage shifting operation to render active a newly selected speed drive.

A further object of my invention related to the immediately forestated series of five objects, is the provision of novel means whereby the aforesaid novel force-transmitting connecting means described in connection with servo-power operation of the transmission, also accommodate the aforedescribed two-stage shifting operation of the transmission by a manually-operated shift lever, to selectively activate the two speed drives with interruption of torque to facilitate such speed drive changes and automatic re-impressing of torque on the transmission substantially on completion of the selected speed change.

A further and important object of the invention is to produce novel and improved shift actuating means for a shiftable change-speed gear and/or dental clutch of a motor vehicle transmission wherein the shift actuating force is relayed through a mechanical connection in three sequentially merging shifting stages, the initial one of which is of limited yieldable character for causing interruption of torque load on said gear and/or clutch during the yielding movement of said connection so that the shift actuator may act directly followed by normalization of the connection to effect the selected speed change.

Another object related to that last stated is to produce improved and novel means for interrupting the torque on said gear-clutch to facilitate a speed change whereby said torque interruption may be controlled by said shift actuator while inducing a shift to change speed or independently of said actuator as by reversal of the torque drive through said transmission.

A further important object related to the two objects immediately above, is to provide novel three-stage shift energization to effect transition from one speed to another in response to two-stage movement of an operatively connected power element of an energizable servomechanism; and wherein the first-stage of shift energization is effective to apply a shifting force to induce movement of the shiftable transmission element and simultaneously interrupt torque impressed on the transmission, the second-stage of energization being directly effected by the power element to neutralize the transmission, and the third-stage of energization being effective through expansion of the yieldable connection to normally pre-energized relative movement condition, to engage the shiftable element to establish the selected speed drive and automatically cause the torque to be re-impressed on the transmission by conjointly advancing the shifting mechanism and connected shiftable element to positions ahead of the neutral position of the completed stroke of the power element, the full stroke of the two-stage movement of the power element being equal substantially to, but never greater than, the full shifting stroke of the transmission element from one speed drive establishing position to another.

A still further important but more specific object of the invention is to provide a novel and patentable double-acting shifting motor for establishing a change-speed gearing in either of two different forward gear ratio operative conditions when said gearing is subtantially free of torque load; said motor having a movable element operatively connected to said gearing by means including a double-acting yieldable force-relaying means which is capable of additional energization above a normally pre-energized condition during a shift-inducing movement only by said motor element, and wherein said shift-inducing movement is effective to cause removal of torque load automatically from said gearing to enable said motor and relaying means to effect the establishing of the selected gear ratio, and whereupon, said torque load is restored automatically.

A further object related to that last stated is the provision of a novel motor-force relaying means positioned between said motor and a selective gearing member shiftable thereby; and whereby the additional energization of said relaying means is capable, when released, of solely effecting neutralization of an established gear ratio or the positive engagement thereof.

A still further object related to the object immediately preceding that last stated is the provision of novel motor-force relaying means of a yieldable character whereby said motor may function relatively a predetermined degree with respect to the connected transmission member to be shifted thereby, and wherein said relative movement may be less than but never exceeds the shift-inducing movement of said motor element to thus cause additional energization of the yieldable means and relief of torque load in the manner aforesaid.

Another significant object of the invention is to provide in slidable gear-changing operations wherein a slidable element is shifted from a common demeshed position in opposite directions therefrom to two gear meshing positions by a shift actuating force relayed solely through a yieldable force-transmitting means, means whereby the initial movement of said shift-actuator is operative, while applying a force to shift said element, to remove driving torque therefrom so that the selected gear may be meshed solely by the functioning of the yieldable means to thus establish the selected gear ratio.

A still further important object of the invention is the provision of a novel and patentable control mechanism for a variable-speed gear transmission having shiftable elements; such as, meshable gears or dental clutches for changing the gear ratios thereof, an energizable shift actuator for shifting said elements and capable of applying a continuous shifting force on the element to be shifted thereby either from a neutral (disengaged) position to a gear engaged position, or from an engaged position to another notwithstanding said actuator has a limited degree of relative movement with respect to said element while subjected to torque load or being synchronized for engagement, to thus cause the torque load to be removed so that the shifting of said element to its selected gear establishing position will be facilitated.

An object related to that last stated is to provide novel spring-relayed shift actuating force for shifting said shiftable elements whereby said spring alone will "cushion" and/or actually shift said element into positive engagement following torque interruption and/or synchronization thereof in the manner aforesaid.

Another object is to provide a shift actuating force capable of directly applying its maximum force following the relaying of a lesser shift-inducing force thereby to a shiftable element of a change-speed gearing, to actually shift said shiftable element a predetermined portion of the speed changing cycle. The aforesaid shift-inducing force corresponding to the degree of "drag-torque" effective on the gearing and/or gear synchronization required to free the shiftable element for movement into position by said directly acting force for positive engagement.

Another important object of the invention is to produce novel operator-controlled actuator means for selectively causing the ratio changing means of a motor vehicle power drive control system to vary the torque and speed delivery thereof, and wherein said actuator combines additional means for controlling automatically or selectively the restoration of the torque drive through said power drive mechanism when such is interrupted by the aforesaid ratio changing cycle during a speed change.

A more specific object related to that last stated is to effect the speed changes of such an automotive power drive system by motor-power means energized selectively by moving said actuator in one direction to a predetermined position, and wherein said actuator when moved in an opposite direction from said predetermined position will operate to cause resumption of delivery of torque to the driving wheels of the associated automotive vehicle upon completion of a speed change by said motor means.

Another object of this invention is to provide improved control means which will eliminate the necessity of operator operation of the primary power-transmitting friction clutch during gear ratio changing.

A further object is to provide improved control means for a power drive system which includes change-speed gearing and an engine clutch adapted to be driven by an engine having a throttle control such as an accelerator pedal or equivalent means, and which is so designed that the entire system can be fully controlled by the operator by merely setting a hand lever and manipulating the accelerator or equivalent conventional control mechanism of the associated engine.

Still another object is to provide an improved gearing and clutch control means in which the gear ratio drive to be established is determined by the speed of a driven member and the actual change of the gear ratio is controlled at will by the operator.

A further object is to provide a control mechanism for a change-speed gearing in which changes in speed drive are controlled both by the speed of a driven member and by the condition of the throttle mechanism of an associated engine.

A more specific object is to provide an improved control mechanism, for such a system incorporating gearing having two forward speeds in which the lower speed is obtainable when the throttle is substantially closed and the speed of the driven member is substantially at or below a predetermined valve, while the higher speed is also obtainable by substantial closing of the throttle (as by release of the accelerator) when the speed of the driven member is substantially at or above the predetermined speed, a shift from the higher to the lower speed being also obtainable by placing the accelerator mechanism in a condition corresponding to full open throttle.

A further object is to provide in a control mechanism for a change-speed gearing drive and a primary torque-transmitting clutch means whereby the clutch can be automatically disengaged by an operator-controlled shifting lever when initially moved to establish a gear drive and then automatically re-engaged after the lever has established the selected gear drive.

A further object is to provide, in a control means for a change-speed gearing and an associated primary friction clutch which are controllable by predetermined conditions of the accelerator mechanism, means preventing the re-engagement of the clutch by control of the accelerator mechanism before completion of a gear ratio change.

A further object is to provide, in a control mechanism for a change-speed gearing and a primary friction clutch which is caused to be operated by predetermined conditions of an engine accelerator mechanism, improved means for insuring proper re-engagement of the clutch for the gear ratio being established so as to provide smooth operation of a vehicle with which the gearing and engine may be associated.

A further object is to provide in a control mechanism for a change-speed gearing and an associated primary torque-transmitting friction clutch, means operable by an operator-controlled gear shift lever for disengaging the clutch when the lever is initially moved to establish a selected gear ratio together with means controlled by actuation of the acceleraor mechanism for controlling smooth re-engagement of the clutch.

A still further important object is to produce in a variable-speed automotive power drive wherein the speed changes are effected by a manually-operated shift lever, novel control means responsive thereto when momentarily paused at the neutral position for re-engaging and disengaging automatically the power transmitting clutch to facilitate the shift thereby to the new speed by relieving the torque load thereon.

A more detailed object related to that last stated is to cause transmission and interruption of drive-torque; i. e., double-clutching, at the neutral condition of the gearing during a shift of the lever from one speed to another by momentarily pausing said lever in said neutral position.

A further object related to the last two above is to produce selective shift-lever controlled single or double-clutching operations to facilitate gear changing by maintaining manual force on said lever, or momentarily releasing said lever at its neutral position, respectively.

An additional object related to those hereinbefore set forth is the provision of control means responsive to movement of a manually-operable shift lever to effect clutch dis-engagement and re-engagement during a gear ratio change within a variable-speed gearing in response to shift lever movement, the control means being operable to maintain the clutch in disengaged position when the shift lever is continuously pushed from one gear ratio established position to another, and the control means being effective to cause double-clutching operation when movement of the shift lever is paused at the neutral position between the positions of the shift lever effective to selectively establish the two gear ratios within the change-speed gearing.

A further object is to provide a control mechanism for a vehicle change-speed gearing and a primary friction clutch interposed between the engine and gearing, which will automatically cause disengagement of the clutch when the vehicle is brought substantially to a stop.

A further object is to provide in a control means for a vehicle change-speed gearing and a primary friction clutch wherein a vehicular speed-responsive device is employed as a selecting means for determining the gear ratio to be established, improved means controlled by said speed-responsive device for automatically causing a disengagement of the clutch when the vehicle is brought substantially to a stop.

A further object is to provide improved control means for a vehicle transmission system embodying a change-speed gearing and a primary torque-transmitting friction clutch which will control disengagement of the clutch, by either moving a gear shifting lever or by the condition of a gearing driven member to thereby interrupt the torque load; and which will control the disengaged condition of the clutch so as to be momentarily retarded, as it enters initial engaging stage according to the condition of a gear ratio selecting means forming a part of the control means.

A further object is to incorporate in a control means of the type above set forth, an accelerator mechanism operated means for bringing about a proper re-engagement of the primary friction clutch to drive the vehicle forward from its stopped condition.

A further object is to provide in a control means for a friction clutch and associated change-speed gearing, improved means for bringing about proper engagement of the clutch by the manipulation of the accelerator mechanism and for establishing the selected gear ratio during the clutch disengagement.

A further object is to provide improved and novel control mechanism for a change-speed gearing having an associated friction clutch, which may utilize either electrically and/or mechanically operated valving as the fluid-pressure controlling devices for causing motor-power clutch disengagement to accommodate speed-changing cycles, and controlled re-engagement of said clutch.

A further object is to provide in a control mechanism for changing the gear ratios of a gearing, an improved speed-responsive selecting means for determining when there should be a change in gear ratio and to associate therewith operator-controlled means for causing the change to occur.

A more specific object of the invention is to provide fluid-pressure operated means for shifting the shiftable elements to change the speed of a change-speed gearing, and wherein said fluid-operated means is controlled by electrcially operated valves in such manner that two forward speeds of said gearing may be made alternately operative under joint control of an operator-operated member, and a speed-responsive device driven from an element of the driving mechanism of the associated motor vehicle.

An object related to that last stated is to provide novel switch means for controlling said valve means whereby the selection of different operative (closed) positions of said switch is mechanically controlled by said speed-responsive device; while the actual closing of said switch means to its selected operative positions to energize said valves to open position is controlled by the operator-operated member.

A further object is to provide a control mechanism for a vehicle change-speed gearing and a primary torque-transmitting friction clutch which can be readily adapted for control thereof whether or not a fluid-coupling is associated with the said friction clutch.

Another and important object of the present invention is to incorporate in such a power drive system improved pressure-operable means for changing the gear driving ratio of the transmission by shifting positively engageable toothed members of the type which resist movement into engaged relation with one another when they are rotating asynchronously, and which resist disengagement when torque is being transmitted through them. One of the important improvements in this connection relates to the provision of yieldable force-transmitting connections between the manual- or motor-power shift operating means and their respective operated shiftable elements, whereby said power operating means may function a predetermined degree relatively to said elements during the intervals when movement of such is arrested in the manner above indicated notwithstanding the shifting pressure is effective thereagainst; as for example, while such yieldable connections have been employed in the past, I aim to improve upon such systems by the incorporation of novel control means, responsive to such relative functioning of the power-operating means while applying a shifting force, for disengaging the friction clutch coupling between the engine and a change-speed gearing of the associated vehicle to interrupt the driving torque upon said shiftable elements, so that the latter may complete their shifting movement to establish a desired gear ratio. The extent of effective relative movement as provided by the aforesaid connections being determined by the degree of "drag" torque prevailing on the transmission shiftable elements during a speed-changing operation.

Another object related to that last stated is to provide in such yieldable force relaying means, the loading of which above a normal pre-stressed condition reaches a maximum value during the limited shift-inducing relative movement of the power-operating means as above-mentioned; means whereby, when the limit of such relative movement is reached the shiftable element is actuated directly by maximum power shifting force through a predetermined portion of the shifting cycle thereof followed by a reduced shifting force relayed through the said yieldable means in effecting the desired shift.

Another object of my invention is to simplify the control of a conventional frictional clutch and change-speed gearing employed on a vehicle so that an operator can operate the vehicle in an effortless and safe manner and yet at the same time have complete control over the gear ratio changing to properly contend with varying road, load and traffic conditions.

Yet another object of my invention is to provide improved control means for a change-speed gearing and associated friction clutch which for the improved results obtained will be relatively simple in construction, cheap to manufacture and easy to service, and furthermore one which will have improved ease of operation together with a resultant economy in vehicle operation through elimination of excessive fuel consumption and wear and tear on the vehicle drive-mechanism by an efficient clutch operation properly coordinated with gear ratio changing, all of which is accomplished by operator-manipulation of a single control means such as the accelerator mechanism for the engine.

Still other objects of my invention will become apparent from the following description taken in connection with the accompanying drawings in which:

Figure 1 is a side view of a portion of a motor vehicle showing the engine, the accelerator mechanism, the change-speed gearing, and the friction clutch operating pedal, together with associated structure embodying my invention and forming a control mechanism for the gearing and clutch which has associated therewith a fluid-coupling, the parts being in their normally inoperative positions with the friction clutch fully engaged, the accelerator mechanism released in engine idling position and the change-speed gearing in neutral condition;

Figure 2 is a perspective view of the gear shifting lever and associated indicator dial at the upper end of the steering column adjacent to the steering wheel;

Figure 3 is an enlarged view of the outside of the gearing housing showing the various parts mounted thereon, said parts being in positions corresponding to the neutral condition of the gearing;

Figure 4 is a top view of the change-speed gearing and parts of the control mechanism therefor, the gearing casing being broken away to disclose the gearing arrangement and clutch control mechanism, said gearing being in neutral condition;

Figure 5 is a view similar to Figure 4 but showing the parts and the gearing in high speed;

Figure 6 is a view similar to Figure 5 with the gearing parts in reverse gear ratio;

Figure 7 is a longitudinal sectional view showing the gearing, the friction clutch, and the fluid-coupling, the clutch being engaged and the gearing in neutral condition;

Figure 8 is a sectional view taken on the line 8—8 of Figure 4;

Figure 9 is a sectional view taken on the line 9—9 of Figure 4 showing details of the yieldable force-transmitting connection between the shift-actuating shaft and associated shifting fork;

Figure 10 is a sectional view taken on the line 10—10 of Figure 4, showing the detent mechanism associated with the low and high shifting fork, said shifting fork being in a position corresponding to low speed;

Figure 11 is a view similar to Figure 10 but showing the position of the parts when the gear shifting fork is in its high speed;

Figure 12 is a sectional view taken on the line 12—12 of Figure 4 showing the detent mechanism associated with the reverse and forward range gear shifting fork, said parts being in positions corresponding to the neutral condition of the gearing;

Figure 13 is a sectional view similar to Figure 12, but showing the parts when the gear shifting fork is in the position to obtain the forward range of speeds;

Figure 14 is a view similar to Figure 12, but showing the parts when the gear shifting fork is in the position to obtain reverse speed;

Figure 15 is a normal view of the yieldable force-transmitting connection between the power cylinder piston rod and the low and high speed shifting fork together with a plunger for controlling the interrupter control switch for the solenoid operated valve of the clutch operating servomotor, said view being taken from the inside of the casing with the casing being broken away and the parts in the positions corresponding to the low speed setting of the forward range;

Figure 16 is an operated view of Figure 15 showing the shifting motor piston rod moved relatively to the shifting mechanism and associated gear element while under torque load in low gear ratio as accommodated by the yieldable force-transmitting connection therebetween to thus cause disengagement of the vehicle friction clutch prior to completion of a shift to high gear;

Figure 17 is another operated view of Figure 15, showing the parts in the positions when the shifting fork is in high speed position of the forward range;

Figures 18, 19, and 20 are detailed sectional views showing relative positions of the pin and slot connection between the shift actuating shaft and associated shifting fork, said positions corresponding to the conditions shown in Figures 15, 16, and 17, respectively;

Figure 21 is a longitudinal sectional view of a modified yieldable force-transmitting connection which can be employed as a substitute for the structure shown in Figure 9;

Figure 22 is a sectional view taken on the line 22—22 of Figure 21;

Figures 23 and 24 are sectional views similar to Figure 22, but showing the positions the parts assume when the forward range is operative and the reverse speed ratio is operative, respectively;

Figure 25 is a sectional view taken on the line 25—25 of Figure 1 showing the two manually-operated control switches mounted on the lower end of the steering column, said switches being in their open positions which correspond to neutral or "N" setting of the gear-shift lever;

Figure 26 is a sectional view taken on the line 26—26 of Figure 25;

Figure 27 is a sectional view similar to Figure 26, but showing the interrupter switch which controls the clutch controlling circuit in closed position assumed during the moving of the gear-shift lever to a change-speed gearing operative position;

Figure 28 is a view similar to Figure 27, but showing the switch in open position assumed when the gear-shift lever reaches the "R" position for reverse gear ratio;

Figure 29 is a view similar to Figure 27, but showing the switch in the open position when the gear-shift lever is moved to its "F" or forward range setting; said view also showing the other switch for the accelerator and governor-controlled circuit in its closed position;

Figure 30 is a sectional view taken on the line 30—30 of Figure 25 showing more clearly the master switch for the accelerator and governor-controlled circuit in closed position as assumed when the gear-shift lever is in its "F" or forward range setting;

Figure 31 is a sectional view taken on the line 31—31 of Figure 3 and showing the parts and switches associated with the governor;

Figure 32 is a sectional view taken on the line 32—32 of Figure 31 showing the position of the parts when the governor is at rest and the accelerator pedal is partially depressed, as shown in the first dashed line position in Figure 1;

Figure 33 is a view similar to Figure 32, but showing the accelerator-controlled part in the position corresponding to released position of the accelerator pedal;

Figure 34 is a view similar to Figure 32, but showing the governor in a position wherein high speed drive is ready to be obtained, said accelerator mechanism-controlled part remaining in the position corresponding to partial depression of the accelerator pedal;

Figure 35 is a view similar to Figure 34, but showing the parts in positions after high speed has been obtained, the accelerator pedal-controlled part being now in a position corresponding to full release of the accelerator pedal;

Figure 36 is a view of some of the parts shown in Figure 35 showing them in positions for obtaining low speed drive when the speed of the vehicle has decelerated to or below a predetermined speed; the gearing, however, remaining in high speed drive due to the released position of the accelerator mechanism;

Figure 37 is a sectional view taken on the line 37—37 of Figure 31;

Figure 38 is a sectional view taken on the line 38—38 of Figure 37;

Figure 39 is a view of the parts shown in Figure 38, together with certain parts of the accelerator mechanism showing the conditions present when the accelerator is fully depressed to close the "kick-down" circuit;

Figure 40 is a sectional view taken on the line 40—40 of Figure 3 showing the solenoid-controlled valves and the friction clutch controlling interrupter switch associated with the gear shifting power cylinder and the piston rod thereof;

Figure 41 is a sectional view of one of the solenoids shown in Figure 40;

Figure 42 is a sectional view taken on the line 42—42 of Figure 41;

Figure 43 is an enlarged view of the piston rod clutch controlling switch shown in Figure 40, said switch being in open position;

Figure 44 is a sectional view taken on the line 44—44 of Figure 43;

Figure 45 is a sectional view taken on the line 45—45 of Figure 43;

Figure 46 is a sectional view taken on the line 46—46 of Figure 40, said view showing the primary friction clutch controlling switch in closed position assumed when the piston rod is initially moved to cause disengagement of said clutch;

Figure 47 is a sectional view taken on the line 47—47 of Figure 8 showing the clutch operating servomotor and its control valve;

Figure 48 is an enlarged view of the bleed-off valve associated with the servomotor shown in Figure 47;

Figure 49 is a view showing the auxiliary butterfly valve for closing the intake of the engine during the kick-down shifting operation, said valve being in open position corresponding to the released position of the accelerator as shown in reduced scale;

Figure 50 is a view of structure shown in Figure 49 as seen on the line 50—50 of Figure 49;

Figure 51 is a sectional view taken on the line 51—51 of Figure 49;

Figure 52 is a view similar to Figure 49, but showing the auxiliary butterfly valve in closed position corresponding to fully depressed position of the accelerator pedal;

Figure 53 is a view showing the cushion spring associated with the accelerator pedal, said pedal being in released position wherein the cushioning spring is in normally compressed condition;

Figure 54 is a view showing the accelerator pedal in its fully depressed position wherein the cushioning spring is additionally compressed;

Figure 54A is a perspective view of the accelerator-controlled switch actuator employed in the control of the power-shifting;

Figure 55 is a diagrammatic view of the vehicle power drive system shown structurally in Figures 1 to 54A inclusive, but depicting particulars of the associated electrically operated valving and control circuits therefor. The position of the parts show the gear-shift lever initially moved from neutral toward forward driving position to cause energization of the control valve which is shown at the instant of opening wherein the clutch motor itself is insufficiently energized to disengage the friction clutch. De-energized portions of the electrical control circuits illustrated in this figure are indicated in dotted outline;

Figure 56 is a diagrammatic view similar to Figure 55, de-energized portions of the control circuit being shown in dotted outline, but showing the parts in the positions assumed during shifting from low speed to high speed, the friction clutch being disengaged, the accelerator pedal released, and the gear shifting power cylinder initially moved to bring about the selected shift;

Figure 57 is a view of a modified control mechanism in which mechanically-controlled valves have been substituted for the electrically-controlled valves shown in the embodiment disclosed in Figures 1 to 56, inclusive, the parts of said modified mechanism being shown in the neutral condition of the gearing with the accelerator pedal fully released;

Figure 58 is a sectional view taken on the line 58—58 of Figure 57;

Figure 59 is a sectional view taken on the line 59—59 of Figure 58;

Figures 60, 61 and 62 are views similar to that of Figure 59, but showing, respectively, the positions of the governor and accelerator-controlled parts when the gearing is in low gear ratio with the accelerator pedal partially depressed, when the gearing is in high gear ratio with the accelerator pedal fully released, and when the gearing is in high gear ratio with the accelerator pedal fully depressed to obtain low speed ratio, respectively;

Figure 63 is a view taken on the line 63—63 of Figure 58;

Figure 64 is a view taken on the line 64—64 of Figure 58 showing the selector control valve mechanism in the position corresponding to low gear ratio condition;

Figures 65 and 66 are views similar to Figure 64, but showing the valve in shut-off position and in high gear ratio position, respectively;

Figure 67 is a sectional view taken on the line 67—67 of Figure 58;

Figures 68 and 69 are views similar to Figure 67, but showing the parts in conditions corresponding to the valve positions shown in Figures 68 and 69, respectively;

Figure 70 is a longitudinal sectional view of the friction clutch operating servomotor and the suction-operated control valve therefor, said valve being shown in the position determined by a setting of the gear-shift lever;

Figure 71 is a view of the control valve shown in Figure 70 when said valve is in its other position as determined by a position of the gear shifting power cylinder rod;

Figure 72 is an enlarged view of the atmospheric intake valve associated with the clutch operating power cylinder;

Figure 73 is a perspective view of the shifting motor control valve element and a portion of the accelerator-controlled actuator therefor;

Figure 74 is a broken away sectional view of the two gear shifting lever-operated control valves mounted on the lower end of the steering column, said valves being in their closed positions corresponding to neutral or "N" setting of the gear-shift lever;

Figure 75 is a view taken on the line 75—75 of Figure 57 with certain parts being shown broken away;

Figure 76 is a sectional view taken on the line 76—76 of Figure 75 showing the clutch controlling interrupter valve in the position corresponding to neutral setting of the gear-shift lever;

Figure 77 is a sectional view similar to Figure 76, but showing the valve in the position corresponding to the forward range setting of the gear-shift lever;

Figure 78 is a view similar to Figure 76, but showing the valve in the position corresponding to reverse gear ratio setting of the gear-shift lever;

Figure 79 is a sectional view taken on the line 79—79 of Figure 75 showing the gear shifting lever-controlled master shut-off valve in the position corresponding to neutral setting of the gear-shift lever;

Figure 80 is a sectional view showing the clutch controlling valve associated with the piston rod of the gear shifting power cylinder, said piston rod being in the position corresponding to low speed drive;

Figure 81 is a view similar to Figure 80, but showing the parts in the positions corresponding to high speed drive;

Figure 82 is a sectional view taken on the line 82—82 of Figure 81;

Figure 83 is a sectional view taken on the line 83—83 of Figure 80;

Figure 83A is a perspective view of the accelerator-controlled valve or switch actuator employed in the modified control mechanism of Figure 57;

Figure 84 is a diagrammatic view showing the connected relationship of principal parts of the modified control structure disclosed in Figures 57 to 83, inclusive, said parts of the control mechanism being in positions corresponding to neutral condition of the gearing with the primary friction clutch engaged and the accelerator pedal released;

Figure 85 is an enlarged view of the governor equipped with a regulating device for varying its operation;

Figure 86 is a side view showing a modified combined governor-accelerator switch control means which can be employed in a control mechanism of the type shown in Figures 1 to 56, inclusive, wherein it is desired to eliminate the fluid-coupling and employ only a friction clutch with the gearing, the parts shown being in positions corresponding to the governor at rest and the accelerator pedal partially depressed;

Figure 87 is a section through the structure shown in Figure 86, particularly showing the throttle locking means in its released position and the accelerator mechanism positioned in its engine-controlling position;

Figure 88 is a view similar to Figure 87 with the parts shown in positions corresponding to the accelerator pedal partially depressed and the governor conditioned to obtain high speed (direct drive);

Figure 89 is a view showing the position of the parts in Figure 86 when high speed has been obtained.

Figure 90 is a view showing the position of the parts in Figure 86 when low speed has been obtained by the full depression of the accelerator pedal;

Figure 91 is a horizontal sectional view taken on the line 91—91 of Figure 86;

Figure 92 is a sectional view taken on the line 92—92 of Figure 91;

Figure 93 is a perspective view of the fixed contact part of the switch operated by the accelerator mechanism;

Figure 94 is a view of an accelerator mechanism locking means which is to be employed with the modified structure of Figure 86, the parts being shown in the fully released accelerator position;

Figure 95 is an enlarged view of some of the parts of the locking means shown in Figure 93;

Figure 95A is a perspective view of the accelerator-controlled valve or switch actuator employed in the control mechanism of Figure 86;

Figure 96 is a diagrammatic view of the modified control system, various inoperative portions of the electrical control circuit being shown in dotted outline, embodying the modified structure shown in Figure 86;

Figure 97 is a side view of a further modified governor-accelerator control means for a control mechanism similar to that shown in Figure 84 but to be used with a gearing having no fluid-drive associated with the friction clutch, said control means acting to control valves instead of switches;

Figure 98 is a side view, partly in section, of the control means shown in Figure 97 with the parts in positions corresponding to the accelerator in its fully released position and the governor at rest;

Figure 99 is a view similar to Figure 98 but showing the parts in positions corresponding to partial depression of the accelerator pedal with low gear ratio established;

Figure 100 is a view similar to Figure 98 but showing the parts in the position corresponding to released position of the accelerator pedal and high gear ratio established;

Figure 101 is another view similar to Figure 98 showing the parts in the positions corresponding to the full depression of the accelerator pedal to obtain low speed ratio;

Figure 102 is a sectional view taken on the line 102—102 of Figure 97; and

Figure 103 is a diagrammatic view of the entire control mechanism in which is embodied the structure shown in Figures 97 to 102, which eliminates the fluid-coupling drive 18 between the engine 1 and friction clutch 19, as shown in the control mechanism of Figure 84, the parts being shown in neutral position of the gearing with the accelerator pedal released and the primary friction clutch engaged.

CHANGE-SPEED DRIVE AND CONTROL MECHANISMS (Figures 1 to 56 incl.)

Referring to the drawings in detail, and first to the control mechanism shown in Figures 1 to 56, inclusive, there is shown in Figure 1 the usual internal-combustion engine 1 for supplying power to drive the vehicle. This engine is provided with a foot-controlled accelerator mechanism which comprises a pedal 2 connected to an arm 3 of a three-armed lever pivotably mounted on the engine, the connection between the pedal and said lever comprising a rod 4 having a head 5 associated with the pedal. Between this head and the pedal is a cushioning coil spring 6, shown in detail in Figures 53 and 54. Another arm 7 of the three-armed lever is connected by a rod 8 to a butterfly valve 9 associated with the carburetor 10 of the engine. This butterfly valve is mounted on a shaft 11, the outer end of which carries an arm 12 to which the rod 8 is connected. When the pedal 2 is in its fully released position, as shown in Figures 1, 49 and 56, the butterfly valve 9 will be in its closed or engine idling position. When the pedal 2 is depressed, the butterfly valve will be opened, thus causing more fuel to be fed to the engine and consequently the engine speeded up. A spring 13 is associated with the three-armed lever for normally biasing the accelerator mechanism to its engine idling released position as determined by the adjustable stop screw mounted in the upper angular end of arm 12, which engages a lug extending laterally from the body of the carburetor in the path thereof. A third arm 14 of the three-armed lever has connected thereto a rod 15 which is employed to operate certain elements of the control mechanism to be hereinafter referred to. In all schematic electrical diagrams, such as Figure 55, the energized and deenergized conditions of the various circuits are depicted in solid and dash lines, respectively.

As best seen in Figure 7, the crankshaft 16 of the engine is connected to a gearing driving shaft 17 through a fluid-coupling 18 and a friction clutch 19. The fluid-coupling shown is the well known Foettinger type. The friction clutch is of the usual or any suitable construction, being illustrated as comprising a driving member secured to the fluid-coupling, and a driven member 20 slidably splined to the gearing driving shaft 17, said members being adapted to be biased by spring means for rotation together in drive torque transmitting relation, and to be separated to interrupt said drive by actuating arm 21 secured to a clutch actuating shaft 22 journaled transversely in the forward end of a casing member 23 employed to enclose a part of the clutch and also provide a casing for the change-speed gearing, generally indicated by the numeral 24. The casing 23 is bolted to a casing 25 which encloses the fluid-coupling, said latter casing in turn being secured to the engine. The drive torque interrupting function of the aforementioned friction clutch 19 constitutes, by way of example, a specific means for interrupting application of torque on the gearing drive mechanism to facilitate changing the effective drive thereof.

The change-speed gearing with which my control means is to be employed is of a type which has two forward speed ratios (referred to as the forward range of speed ratios) and a reverse speed ratio, and is in the nature of an improvement in the change-speed gearing per se shown in my U. S. Patent No. 2,327,063 issued August 17, 1943, wherein gear means is shiftable to establish reverse speed separate from the single slidable gear-clutch element adapted to connect the sleeve to the driven shaft to thus establish a forward driving range comprising two different gear ratios, while the improved change-speed gearing of the present invention is capable of providing the two-speed forward range drives and reverse speed by selective slidable movements of a single double-clutch element from a common disconnecting position (neutral) to either of two connecting positions; namely, forward and reverse to thus establish forward drive or reverse gear. The gearing driving shaft 17 is journaled in a partition 25' in the casing 23 and on the inner end of this shaft there is provided an integral gear 26 and toothed clutch element 27. The gear 26 is in constant mesh with a gear 28 formed integrally with a countershaft 29. Also integral with this countershaft is a low speed gear 30 and a reverse speed gear 31. In axial alignment with the driving shaft 17 is a driven shaft 32 extending through the rear end wall of the casing 23. The forward end of this driven shaft is piloted in the driving shaft 17 and the rear end of the shaft is connected through the usual universal joint (not shown) for driving the propeller shaft and wheels of the vehicle. The forward portion of the driven shaft 32 is of reduced diameter and mounted thereon is a sleeve 33 having a clutch element 34 on its rear end. The sleeve adjacent the gear clutch element 34 has rotatably mounted thereon a low speed ratio gear 35 in constant mesh with the low speed gear 30 on the countershaft. The low speed gear 35 carries an integral toothed clutch element 36 on its forward face which is opposed to the integral toothed clutch element 27 on the rear end of the driving shaft. Between the clutch elements 27 and 36 is a slidable double dental clutch element 37 which is employed to selectively connect the driving shaft 17 and gear 35 to the sleeve 33. This double clutch element is slidably splined on a collar 38 which is splined to the sleeve 33 and positioned between the clutch elements 27 and 36. There is also associated with the double clutch element 37 and the clutch elements 27 and 36 the usual synchronizing means which is a well-known construction and need not be described in detail. In the practical commercial manufacture of such synchronizing assemblies sufficient clearance is left between the opposed synchronizing cone clutch portions as 36' formed upon the gear hubs and the complementary cupped synchronizing clutch portions as 37' to prevent any danger of dragging of the synchronizing clutch parts when clutch element 37 is in the neutral position. Because of this fact and on account of accumulated tolerances the total lost-motion between the shaft actuating mechanism for the double clutch element 37 and the clutch element itself may be considerable. Predetermined relative motion of a yielding character is preferably provided between such double-clutch element and its shaft actuating means for purposes and in a manner which will presently be described.

The driven shaft 32 rearward of the reduced portion has splines 39 and to the rear of the splines is rotatably mounted a reverse gear 40 provided on its forward face with a clutch element 41. As best seen in Figure 8, gear 40 constantly meshes with an idler gear 42 journaled on a shaft 43 in the housing, said gear 42 also constantly meshing with the reverse gear 31 on the countershaft. Slidably mounted on the splines 39 is a second dental double clutch or speed control element 44 which is adapted to have a forward speed range position for engaging the toothed clutch element 34 to connect the sleeve 33 to the driven shaft to thus establish automatic control of low and high forward speeds and a rearward position for engaging the toothed clutch element 41 to connect the reverse gear 40 to the driven shaft to thus establish reverse drive, for example, which finds reasonable equivalence, in the patent sense of the disclosure, as a first speed forward drive. The control element 44 also has a central or neutral position which is shown in Figure 7. In such position neither the sleeve 33 nor the gear 40 is connected to the driven shaft. The clutch element 44 also finds equivalence, in the patent sense of the disclosure, as a transmission drive or speed control element, which by way of example, could be a valve or a switch adaptable by anyone skilled in the art to control the establishing of the aforesaid transmission drive conditions; namely, first speed or reverse, neutral and automatic second and high speed drives, which will be hereinafter fully described.

The casing 23 is provided with a cover plate 45 and journaled in the forward end thereof is a shaft 46, the outer end of which is provided with an arm 47. As best shown in Figures 4, 5, 6, 9 and 15 to 20 the inner end of this shaft has loosely mounted thereon a sleeve 48 which carries an arm 49 having journaled in its upper end a shifting fork 50 for shifting the double clutch element 37. The sleeve 48 is provided with a slot 51 in which is received an undersized pin 52 carried by the shaft 46. This pin and slot connection provides additional relative motion between the shaft and the arm 49 carrying the shifting fork and enables the shaft to have limited relative rotation prior to moving the sleeve 48 and arm 49 to shift the double clutch element 37 from one operative position to its other operative position. Associated with the shaft 46 and the arm 49 is a hairpin-shaped leaf spring 53, the body of which is secured to the shaft and the ends of which cooperate with opposite sides of the shifting fork carrying end of the arm 49. The spring is arranged to bias the arm and shifting fork so that the pin will normally be centralized with respect to the slot, as best shown in Figures 18 and 20. These conditions will be present when the shifting fork is positioned so that the double clutch element 37 is in either of its operative positions, as shown in Figures 5 and 6. Thus, with the double clutch element 37 operative, the arm 47 may have limited relative movement with respect to said element before moving the shifting fork and the double clutch element toward their other gear operative position. The spring 53 associated with the pin and slot connection above referred to and described form a yieldable force-transmitting means between the actuating shaft 46, and shifting fork 50, or between the shaft 60 and shifting fork 62. This connection provides limited relative movement between the actuating shaft and shifting fork whereby the relative movement functions to induce shifting movement of said fork and connected transmission gear element and also cause interruption of torque load to facilitate actual-shifting of the transmission element.

The fluid-coupling 18 always tends to rotate substantially at engine speed, and as a result, a certain degree of "drag" torque prevails even with the engine idling. Therefore, in order to facilitate gear changing operations behind the coupling, a motor-power operated friction type cut-off clutch 19 is provided between the coupling 18 and associated transmission 24. Disengagement of said clutch being responsive to limited hand or motor power actuated gear shift-inducing movements provided by the relative movement functioning of the yieldable force transmitting connection between the shift actuating means aforesaid and their respective shiftable clutch elements of the transmission gearing prior to actual movement of said elements.

It is to be noted that the use of motor-power or lever actuating means for the clutch elements 37 and 44 having a stroke which is no longer than is required to shift such clutch element, plus the inter-position of the positively limited yieldable force-transmitting connecting means, including the spring 53 (or the spring 235 in the modified embodiment of Figures 21, 22, etc.), presents a novel combination having shift operative effects that are believed to be new and important. It will be appreciated that the effort required to be exerted upon element 37 or 44 through the shift-actuating force in order to bring about synchronization during shifting and before final movement of the clutch teeth into engagement will vary in accordance with the relative speeds of the transmission gears, and the degree of "drag" torque on the gearing which may also vary over the life of the transmission due to wear of the parts and the "slip" characteristic of both the clutch 19 and fluid-coupling 18 while the engine is idling. With the improved construction herein disclosed, if the blocker-synchronizer assembly 37 or clutch element 44 meets substantial resistance, spring means 53 will be fully flexed and the pin 52 will strike the end of the slot 51. The same action would occur if no synchronizer were used as in the case of clutch element 44; that is, movement of the clutch element would be arrested by abutment of teeth until substantial synchronization occurred, but upon synchronization, positive engagement of the clutch elements would be effected solely by the spring, the shifter cylinder 69 or lever 65 as the case may be, having already reached the end of its stroke. Upon disengaging effort also, no movement of either of the slidable clutch elements will occur while the elements are under torque load, and the pin will strike the end of the slot. Thereafter, in the case of power-shifting, the motor shifting cylinder 69 will act directly upon the blocker-synchronizer to supplement the relayed-shifting force through the spring acting on said synchronizer to complete the synchronizing operation only of the full shifting movement of said synchronizer assembly 37, but the shifting motor means is preferably of an inherently resilient or yieldable character, as shown, and accordingly no damage results from such direct actuation notwithstanding a fixed maximum shifting effort is exerted thereby. The stroke of the power cylinder piston, the arrangement of the spring 53, and the length and positioning of the pin-and-slot connection are so inter-related that the spring resumes its normal (but pre-stressed) condition as the clutch teeth reach fully engaged positioning. This will be apparent upon examination of related Figures 17 and 20 of the drawings.

As shown in Figures 4, 9, 10 and 11, the shaft 46 has associated therewith a detent mechanism for yieldably holding the shaft in its two operative positions corresponding to the operating positions of the double clutch element 37. This detent mechanism comprises a sleeve 54 slidably keyed on the shaft and acted upon by a coil spring 55 to bias it toward the cover plate 45. Adjacent the cover plate is a disc 56 which is secured by studs to a boss on the cover plate. The inner end of the sleeve is provided with a plurality of circumferentially spaced holes 57, and the adjacent surface of the disc also has a plurality of recesses 58. Fixed in the holes 57 are steel balls 59 which are arranged to cooperate with the recesses 58. When the balls are in the recesses they will be so held by the action of the spring 55. Before they can be rotated out of the recesses it will be necessary to compress the spring 55. Thus it is seen that the balls, recesses and springs cooperate to provide a yieldable means for maintaining the shaft in its two operative positions.

The rear end of the cover plate also has journaled therein a shaft 60, the outer end of which has secured thereto an arm 61. The inner end of this shaft is adapted to operate a shifting fork 62 which is employed to shift the double clutch-control element 44, previously referred to, for selectively connecting the sleeve 33 and the gear 40 to the driven shaft. The yieldable force-transmitting means for connecting the shaft to the shifting fork are identical with that described for connecting the shaft 46 to the shifting fork 50 and the parts of the structure are, therefore, designated by the same reference numerals for the purpose of simplicity. The outer end of the shaft 60 also has associated therewith a detent mechanism which is the same as the detent mechanism associated with the shaft 46 and the parts thereof are designated by the same reference numerals. The recesses in the disc with which each ball cooperates are three in number in order to provide the three positions for the double clutch element 44, said positions being the neutral position shown in Figure 7, the reverse gear position shown in Figure 6, and the forward range automatic position shown in Figure 5.

Referring now to Figures 1 and 2, the arm 61 on the outer end of the shaft 60 is connected by a rod 63 to a shift control shaft 64 journaled in parallel relation with the steering column 64'. The lower end of this shaft 64 has secured thereto an arm 66 with which the rod 63 is connected. The upper end of the shaft 64 has secured thereto a gear shifting lever or handle 65 which extends outwardly in a plane beneath the steering wheel 66' at the upper end of the steering column, this lever being employed to rotate the shaft 64 to its various positions to operate the transmission control element 44. The shaft 64 also has secured thereto a pointer member 67 which cooperates with a slotted indicator dial 68 on the steering column. The end of the pointer projects through the slot and on the indicator adjacent to the slot are indicia comprising the letters "N," "F," and "R" to designate neutral, forward automatic range and reverse drives. When the gear-shift lever is in its central position wherein the pointer is opposite "N," the clutch-control member 44 will be in its inoperative position, as shown in Figure 7, and the gearing will be in neutral. If the lever is moved to place the pointer opposite "R," the drive control element 44 will be shifted rearwardly so as to connect the gear 40 to the driven shaft, thus establishing reverse speed ratio. If the gear shifting lever should be moved so that the pointer is opposite "F," the speed control clutch element 44 will be moved forwardly and the sleeve 33 will be connected to the driven shaft to establish the automatic forward range of speeds which are selectively controlled by the position of the fluid-pressure controlled clutch-control element 37. The double clutch element 44 is of such length plus accumulated tolerances that it can have a predetermined lost-motion idle movement in each direction from its central position before the teeth thereof engage. The purpose of this free movement will later become apparent.

The arm 47 secured to the outer end of the shaft 46 is employed to control the shifting of the double clutch element 37 and is arranged to be operated by a motor-power operated means, or shift-actuator in the form of a power cylinder or servomotor of the fluid-pressure type, generally indicated by the numeral 69. The forward end of this power cylinder is yieldably mounted on a bracket 70 secured to the casing 23. The power cylinder has a closed cylinder 71 and reciprocal in this cylinder is a piston 72 (see Figure 3). This piston is connected by a piston rod 73 with the arm 47 on the outer end of the shaft 46. When the piston of the power cylinder is in the forward end of the cylinder 71 the arm 47 will be moved to the position shown in Figures 4, 6 and 15 so that the double clutch element 37 will be in a position to connect the low gear 35 to the sleeve 33 and establish the low speed drive of the forward range provided, of course, that the sleeve 33 is connected to the driven shaft. When the piston 69 is in the rear end of the cylinder, the arm 47 will be moved to the position shown in Figures 5 and 17, thus causing the double clutch element to assume a position wherein the driving shaft 17 is connected to the sleeve 33 to establish the high speed drive of the automatic forward range, provided, of course, the sleeve is connected to the driven shaft.

The closure plate 74 for the rear end of the cylinder 71 is in the form of a casting in which are mounted valves for controlling the connecting of the power cylinder to the source of fluid pressure different from atmosphere such being, for example, the intake manifold 81' of the engine. The closure plate 74 is provided with bores 75 and 76, as best shown in Figure 40. The bore 75 is connected by a conduit 77 to the forward end of the cylinder 71 and the bore 76 is connected by a passage 78 through the closure plate with the rear end of the cylinder. Associated with the closure plate 74 is a cap 79 having a passage 80 for connecting both bores with a conduit 81 leading to the intake manifold 81' of the engine. The end of the passage 80 which opens into the bore 75 is formed to provide a valve seat 82 and cooperating with this valve seat is a valve disc 83 controlled by a solenoid 84. The bore 75 is provided with an outlet passage 85 with which is associated a valve seat 86 also for cooperating with the valve disc 83. When the disc is on the seat 82 communication between the bore and the passage 80 will be cut off and the bore and forward end of the power cylinder will be in communication with the atmosphere. When the disc is on the seat 86, the outlet passage will be cut off and the bore and the forward end of the power cylinder will be in communication with the passage 80.

The end of the passage 80 which communicates with the bore 76 has a valve seat 82' with which cooperates a valve disc 87. The valve disc is controlled by a solenoid 88. Leading from the bore 76 is an outlet passage 89 to atmosphere and associated therewith is a valve seat 90 with which the valve disc 87 also cooperates. When the disc is on the seat 82' the passage 80 will be cut off from the bore and the bore and rear end of the power cylinder will be in communication with the atmosphere. When the disc is on the seat 90, the passage 80 will be in communication with the bore and the rear end of the power cylinder and the outlet passage will be cut off.

The two solenoids 84 and 88 are of like construction and, therefore, only one will be described. The solenoid 84 and its relation with the outlet passage 85 is shown in detail in Figures 41 and 42. The valve stem 91 to which the disc 83 is secured is formed as the armature of the solenoid and extends into the bore of a coil 92. A spring 93' normally biases the stem so that the valve disc 83 closes the passage 80. When the coil is energized, the valve disc will be moved to engage the seat 86. The coil is enclosed within a casing 93 which has a perforated flanged end 94 through which air can pass to reach the passage 85.

From the above valve arrangement it is seen that if the solenoid 84 is energized the forward end of the power cylinder will be connected to the manifold 81' thus causing the piston 72 to be moved to the forward end, air simultaneously being admitted to the rear end. This will cause the double clutch element 37 to connect the gear 35 with the sleeve. When the solenoid 88 is energized the rear end of the power cylinder will be connected to the manifold 81' and the front end of the cylinder to atmosphere. This will cause the piston to be moved rearwardly and the double clutch element 37 moved to establish a direct positive connection between the driving shaft 17 and the sleeve 33.

The friction clutch 19 is also controlled by a motorpower cylinder or clutch servo-actuator of the fluid-pressure type, said power cylinder being generally indicated by the numeral 95. This power cylinder is shown in section in Figure 47 and comprises two pan-shaped casing sections 96 and 96' within which is a flexible diaphragm 97 having its peripheral portion secured between the external confronting flanges of the casing sections and its central portion clamped between discs 98 secured to one end of a piston rod 99. The other end of this piston rod is operatively connected to a lever 100 which is secured to the outer end of the previously referred to clutch operating shaft 22 (see Figure 1). A spring 101 is associated with this lever to normally bias the arm 100 and the diaphragm of the power cylinder to a position wherein the clutch is engaged, said position being shown in Figures 1 and 47. The casing 96 of the power cylinder is pivoted by a casting 102 to a bracket 103 secured to the side of the engine. This casting 102 is provided with a bore 104 which is connected by a passage 105 with the chamber 106 on the forward side of the diaphragm. The bore also is connected by a conduit 107 with the intake manifold 81' of the engine. An outlet passage 107' is employed to place the bore in communication with the atmosphere.

In the bore is a valve disc 108 for controlling the communication between the chamber 106 and the conduit 107 or between said chamber and the atmospheric passage 107'. This disc is controlled by a solenoid 109 in which is embodied a spring 110 normally biasing the valve disc to a seated position wherein the conduit 107 is cut off from communicating with the bore 104. When the solenoid is energized the disc will be moved to a seated position wherein the atmosphere will be cut off from communication with the bore and the power cylinder chamber and the conduit 107 can communicate with the bore and said chamber to produce a sub-atmospheric pressure in the chamber and cause the diaphragm 97 to be moved forwardly to bring about the disengagement of the friction clutch 19.

The chamber 111 at the rear of the diaphragm has associated therewith a valve means 112 for controlling the flow of air from said chamber to the atmosphere and thus enable the chamber to act as a check to control the rate of engagement of the clutch upon de-energization of the solenoid 109. This valve means 112 is shown in detail in Figure 48 and comprises a cup-shaped casing 113 covering an orifice 114 in the casing section 96'. Held within the cup-shaped casing is a second cup-shaped member 115 having perforations 117 for establishing communication with the chamber 111 by way of the opening 114. Slidably mounted on this second cup-shaped member is a tubular plunger 118 provided with a valve head 119 for engaging a valve seat 120. A very light spring 121 normally biases the plunger to a valve seated position to cut off communication from atmosphere to the chamber 111. The plunger receives a needle valve 122 for controlling the orifice 123 at the inner end of the plunger, the other end of the plunger being connected to the atmosphere by drilled passages 124. The needle valve is provided with adjustable means 125 whereby it may be moved longitudinally to vary the orifice.

With the above valve means associated with the clutch operating power cylinder, it is seen that when the diaphragm is moved forwardly to disengage the clutch, air can freely enter the chamber 111 by moving the plunger and valve element inwardly against the bias of the light spring. When the chamber 106 is connected to atmosphere, so that the power cylinder can control re-engagement of the clutch, the valve element 119 on the plunger will become held seated and the movement of air from the chamber 111 must be by way of the orifice 123 which is restricted by the needle valve. The amount of restriction will control the rate at which the clutch re-engages.

The solenoid 109 is arranged to be controlled under certain conditions by the gear shifting lever and under other conditions by the operation of the servo-cylinder 69 employed in shifting the double clutch element 37. As shown in Figure 1 a conductor 126 connects the ungrounded terminal 127 of the solenoid to a terminal 128 of a switch box 129 on the steering column at the lower end of the shaft 64. Another conductor 130 leads from the terminal 131 of the switch box to a junction box 132 mounted on the under side of the floor boards in the operator's compartment of the vehicle. From this junction box a conductor 133 leads to one battery terminal of a battery 134 (see Figures 55 and 56), the other terminal being connected to ground by a conductor 135. The conductor 133 has interposed therein the usual ignition switch 136. The switch box 129 is provided with a third terminal 137 connected by a conductor 138 to a terminal 139 of a torque interrupter switch 140 mounted on the previously referred to closure plate 74 of the cylinder of the power cylinder 69, said switch 140 being associated with the boss 74' of the end plate which acts as a bearing for the piston rod. The other terminal 141 of the switch 140 is connected by a conductor 142 to the ungrounded terminal 127 of the solenoid 109 which controls the valve of the servo-cylinder 95 for the clutch 19.

The interrupter switch 140 is arranged to be controlled by the piston rod 73 of the gear shifting power cylinder 69 and the details of this switch are shown in Figures 40, 43, 44, 45 and 46. The switch has a casing 143 made of non-conducting material, said casing being screwed into the boss of the cover plate. On the casing 143 is a cover 144 held thereto by screws which form the terminals 139 and 141. These screws also hold contact members 145 and 146 which project into the casing 144. Within the casing is a plunger 147 which projects through an opening 148 in the boss so as to be received in either of two recesses 149 and 150 in the piston rod 73. The portion of the plunger within the casing carries a contact disc 151 which is insulated from the plunger and arranged to electrically connect the contacts 145 and 146 to close the switch. A spring 152 normally biases the switch to open position only when one of the recesses 149 or 150 is in registry with the inner end of the plunger 147.

When the conductor 138 is connected with the battery it will be apparent, that if the switch 140 is closed, then the solenoid 109 will be energized and consequently the clutch power cylinder 95 will be operated to disengage the clutch. The solenoid will be de-energized and the clutch 19 re-engaged whenever switch 140 is again opened. The recess 149 in the piston rod is arranged to receive the plunger of the switch whenever the piston of the power cylinder is at the forward end of its cylinder and the recess 150 is arranged to receive the plunger of the switch when the piston of the power cylinder is at the rear end of its cylinder. The conditions wherein the plunger 147 is received in the recesses 149 and 150 are shown, respectively, in Figures 15 and 17.

It is, of course, desirable that the primary clutch 19 be disengaged during the changing of speed ratios as the changing is facilitated by such clutch disengagement due to all torque being substantially relieved from the slidable positive clutch elements of the transmission. This disengaging of the aforesaid clutch before any shifting of the double clutch element 37 takes place is accommodated by the force transmitting yieldable connection between the shaft 46 and the arm 49 which carries the shifting fork, all previously described in detail. Since the arm 47 has a predetermined shift-inducing movement before the double clutch element is actually moved directly thereby to become disengaged from one clutch element and shifted toward engagement with another selected clutch element, it is seen that the plunger 147 can be moved out of a recess by this inducing movement. Such movement of the plunger will result in the switch 140 being closed. Consequently there will be a clutch disengagement during this initial movement of the power cylinder "piston" to induce a speed-change only, since the connected shifting fork 50 and associated clutch element 37 cannot be shifted thereby due to the existing torque load thereon. A disengaged clutch condition will thus prevail to facilitate such shifting. After the shift has taken place as already described by movement of arm 49 as a result of movement of the piston of the power cylinder 69 the plunger 147 will engage the other recess to cause opening of the switch and the re-engagement of the clutch 19. The relative movement condition between the shaft 49 and the shifting fork 50 will be re-established when the spring 53 relaxes to its normal prestressed condition as shown in Fig. 15 to thereby shift the double clutch element 37 into a positive gear drive condition if such is selected. By means of the switch 140 and its method of control by the piston rod of the shifting power cylinder 69, the clutch disengagement is entirely automatic and solely dependent on the operation of the shifting power cylinder. Consequently, all that needs to be controlled to bring about both the disengaging of the clutch and the shifting of the double clutch element 37 is the shifting power cylinder.

The switch box 129 mounted on the steering column contains two switches which are shown in detail in Figures 26 to 30. The terminal 131 which is connected through the junction box to the battery has associated therewith two spring contact elements 153 and 154, the former adapted to cooperate with a contact element 155 to which the terminal 128 is connected, and the latter adapted to cooperate with a contact element 156 to which the previously referred to terminal 137 is connected. The contacts 153 and 155 comprising the torque-interrupter switch are generally designated "A," and the contacts 154 and 156 comprising the master switch are generally designated "B." Both of the contacts 153 and 154 are adapted to be controlled by initial rotation of the gear-shift lever from neutral or a gear drive operating position thereof, and to accomplish this the lower end of the shaft 64 is arranged to extend into the switch box. To the extreme lower end of this shaft is connected a short shaft 129' having a collar portion 157 of non-conducting material in which is provided three notches 158, 159 and 160 for cooperation with a V-shaped portion 161 of the contact element 153. Whenever the V-shaped portion is in a recess the contacts comprising the interrupter switch A will be open and when the V-shaped portion is forced upon the portion of the collar between the recesses the switch will be closed.

When the gear-shift lever is in its "N" position the V-shaped portion will rest in the central recess 159. Consequently the switch A will be open and the conductor 128 will not be connected to the battery so as to energize the solenoid 109. This condition is shown in Figure 26. If the gear-shift lever should be moved to the "R" position to bring about manual movement of the double clutch element 44 to establish reverse gear ratio the shaft 64 will be given a clockwise rotation as viewed in Figure 26. The initial rotation will cause the V-shaped portion to ride out of the recess 159 and thus close the switch A. The closing of this switch will energize the solenoid 109 and cause the clutch 19 to be disengaged. Only a small initial movement of the lever from the "N" position is required to bring about this switch closing. During this switch closing movement of the gear-shift lever there will be no movement of the double clutch element 44 due to the yielding of the force-transmitting connection between the shaft 60 and the gear shifting fork 62, already referred to. Continued movement of the gear-shift lever toward the "R" position will maintain an uninterrupted manual-shifting force on said clutch element 44 to sequentially synchronize said clutch element with toothed element 41, and shift it into positive engagement therewith to thus establish reverse speed drive. The switch will remain closed during the establishing of reverse drive as aforesaid, since the V-shaped portion will ride on the portion of the collar between the central notch 159 and the end notch 161, as shown in Figure 27. After the gear shifting lever reaches the "R" position, the V-shaped portion 161 of the contact will drop into the notch 160 (see Figure 28), thus opening the switch A and de-energizing the solenoid so as to accommodate re-engagement of the clutch. When the gear shifting lever is moved back to the "N" position the switch A will be first closed to disengage the clutch, the reverse speed ratio will be neutralized and the switch A again opened so that the primary clutch 19 can re-engage automatically.

When the gear-shift lever is moved from the "N" position to the "F" position, the switch A will first be closed by the V-shaped portion riding out of notch 159. This will energize the solenoid 109 and cause the clutch to be disengaged. As the gear-shift lever continues to be moved, the double clutch-control element 44 will be moved forwardly to establish the forward automatic range of speeds by connecting sleeve 33 to the driven shaft 32 in the same manner as described for obtaining reverse speed. The last portion of the movement of the gear shifting lever will cause switch A to open and the clutch to be re-engaged. Return movement of the gear-shift lever from the "F" to the "N" position results in automatic clutch disengagement, a disconnection of the sleeve 33 from the driven shaft 32 and then automatic clutch re-engagement.

On the short shaft 129' adjacent the collar portion 157 is a second collar portion 162 having a cam surface 163 for controlling the switch B comprising the contact elements 154 and 156. The cam surface is so arranged that the switch will be open when the gear-shift lever is in the "N" and "R" positions and will be closed when the gear-shift lever is moved to the "F" position. When the switch B is closed the conductor 138 will be connected to the battery and since this conductor is connected to one terminal of the switch 140 a circuit to the solenoid 109 will be conditioned so as to be under the control of the switch 140. Since the switch A becomes open when the switch B is closed, the arrangement is such as to change the control of the solenoid 109 from the manually-controlled circuit to a parallel governor- and accelerator-controlled circuit. The closed condition of the switch B is shown in Figure 30, which corresponds to the gear-shift lever being placed in the "F" position.

The rear portion of the change-speed gearing casing is provided with an integral auxiliary casing 164 having a compartment 165 in which is positioned a speed-responsive valve control device or governor, generally indicated by the letter "G," which is shown in detail in Figures 8 and 31 to 35. The casing 164 is closed by a cap 166. In this cap and the lower part of the casing is journaled a vertically positioned shaft 167. The lower end of the shaft which extends through the lower part of the auxiliary casing and into the gear casing 23 has secured thereto a beveled gear 168 meshing with a beveled gear 169 which is mounted on an angularly positioned shaft 170 journaled in the transmission casing. This shaft carries a second gear 171 which meshes with a gear 172 secured to the driven shaft 32 of the gearing. Thus the shaft 167 of the governor will be constantly driven by the driven shaft of the gearing.

The shaft 167 has secured thereto a cross pin 173 on which is pivotally mounted two centrifuge members 174 and 175. These centrifuge members are connected by links 176 and 177 to a slidable insulated sleeve 178 positioned on the upper end of the shaft 167. A coil spring 179, in surrounding relation to the shaft 167, acts upon the sleeve to normally bias it upwardly and to also bias the centrifuge members to positions closely adjacent to the shaft 167. Slidably mounted for limited movement upon a reduced diameter of the shaft 167 above the sleeve 178 is a collar 180 which is provided with an insulated groove 181. A coil spring 182 positioned between this collar and the cap normally biases the collar toward engagement with the sleeve so that the collar will follow the sleeve movement when free to do so until it contacts the shoulder formed at the lower end of the reduced diameter with the normal diameter of shaft 167.

The upper end of the sleeve 178 is provided with a flange 183 for engaging and operating under certain conditions one end of a bell crank contact lever 184 pivotally mounted in the upper end of the chamber 165 of the auxiliary casing by means of a pin 185. The other end of this bell crank lever carries a contact element 186 which cooperates with a stationary contact element 187 mounted in the cap 166. A light coil spring 185' normally biases the lever to a position to close the contacts. The outer end of the contact element 187 is insulated from the cap and it has a terminal 188 on the outer side of the cap. To this terminal is connected a conductor 189 which leads to the ungrounded terminal of the coil of the previously referred to solenoid 84 which controls the valve for connecting the engine intake manifold 81' to the forward end of the shifting power cylinder 69.

As best shown in Figure 31, the pin 185 on which the bell crank lever 184 is pivoted extends to the exterior of the cap 166 and is provided with a terminal 190. This pin is suitably insulated from the cap. A conductor 190' leads from the terminal 190 to a terminal 191 which is mounted in the forward wall of the cap 166. The inner end of this terminal member is provided with a contact element 192 (see Figure 37). Also in the forward wall of the cap 166 is a second terminal member 193 which is positioned directly above the terminal 191 and the inner end of this terminal is provided with a contact element 194. The terminals 191 and 193 are suitably insulated from the cap.

The cap 166 also has mounted in its side wall a pin 195 insulated from the cap and provided on its outer end with a terminal 196. The pin 195 is positioned forwardly of the governor shaft 167 and rotatably mounted thereon is a U-shaped element 197, one arm 198 of which extends rearwardly and carries a pin 199 which is adapted to extend into the annular groove 181 of the collar 180. The other arm 200 of the U-shaped member is provided with a V-shaped end having an apex 201. The pin 195 has secured thereto a spacer sleeve 202 between the two arms, and associated with this spacer sleeve is a hairpin-shaped leaf spring 203 having ends 204 and 205 which extend upwardly above the sleeve. A double arm switch lever 206 is positioned between the sleeve and the arm 200 and is freely pivoted on the pin 195. This double arm lever carries a pin 207 which is received between the arms 204 and 205 of the spring in order that the double arm lever may be biased to a vertical open contact position. The opposite ends of the double arm lever carry lateral flexible extensions 208 and 209 which are provided respectively with contacts 210 and 211, the contact 210 being arranged to engage with the previously mentioned contact 194 fixed to the forward wall of the cap, and the contact 211 to engage with the previously mentioned fixed contact 192 positioned below the contact 194. The arrangement of the double arm switch with the fixed contacts provides a double throw switch for alternately connecting the terminals 191 and 193 with the terminal 196.

The terminal 193 is connected by a conductor 212 with the ungrounded terminal of the solenoid 88 which controls the valve for connecting the rear end of the shifting power cylinder 69 with the manifold 81'. The terminal 196 at the outer end of the pin 195 is connected by a conductor 213 with the previously mentioned terminal 137 of the switch B in the switch box mounted on the lower end of the steering column. This conductor 213 will thus be connected to the battery whenever the switch B is closed. When the contacts 192 and 211 are closed then the solenoid 84 will be energized; provided, of course, that the contacts 186 and 187, controlled by the bell crank lever 184, are closed. When the contacts 194 and 210 are closed, a circuit will be established to energize the solenoid 88.

During the selective closing of the aforesaid contacts 210—194 and 211—192, the extensions 208 and 209 respectively are slightly flexed from a normally unflexed position as shown in Figure 31 to achieve a degree of pre-energization of the shifting motor 69 in advance of the butterfly valve 9 closing to engine idling position for an important purpose which will presently be fully described.

The double arm switch lever 206 is arranged to be operated by the accelerator mechanism, and to accomplish this there is slidably mounted in the cap 166 a switch actuator "AC" comprising a rod 214, the forward end of which is operatively connected by a link 215 to one arm of a bell crank lever 216 pivotally mounted on the upper forward corner of the cover plate 45 of the gearing casing. The other arm of this bell crank lever is operatively connected to the previously referred to rod 15 operatively connected to be moved with the three-armed lever forming a part of the mechanical connection between the accelerator pedal and the butterfly valve 9 of the carburetor. A suitable dust excluding boot is associated with the outer end of the rod 214. The inner end of the rod 214 has pivotally mounted thereon a selector finger 218, and carried by the swinging end thereof is an insulated lateral pin 219 for actuating the double arm switch lever 206 (see perspective view shown in Figure 54A). The finger at its pivoted end has cooperating therewith a leaf spring 217 carried by the rod 214, this spring acting to normally yieldably hold the finger in horizontal axial alignment with the pivotal axis of the rod. The finger and the pin 219 are so located that the pin can cooperate with recesses 220 and 221 on opposite sides of the pivot of the double arm lever 206. Thus, if the pin should be guided into the recess 220 during forward movement of the rod 214, the double arm lever will be so rotated as to bring the contact 210 into engagement with the contact 194. If the pin 219 should be guided into the recess 221 on forward movement of the rod 214, the double arm lever will be so rotated as to bring contact 211 carried by the double arm lever into engagement with the fixed contact 192. The connection between the actuator AC and the accelerator-operated throttle linkage is such that the actuator will be pulled forwardly and the double arm lever actuated to selectively close one of the sets of contacts; i. e., contacts 210—194 or 211—192, whenever the accelerator pedal is placed in an engine controlling position wherein the butterfly valve 9 of the carburetor 10 has virtually assumed its engine idling position which will correspond to the fully released position of said accelerator when reached. Upon the throttle valve 9 reaching its engine idling position as aforesaid, a rapid automatic shifting operation will ensue between low and high speeds depending on the drive desired, due to the pre-energization of the shifting motor 69 preparatory to shift the double clutch element 37 the instant torque load is removed therefrom. The actuator AC is moved rearwardly and the double arm lever allowed to assume its vertical open contact position with respect to fixed contacts 192—194, whenever the accelerator pedal is depressed from its fully released engine idling position, or released from its fully depressed position to produce a rapid shift of the clutch element 37 to either its low or high drive establishing position as will be more fully described later.

The arrangement of the apex 201 on the arm 200 of the U-shaped member pivotally mounted on the pin 195 is such as to perform the selective guiding or camming of the pin 219 of the finger into the recesses 220 and 221. Since the U-shaped member 197 is operably connected to be moved by the governor, it is seen that the position of the apex 201 will be determined by the condition of the governor, and since the governor is driven by the driven shaft of the gearing, the speed of the driven shaft and the vehicle will thus be the controlling factor for the selective positioning of the apex 201. Normally when the governor is not being driven; that is, when the driven shaft of the gearing is not rotating, the apex 201 will be above the horizontal axis of movement of the pin 219 carried by the finger. Thus the pin will always be guided into the recess 221 whenever the rod 214 is moved forwardly. This will cause the contact 211 to engage the fixed contact 192. When the governor is being driven and the centrifuge members move outwardly, the sleeve 178 and the collar 180 will move downwardly and consequently the apex 201 will assume a position below the horizontal axis of movement of the finger and the pin 219. The finger will now be guided into the recess 220 of the double arm lever and the contact 210 caused to engage the fixed contact 194. Thus the selecting of the contacts to be closed will be entirely determined by the speed of the driven shaft of the gearing which, of course, will be the speed of the vehicle.

The rear end of the actuator rod 214 is formed with upstanding ears 223, and extending laterally from these ears is a pin 224, said pin also serving as a mounting means for the previously referred to leaf spring 217 which cooperates with the finger. This pin 224 is so arranged as to engage the upper arm of the double arm lever 206 and rotate the double arm lever in a clockwise direction, as viewed in Figure 38, whenever the rod 214 is moved rearwardly. This rotation of the double arm lever will bring the contact 211 into engagement with the fixed contact 192, the engagement being made whenever the accelerator pedal is operated to substantially the end of its engine accelerating range. This movement is necessary to cause the rod 214 to have such movement in a rearward direction as to bring the contacts 211 and 192 into engagement.

Since the contacts 211 and 192 can be engaged and a circuit established to bring about a change in gear ratio whenever the accelerator is moved substantially to the floor boards, it is desirable to make some provision for idling the engine during a change in speed ratio under these conditions. This is accomplished by providing an auxiliary butterfly valve for the intake passage of the engine. As best seen in Figures 49, 50, 51 and 52, the intake passage of the manifold 81' below the butterfly valve 9 has associated therewith a pivoted auxiliary butterfly valve 225 carried by a pivot pin 226 mounted in the spacer plate 10' between the carburetor and manifold. This pin also carries a gear sector 227 which meshes with a gear sector 228 pivotally mounted on a pin 229 also carried by the spacer plate 10'. The outer end of this latter pin has secured thereto an arm 230 which is provided with a specially shaped slot 231. This slot receives the pin 232 which connects the rod 8 with the arm 12 for controlling the butterfly valve 9. The slot in the arm 230 is so curved that the arm 230 will not be in any way actuated during operation of the butterfly valve 9 as a result of depressing the accelerator pedal toward the floor board. The rear portion of the slot is so curved that when the accelerator pedal approaches its extreme limit of movement toward the floor board the pin 232 causes clockwise rotation of the arm 230 through a considerable angle by only a small movement of the rod 8 and the accelerator pedal. This movement of the arm will, through the sector gears, cause the auxiliary butterfly valve 225 to assume a closed position, as shown in Figure 52, thus cutting off the intake manifold notwithstanding the main butterfly valve 9 is fully open.

In Figures 21 to 24, inclusive, there is shown a modified structure which can be employed in place of the already described relative movement yieldable means between the shafts 46 and 60 and their associated gear shifting forks 50 and 62 respectively. In the drawings, this modification is shown as being associated with a shaft 46' and the gear shifting fork arm 49', which are to take the place of the previously described shaft 46 and gear shifting fork arm 49. The shaft 46' is provided with the previously described detent mechanism for yieldably holding the shaft in its two positions. The inner end of the shaft 46' has rotatably mounted thereon the arm 49' in which the shifting fork 50 is pivoted. This arm has a flat surface 233 engaged by the top end of a T-shaped plunger 234 which is carried by the inner end of the shaft 46'. A spring 235 normally biases the plunger into engagement with the surface 233. The plunger is adapted to have limited relative movement with respect to the shaft and against the bias of the spring 235. Thus, if the shaft 46' is rotated in either direction, the plunger will yield during initial rotation thereof to accommodate a predetermined amount of relative rotation of the shaft 46' with respect to the arm before the plunger wedges against the surface 233 so that the arm 49' and the shifting fork 50 carried thereby may be directly rotated by said shaft 46'. In Figure 22 the normal condition of the plunger is shown. Figures 23 and 24 show the condition of the plunger whenever the shifting fork is to be moved from one speed ratio operative position to another speed ratio operative position. The functioning of the yieldable force transmitting means during shifting when the arm 49' is rotated is the same as that shown in Figures 15 to 20, already described. In each case, the relative movement function provided by the connection has been taken up and the arm 49 or 49' and gear shifting fork 50 are ready to be moved in unison directly by the shaft 46 when rotated.

OPERATION OF THE CHANGE-SPEED DRIVE AND CONTROLS
(*Figures 1 to 56 incl.*)

When the gear shifting lever 65 is in the "N" position the change-speed gearing will be in neutral position as shown in Figure 7. Under these conditions the double clutch-control element 44 will be disengaged from both the clutch elements 34 and 41. The fluid-pressure controlled clutch element 37 will be in a position wherein the low gear 35 is clutched to the sleeve 33. This condition will prevail when the vehicle is stopped due to the condition of the governor G. If it is not in such condition when the vehicle is brought to a stop it will assume such condition as a result of actuating the accelerator in starting the engine. The friction clutch 19 will be engaged, but no torque can be transmitted from the engine to the vehicle wheels due to the neutralized condition of the gearing. Since at idling speed of the engine the slip of the fluid-coupling is at its maximum, there will be a minimum of "drag-torque" being transmitted through the friction clutch. The governor or speed-responsive device G will be in the position shown in Figure 32, and, under these conditions, the contacts 186 and 187 will be closed. The rest condition of the governor will also result in the apex 201 being in the position above the line of the finger 218 and, consequently, when the accelerator pedal is in released condition, the double arm lever 206 will be operated by the switch actuator AC as shown in Figure 23 to thus close the contacts 211 and 192. The piston of the shifting power cylinder 69 will be at the forward end of its cylinder, thus causing the double clutch element 37 to assume the position shown in Figure 7 as already referred to. None of the electrical circuits will be closed due to the fact that both switches A and B at the lower end of the shift control shaft 64, and operated thereby, are open. The schematic view of Figure 55 shows the condition of the parts of the control mechanism when the gear shifting lever is in "N" position, the vehicle at rest and the accelerator pedal partly depressed.

If it should be desired to place the transmission in reverse speed which may also be utilized as a first speed forward drive as hereinbefore mentioned, by eliminating idler gear 42 and directly meshing gear 40 on the driven shaft 32 with a slightly increased diameter countershaft gear 31, this can be accomplished merely by moving the gear-shift lever to the "R" position. Initial rotation of the shaft 64 will close the switch A. This will energize the solenoid 109 and thus energize the clutch operating power cylinder 95 by placing it in communication with the intake manifold 81' of the engine. Consequently, the primary clutch 19 will be disengaged. During the movement of the shaft 64 to close the switch A there will be movement of the gear shift fork 62 and double clutch element 44, but the teeth will not engage due to the free movement allowed the double clutch element from its central neutral position. At the time that the switch A becomes closed, the gear shifting fork will have moved sufficiently to bring about a connection of the reverse gear 40 to the driven shaft. This will take place just before the gear-shift lever has reached its "R" position. Continued movement of the gear-shift lever is accommodated after the engagement and this will result in the switch A again being opened. The result is the de-energization of the solenoid 109, and re-engagement of the clutch 19, which re-engagement will be retarded by the valve means 112. Even though the clutch 19 is now engaged, the vehicle will not move rearwardly while the accelerator pedal is in released engine idling condition, due to the slip of the fluid-coupling. In order to move the vehicle rearwardly, all that needs to be done is to speed up the engine by depressing the accelerator pedal. To neutralize the reverse speed gear, all that needs to be done is to return the gear shifting lever to the "N" position. The initial movement of the gear-shift lever from the "R" position will close the switch A without moving the double clutch element 44 due to torque load thereon, which movement is accommodated by the yieldable relative movement connection between the shifting fork 62 and the shaft 60 which is caused to function because, as stated above, of the existing torque load on the engaged teeth. The closing of the switch A causes the power clutch-actuator 95 to disengage the friction clutch 19, and continued movement of the gear-shift lever will move the double clutch element 44 to its neutral position as shown in Figure 7. During disengagement of the gearing teeth, the yieldable relative movement connection is normalized by the spring 53 or 235 (see Figures 15 and 22). When the gear shifting lever reaches the "N" position the switch A will be opened thus causing the primary clutch 19 to re-engage automatically.

To obtain the low speed, all that is required of the operator is to move the gear-shift lever to the "F" position. This will result in the power disengagement of the clutch 19, the manual-shifting of the double clutch 44 forwardly to connect the sleeve 33 to the driven shaft, followed by automatic re-engagement of the clutch 19, all in the same manner as when the shift-lever is moved to the "R" position. The low speed drive will be established due to the fact that the double clutch element 37 is in a position connecting the gear 35 to the sleeve 33. To move the vehicle forward, it is only necessary to depress the accelerator pedal.

With the vehicle being driven forwardly with the gearing in low speed, the governor G will be operating due to its connection with the driven shaft 32. Consequently, the centrifuge members will be thrown outwardly and will assume the position shown in Figure 34 wherein the vehicle is traveling at a speed of 15 to 18 miles per hour. This condition of the governor or a condition when the vehicle speed is higher will place the apex 201 carried by an arm of the U-shaped member 197 in the position shown in Figure 34 and also in Figure 39. If now the accelerator pedal should be released, a change to the high speed drive ratio will automatically take place. The release of the accelerator pedal will result in the rod 214 and the finger 218 of the switch actuator AC being moved forwardly. The pin 219 carried by the finger will be guided by the apex to engage in the recess 220 of the double arm lever. The finger will now be operatively connected to the upper arm of the double arm lever 206 and as the accelerator pedal reaches its fully released engine idling position, the double arm lever will be given such a clockwise rotation that the contacts 210 and 194 will be closed attended by a predetermined flexing of the extension 208 to substantially a right-angled position with respect to the side of the lever 206, as shown in Figure 35. This will establish a circuit from the battery through the switch B (which switch was closed by the moving of the gear-shift lever to the "F" position) and the conductors 213 and 212 to energize the solenoid 88. The valve disc 87 will now be so positioned that the rear end of the shift-actuator 69 will be connected to the engine intake manifold 81'. This will result in the piston 72 being moved rearwardly. The initial movement of this piston will result in the switch 140, controlled by the piston rod 73, being closed, since the plunger thereof will be moved out of the notch 149. This will cause solenoid 109 to be energized and the clutch power cylinder 95 operated to disengage the clutch 19. The initial movement of the piston rod 73 which closes the switch 140 also simultaneously applies force to induce movement of the shifting fork 50 and connected double clutch element 37 while under torque load, due to the yieldable relative movement arrangement between the shaft 46 and the gear shifting fork. Substantially at the time the clutch 19 becomes disengaged the relative movement will be taken up and the continued movement of the piston of the power cylinder 72 to its extreme rearward position will cause the synchronizing means to function so that the normalizing of the hairpin leaf spring 53 may complete the shifting of the double clutch element 37 to the position shown in Figure 5. This will connect the sleeve 33 directly to the driving shaft 17 and establish direct-drive or high speed. When this speed has been established, the piston 72 of the power cylinder 71 will be at the rear end of the cylinder so that the switch 140 will again open automatically due to registry of the plunger 148 with the notch 150 of the piston rod 73, as shown in Figure 17. Opening of the switch 140 in the above manner will de-energize the solenoid 109 and consequently the engine driven clutch 19 will again be re-engaged automatically. The vehicle may now continue forwardly in the high speed by merely depressing the accelerator pedal and speeding up the engine.

If the speed of the vehicle should drop below 15 or 18 miles per hour and the accelerator is again released, low speed will be re-established. This result is obtained due to the fact that the governor G again operates the selecting apex 201 to a position above the axis of the horizontal movement of the finger 218 thereby guiding the pin 219 on the finger into the recess 221 and a closing of the contacts 211 and 192 attended by a flexing of the extension 209 as already described in connection with extension 208. This flexing of the extension 209 as well as extension 208 in closing switches 211—192 and 210—194 respectively upon releasing the accelerator toward engine idling position operates the aforesaid pairs of switch contacts into initial closed contact position to thus cause partial energization of the shifting motor 69 before the idling condition of the engine is fully effective to produce maximum vacuum for operating the shifting motor to effect a rapid selected speed change. Furthermore, the slight flexing of the contact extensions 208 and 209 provides a corresponding over-run travel for the switch actuator AC with respect to double arm lever 206 during closed condition of said contacts to insure selective closing thereof by the spring 13 while returning the accelerator mechanism to its fully released engine idling position as defined by the adjustable stop means mounted on the side of the carburetor 10. This contact closing will establish a circuit from the battery through switch B, conductor 213, conductor 199, closed contacts 186 and 187, and the conductor 189 leading to the solenoid 84. This solenoid will thus be energized to open position causing the forward end of the power cylinder to be connected to the inlet-manifold 81', thus energizing the shifting motor 69 to bring about a movement of the piston 72 of the power cylinder 71 from its extreme rear end to its forward end. The initial movement of the piston will close the switch 140 by forcing the plunger 148 thereof out of notch 150 and thereby disengage the primary clutch 19. Continued movement of the piston 72 will result in the shifting of the double clutch element 37 from the position shown in Figure 5 to the position shown in Figures 4 and 7, thereby re-establishing the low speed gear ratio in the same manner that high speed drive was established. During shifting to low speed the yieldable relative movement connection will function in the same manner as in shifting from low speed to high speed. After this speed is established the switch 140 will open automatically due to plunger 148 being in registry with and engaging the full depth of recess 149, and the clutch 19 will be caused to re-engage automatically. The vehicle will now continue forwardly in low speed by merely depressing the accelerator pedal.

To re-establish high gear (direct drive), the speed of the vehicle must again exceed substantially 15 to 18 miles per hour. If such speed has been attained, all that is required to shift from low to high gear drive is to release the accelerator pedal; whereupon the shift will be made automatically in the manner already described.

If the gearing is in either forward speed (low or high) and the speed of the vehicle is such that the other gear ratio is not selected there will be no disengaging of the primary clutch 19 whenever the accelerator pedal is released. This is apparent, since the control of the clutch disengaging actuator 95 is under the control of the shift-actuated switch 140, which can only be closed when the movable element 73 of the shift-actuator 69 is initially moved. The shift actuating motor 69, of course, will not be moved unless a different gear ratio from the one established is dictated by the speed of the vehicle. Release of the accelerator pedal will re-establish a circuit energizing the solenoid corresponding to the active speed drive, but the end of the power cylinder 71 which will be connected to the engine intake manifold will be the end at which the piston is already positioned.

If the vehicle should be moving at a speed substantially 18 M. P. H. with the gearing in high speed and it is desired to obtain low speed, such, of course, cannot be accomplished by a release of the accelerator pedal due to the fact that the governor G maintains the selecting apex 201 in a position so that the circuit for obtaining the low speed cannot be energized. However, the low speed, nevertheless, can be obtained at will by moving the accelerator pedal substantially to the floor board of the operator's compartment. When this is done the auxiliary butterfly valve 225 will be closed. The full depression of the accelerator will also result in the switch actuator AC being moved rearwardly to the position shown in Figure 39, wherein pin 224 carried by the rear end of the rod 214 engages the double arm lever 206 and rotates it in a clockwise direction so as to bring the contact 211 into full engagement with the contact 192, which flexes the extension 209 to accommodate sufficient over-travel of the actuator AC with respect to initial closing of the said contacts, to insure closing thereof slightly prior to the accelerator pedal reaching its full depressed stroke; wherein the auxiliary valve 225 is fully closed to produce maximum vacuum in the engine intake manifold 81' to cause full energization of the shifting motor 69. The circuit including the solenoid 84 will be energized which will place the forward end of the power cylinder in communication with the engine intake manifold. As the piston of the shifting motor 69 moves forwardly the primary clutch 19 will be first power disengaged, low gear ratio established, and then the clutch 19 caused to re-engage automatically, thus bringing about the change to the low driving speed by a mere full depression of the accelerator pedal. When the accelerator pedal is released, the auxiliary butterfly valve 225 will instantly fully reopen and the engine will immediately resume speed according to the position of the accelerator. With the gearing in low gear ratio the vehicle can be accelerated in this ratio. This shifting of the gearing from high speed to low speed by a full depressing of the accelerator pedal is known as a "kick-down" shift since it is obtained by kicking down on the accelerator pedal full way.

To again obtain high speed after low speed has been obtained by the aforementioned "kick-down" operation; such can be accomplished by merely fully releasing the accelerator pedal, provided the speed of the vehicle is such that the governor G has positioned the apex 201 below the axis of the pin 219 of the finger. As the accelerator pedal is released the contacts 210 and 194 will be closed, thereby energizing the solenoid 88 and bringing about the power-disengagement of the clutch 19, the change to high speed and then the automatic re-engagement of the aforesaid clutch in a manner already described.

It is, of course, undesirable to provide for a shift from high speed to low speed when the vehicle is moving at a high rate of speed as; for example, substantially above 45 M. P. H. To prevent a "kick-down" shift taking place under such speed conditions, provision is made to break the circuit leading to the solenoid 84 whenever a speed is reached above 45 M. P. H. This is accomplished by the governor. When the vehicle speed is above 45 M. P. H. the sleeve 178 of the governor will assume such a position that the upper end flange 183 will engage the bell crank lever 184 and move it downwardly so that the contacts 186 and 187 are broken as shown in Figure 35. Consequently, the solenoid 84 cannot be energized regardless of whether the contacts 211 and 192 are engaged by a full depressing of the accelerator pedal.

If the vehicle should be operating in high speed drive substantially above 18 M. P. H. and the accelerator pedal is released preparatory to bringing the vehicle to a stop, high speed gear will be maintained operative, if desired, while the vehicle decelerates to a complete stop notwithstanding that the apex 201 is conditioned for causing the pin 219 on the finger 218 to operate the double arm lever 206 to energize the circuit for bringing about a shift to low speed gear. The pin by the released condition of the accelerator mechanism continues to hold the contacts 210 and 194 closed. To obtain low speed, however, when the vehicle has stopped all that needs to be done is to slightly depress the accelerator pedal and then release it. This will disconnect the pin 219 from the upper arm of the double arm lever and connect it to the lower arm thus resulting in the closing of the contacts 211 and 192. Low speed will then be established in the manner already described, it being, of course, understood that the primary clutch 19 will be disengaged before the shift takes place and caused to re-engage automatically after the shift takes place.

When it is desired to neutralize the forward range speeds, it is only necessary to move the gear-shift lever 65 from the "F" position to the "N" position. Initial movement of the gear-shift lever from the "F" position will close switch A at the lower end of the shift control shaft and mounted on the steering column, thus bringing about a power-disengagement of the clutch 19. During this clutch disengaging operation, the gear shifting fork 62 cannot move the clutch element 44 due to torque load thereon. The initial movement of the gear-shift lever to close the switch A under the conditions aforesaid, is accommodated by the functioning of the yieldable relative motion connection between the shaft 60 and the shifting fork 62. Upon the disengagement of the primary clutch 19, the double clutch element 44 will be returned to its neutral position, as shown in Figure 7 by the normalizing of the spring 53 and the continued movement of the gear-shifting lever back to its "N" position. Following this the clutch 19 will be caused to re-engage automatically by opening of switch A.

From the foregoing detailed description of the control mechanism and its operation, it is seen that said control mechanism simplifies the entire clutching and gear shifting operations by eliminating operator coordinating movements therebetween. The clutch pedal has been completely eliminated. The primary clutch 19 is caused to be power-disengaged and re-engaged automatically whenever the reverse drive ratio is obtained by manual shifting, or when the forward range of speeds is obtained by a manual shifting. During shifting from one forward speed to the other speed of the forward range of speeds, the clutch 19 is automatically disengaged coordinately therewith and re-engaged in proper sequence with respect to such shifting operations solely by manipulation of the accelerator pedal. To bring about the above described coordinated control of the primary clutch and a change in gear ratio, the operator merely has to release the accelerator pedal. The shift will take place provided, of course, the speed of the vehicle dictates that a shift should be made. If the speed of the vehicle is such that no gear ratio change should be made, then the speed which is operative will not be disturbed and the clutch 19 will remain engaged. However, if the gear ratio which is operative should be high gear drive and the vehicle is traveling at a speed within 18 and 45 M. P. H. a shift to the low speed gear can be obtained by a "kick-down" operation on the accelerator pedal; that is, a depression of the accelerator pedal to its fullest extent. If the vehicle speed should be above the 45 M. P. H. and the vehicle is in high gear drive, no shift will take place since the circuit for the "kick-down" shift has been broken and cannot be energized regardless of whether the pedal is fully depressed. The control mechanism enables the vehicle operator to have complete control of the change in gear ratios. He need not make a ratio change unless desired. The power-shifting operations are accomplished by merely releasing the accelerator pedal at proper speeds of the vehicle. The control mechanism is so designed that the vehicle friction clutch 19 will not be disengaged each time the accelerator pedal is released as such declutching would produce an undesirable free-wheeling effect. Power disengagement of the clutch to remove torque load from the gearing is effected only in response to application of pressure to induce a shifting operation. The control mechanism just described is well adapted for use with a vehicle friction clutch having a fluid-coupling in series therewith; since, under such conditions, it is possible to accommodate re-engagement of the clutch with the engine running and the vehicle stopped, and a transmission gear ratio established without movement of the vehicle due to the "slip" inherent in the fluid coupling.

MODIFIED CONTROL MECHANISM
(Figures 57 to 84 incl.)

Referring to Figures 57 to 84, inclusive, a modified control mechanism is shown in which mechanical valves and conduits are substituted for the electrical switches and conductors of the control mechanism shown in Figures 1 to 56 inclusive. In this modified construction the gearing, the friction clutch, the fluid-coupling, the engine, and the accelerator mechanism are the same components designated by the same reference numerals as employed in the the previously described vehicle drive control system. The speed-responsive device or governor G also is identical and its parts are designated by the same reference numerals.

At the lower end of the shift control shaft 64 mounted on the steering column 64' are a torque interrupter valve "A'" and a master valve "B'" which take the place of the previously mentioned switches A and B respectively. These valves, shown in detail in Figures 74 to 79, are embodied in a single casing 236 in which is a cylindrical sleeve 237. A spool-type valve element 238 is rotatable in the sleeve being connected to the lower end of the shaft 64 for rotation thereby. The valve element has a central annular groove 239 and an axial passage 240, the latter being in constant communication with the atmosphere through a hole in the cover plate 236'. The annular groove 239 is in constant communication with a conduit 241 which is connected to the manifold 81' of the engine. The portion of the valve element on the lower side of the groove comprises valve A' and is provided with two axial grooves 242 and 243, both of which constantly communicate with the groove 239. Also in this lower portion of the valve element there are three radial extending slots 244, 245, and 246, communicating with the passage 249, said slots being so arranged that an axial groove will lie between two of the radial slots. The slots are arranged to selectively communicate with a conduit 247 which leads to a valve 248 for controlling the power cylinder 95 employed to disengage the clutch 19.

The upper portion of the valve element 238 comprises the valve B' and is provided with an axial groove 249 which is in constant communication with the annular groove 239 and arranged to communicate with a conduit 250 leading from the valve casing to a selecting valve 251. The slots and grooves in the valve are so arranged that when the gear-shift lever 65 is in the "N" position the conduit 247 will be connected with the atmosphere, and disconnected from the engine intake manifold, and the conduit 250 will be disconnected from the manifold. Under such conditions the power cylinder 95 for operating the clutch will then be in condition to control engagement of the clutch 19. When the gear-shift lever is initially moved to the "R" position the conduit 247 will be connected with the manifold during the initial rotation of the shaft 64. This will cause an operation of the power cylinder 95 and the disengagement of the clutch 19. When the gear-shift lever approaches the "R" position the conduit 247 will again be disconnected from the manifold and connected to the atmosphere to control automatic re-engagement of the clutch. This, of course, occurs after the reverse gear ratio has been established. When the gear-shift lever is initially moved from the "N" position to the "F" position in the establishing of the forward range of speeds the conduit 247 will be connected to the intake manifold to energize the clutch motor 95 to disengage the primary clutch 19 before the forward range of speeds is selected by connecting the double clutch element 44 with the sleeve 33. After the forward range is selected, the engine clutch 19 will again be re-engaged automatically by the disconnecting of the conduit 247 from the manifold and the venting of it to atmosphere. When the gear-shift lever reaches the "F" position the conduit 250 will be placed in communication with the engine intake manifold. It is thus seen that the valves A' and B' function in a manner similar to the previously described switches A and B.

The valve 248, which controls the power cylinder 95 for the primary clutch 19, is shown in detail in Figures 70 and 71. This valve comprises a bore 252 in the connecting casting 102' between the casing 96 of the power cylinder and the bracket 103. The conduit 247 is connected to one end of this bore and to the other end of the bore a conduit 253 is connected, said latter conduit leading to a torque interrupter valve means 254 associated with the piston rod 73' of the shifting power cylinder 69. Within the bore 252 is a slidable valve element 255 formed by two cups 256 and 257 connected together at their bottoms which provide a partition. The cup 256 is provided with an annular groove 258 with perforations at its bottom for placing the groove in communication with the inner part of the cup. The groove 258 is adapted to cooperate with the passage 259 which leads to the chamber 106 of the power cylinder 69. In a similar manner the cup 257 is provided with an annular groove 260 with perforations at its bottom. This groove cooperates with a second passage 261 leading to the chamber 106.

When the valve element 255 is in the position shown in Figure 71 the groove 258 will be opposite the passage 259 and, consequently, the conduit 247 can communicate with the chamber 106 of the power cylinder. Under such condition the conduit 253 will be cut off from communication with the chamber 106. When the valve element is in its other position shown in Figure 70 the conduit 247 will be cut off from the chamber of the power cylinder, and the conduit 253 will be in communication with the chamber, since then the groove 260 will be opposite the passage 261. If the valve is in the position shown in Figure 71, when the valve A' is open it is seen that the shifting power cylinder 69 will be operated. If the valve element is in the position shown in Figure 70 the clutch power cylinder 95 will be operated when the conduit 253 is caused to be connected with the engine intake manifold.

As previously mentioned, the interrupter valve 254 is associated with the piston rod 73' of the shifting power cylinder 69. The details of this valve are shown in Figures 80 to 83, inclusive. The boss 262 carried by the closure plate 72' for the end of the cylinder 71 of the power cylinder 69 and through which the piston rod extends has connected thereto the conduit 253, and on the opposite side thereof is a conduit 263 connected to the intake manifold of the engine. The boss 262 carries a cylindrical bearing sleeve 264 having holes opposite the open ends of the conduits. The piston rod 73' is provided with an annular groove 265 arranged to be in constant communication with the conduit 263 in all positions of the piston rod but only in communication with the conduit 253 after the power cylinder piston has had some movement away from its extreme positions at the ends of the power cylinder. Extending through the piston rod is a passage 266 which communicates at one end with the atmosphere. At the other end of this passage two right-angled passages 267 and 268 lead to the surface of the piston rod on opposite sides of the groove 265 so as to place the conduit 253 in communication with the atmosphere at either end of the travel of the piston of the power cylinder. The arrangement is such that when the piston is at either end of its stroke the conduit 253 will be connected to atmosphere, and after the piston has made an initial movement from either end it will cause the conduit 253 to be disconnected from the atmosphere and placed in communication with the conduit 263 and the intake manifold. The valve means 254 associated with the piston rod, therefore, takes the place of the switch 140 in the previously described control means and causes a similar power-declutching function. It is employed to cause operation of the clutch power cylinder 95 so that there will be a torque interrupting clutch disengagement when the piston of the shifting power cylinder 69 has made an initial relative movement with respect to clutch element 37, and an automatic clutch re-engagement after the piston of the shifting motor 69 has completed its shifting stroke and the spring 53, or spring 235 (see Figure 21) functioned as previously described to positively engage the selected gear ratio drive.

As previously mentioned, the governor G and associated parts are the same as in the previously described control means and all elements are designated by identical reference numerals. As shown in Figures 58 to 62, the bell crank lever 184 instead of controlling a switch controls a valve 269, this valve comprising a movable valve element 270 associated with a valve seat 271 at the inner end of a chamber 272, said chamber being connected by a conduit 273 with the forward end of the cylinder 71 of the shifting power cylinder 69. This chamber also communicates with a conduit 274 which leads to the previously mentioned selecting valve 251. The valve 269 is adapted to be opened by the governor when the speed of the vehicle is above approximately 45 M. P. H. When this valve is opened, as shown by dashed lines in Figure 62, air at atmospheric pressure is admitted into the chamber 272, thus preventing sub-atmospheric pressure from developing in the chamber and the conduits connected thereto. The effect is the same as if a switch were opened in an electrical circuit.

The pin 195' has rotatably mounted thereon the U-shaped member 197. The double arm lever 206' is secured to this pin. The outer end of the pin extends into a cylindrical valve chamber formed integrally with the cap 166' and secured to said end is a rotatable piston type valve element 276, shown in Figures 58, 63 to 69 and 73. The valve chamber is closed by a cover plate 277 in which are incorporated three ports 278, 279, and 280, the first being connected to a conduit 281 which is connected to the rear end of the shifting power cylinder 69. The latter passage 280, which is diametrically spaced with respect to the port 278, is connected to the conduit 274 coming from the valve 269. The port 279 which is centrally located in the cover with respect to ports 278 and 280 and in axial alignment with the pin 195' is connected to the previously mentioned conduit 250 which leads from the valve B' at the lower end of the shift control shaft 64 mounted on the steering column.

The piston type valve element 276 has on its forward face a semi-circular groove 282 which is connected by a plurality of small holes 283 with an annular groove 284 in the valve element rearward of the face. The face is also provided with a V-shaped groove 285, the ends of which lie adjacent to the ends of the semi-circular groove, as best shown in Figures 64, 65, 66 and 73. The central part of the V-shaped groove lies at the center of the face and is in constant communication with the port 279 and conduit 250. The annular groove 284 is adapted to communicate with the atmosphere through a plurality of passages 286 covered by a dust excluding plate 287. A spring 288 biases the piston so that its face will engage a wearing plate 289 associated with the cover 277 of the chamber 275.

Since the valve element 276 is controlled directly by the actuation of the double arm lever 206', it is seen that when the double arm lever is in its upright position, as shown in Figure 60, both ports 278 and 280 will be connected to the atmosphere by way of the semi-circular groove 283 and the annular groove 284. The double arm lever is normally yieldably held in this position by a hairpin spring 203' fixed to rotate with the shaft and having its legs arranged on opposite sides of a pin 207' carried by the cap 166'. If the double arm lever 206' should be moved to the position shown in Figure 61, the valve will be moved to the position shown in Figure 66 wherein the port 278 and the conduit 281 will be connected to the conduit 250 so that when the valve B' is open the rear end of the shifting power cylinder 69 will communicate with the intake manifold and be operated to establish the high gear drive. If the double arm lever is moved to the position shown in Figure 62, the valve element 276 will be moved to the position shown in Figure 64 and, under these conditions, the conduit 250 will be connected to the conduits 274 and 273, thus placing the forward end of the power cylinder 69 in communication with the manifold to cause low gear drive to be established. Whenever one end of the power cylinder 69 is connected to the manifold, the opposite end will always be in communication with the atmosphere due to the arrangement of the grooves in the valve element 276.

The rate of engagement of the primary friction clutch 19 is arranged to be controlled by the extent and rate of depressing of the accelerator pedal. The chamber 111 on the rear side of the diaphragm 97 is provided with a valve means 112' which is similar to the valve means 112 previously described, differing somewhat, however, in that the tubular plunger 113' has no adjustable orifice and is connected by a conduit 290 leading to the portion of the cap 166' in which the valve actuator "AC'" is slidably mounted, said actuator comprising a rod 214' which carries a pivoted finger 218 for actuating the double arm lever 206' and best shown in detail in the perspective view of 83A. The rod 214' slides in a bearing 291 and is provided with two annular grooves 292 and 293, the former being connected to an axial wedge-shaped groove 294 extending forwardly to the atmosphere at any position of said rod, and the latter communicating with an axial wedge-shaped groove 295 extending rearwardly to a closed position wherein the accelerator is in its fully released engine idling position. The wedge-shaped grooves are arranged to vary the rate at which the chamber at the rear of the diaphragm of the clutch power cylinder 95 can be exhausted to atmosphere. The rod 214' cuts off the conduit 290 when the accelerator is fully released as shown in Figure 58. Under such conditions the rear end of groove 295 is also cut off from atmosphere. As the accelerator is depressed, the wedge-shaped groove 295 will be connected with the conduit and also with the atmosphere thereby establishing a gradually increasing passage to atmosphere. The area of this passage increases as the rod 214' moves rearwardly. Thus if the accelerator is pushed down rapidly there will be a fast bleeding off of air from the clutch power cylinder compartment 111, and if it is pushed down slowly there will be a slow bleeding off of air. Thus the rate of engagement of the clutch can be controlled by the accelerator pedal. When the accelerator is fully depressed the conduit 290 will also be closed. As the accelerator is released from fully depressed position and the engine begins to speed up accordingly, the conduit 290 will communicate with the annular groove 292 and the wedge-shaped groove 294 which latter groove is always in communication with atmosphere. The rate of bleeding off of air will increase as the accelerator is further released. Thus, if a quick clutch engagement is desired the accelerator can be released rapidly and if a slow engagement is desired it can be released more slowly. In neither case will the clutch 19 be engaged before the engine can pick up sufficient speed so that the clutch members will be at substantially the same speed so as to produce smooth acceleration of the vehicle as desired. The clutch will be held disengaged if the accelerator is not moved from a fully released or fully depressed position. This released condition however cannot be maintained for any length of time as there will be such leakage at the rod 214' that the trapped air in chamber 111 will eventually escape.

MODIFIED CONTROL OPERATION (Figures 57 to 84 incl.)

The operation of the modified control means shown in Figures 57 to 84, inclusive, is substantially identical with that of the previously described control system shown in Figures 1 to 56, inclusive, although this second embodiment additionally introduces means for regulating the rate of clutch engagement, as above described. When the gear shifting lever 65 is in the "N" position the primary clutch 19 will be engaged and the gearing will be in neutral due to the central position of the double clutch element 44. The neutral condition is shown in the schematic view of Figure 84. If reverse speed ratio should be desired, the gear-shift lever is moved to the "R" position. This movement of the gear-shift lever will first cause a disengagement of the clutch as a result of the valve A' connecting the clutch power cylinder 95 to the intake manifold. Following this the double clutch element 44 will be moved to connect the gear 40 with the driven shaft. After this connection is accomplished, the final movement of the gear-shift lever will again so control the valve A' that the clutch power cylinder will release the clutch 19. The clutch, however, will not engage until the accelerator pedal is depressed so as to bleed off the trapped air in the rear chamber of the power cylinder diaphragm. When the gear-shift lever is returned to the "N" position, the clutch will be disengaged, reverse speed ratio neutralized, and then the clutch will automatically re-engage.

If the forward speed ratios are desired, the gear-shift lever is placed in the "F" position. This movement will result in the control of the valve A' so as to disengage the primary clutch 19 before the double clutch element 44 connects the sleeve 33 to the driven shaft. Following this connection, the valve A' will control re-engagement of the clutch 19 which should be accomplished by a slow depressing of the accelerator pedal as low speed ratio is established due to the fact that the double clutch element 37 connects the low gear 35 to the sleeve 33. This gives a slow engagement of the primary clutch and a smooth starting of the vehicle. When the gear-shift lever is set in the "F" position, the valve B' will be positioned to place conduits 241 and 250 in communication with each other so that the selecting valve 251 can control the connection of the intake manifold with the opposite ends of the shifting power cylinder 69.

When the speed of the vehicle reaches approximately 15 to 18 M. P. H. the governor G will have moved the U-shaped member 197 so as to place the apex 201 below the horizontal axis of the pin 219 while the finger 218 is in its normal horizontal position with respect to the axis of the rod 214'. If the operator should now decide to obtain high speed, all that is necessary is to release the accelerator pedal. This will result in the finger engaging the upper arm 220' of the double arm lever 206' (see Figure 61) to thereby rotate the valve element 276 to the position shown in Figure 66 so as to connect the conduit 250 with the conduit 281 leading to the rear end of the shifting power cylinder 69. Consequently, the shifting power cylinder will be operated. As the piston of the shifting power cylinder moves rearwardly the piston rod will bring about a connection between the conduits 263 and 253, thus placing the clutch power cylinder valve 248 in communication with the intake manifold. Sub-atmospheric pressure will now be effective on the cup 257 of the valve element 255 which will pull it downwardly from the position shown in Figure 71 to the position shown in Figure 70. The clutch power cylinder 95 will now be in communication with the intake manifold and energized by the vacuum therein to disengage the clutch 19. Following this clutch disengagement the continued movement of the position of the power cylinder 69 will bring about a shifting of the double clutch element 37 through either the relay-spring 53, or 235 if the modified structure is employed, so as to disconnect the low gear 35 from the sleeve 33 and connect said sleeve directly with the driving shaft 17 as hereinbefore described in detail (Figures 1 to 56 incl.). With this gearing connection established the completed movement of the piston of the power cylinder 69 has cut off communication between the conduits 263 and 253 and placed the conduit 253 in communication with the atmosphere, so that the clutch power cylinder 95 is effective to control re-engaging of the clutch. Depression of the accelerator pedal will now complete the clutch re-engagement, if not already fully engaged, and the vehicle will be moving forward in the high speed (direct drive). When a shift is made from low to usually high the accelerator pedal is depressed rapidly in order to minimize torque interruption, necessitated by the shift, between the engine and vehicle propeller shaft. This rapid depressing produces a rapid clutch engagement as is desirable for uninterrupted smoothness in operating the vehicle.

Low speed can again be obtained by release of the accelerator pedal whenever the speed of the vehicle drops sufficiently that the apex 291 will cause the finger 218 to be engaged with the lower arm 221' of the double arm lever 206'. The accelerator pedal when released causes the valve element 276 to be placed in the position shown in Figure 64 so that conduit 259 is connected with the conduit 274 and conduit 273. This places the forward end of the shifting power cylinder 69 in communication with the intake manifold. The result will be a power-disengagement of the clutch 19, a shifting of the double clutch element 37 back into the position shown in Figure 7, and then a conditioning of the clutch power cylinder 95 so as to re-engage the clutch, which clutch will be fully engaged when the accelerator pedal is depressed to relieve the trapped air at the rear of the cylinder diaphragm 97.

If high speed should again be desired and the vehicle speed is above 15 to 18 M. P. H., such can be accomplished in a manner already described by merely releasing the accelerator pedal.

If low speed ratio should be desired when the gearing is in high speed drive and the vehicle is traveling at or above 15 M. P. H. such can be obtained by merely depressing the accelerator pedal to its fullest extent. This will close the auxiliary butterfly valve 225 after the shifting motor 69 has been partially energized due to the actuator AC' having already rotated valve element 276 to connect said motor with the intake manifold. This partial energization of the shifting motor 69 before the valve 225 actually closes for maximum vacuum production by the engine, produces a rapid shift the instant the accelerator reaches full released position to close this valve, and is accomplished through the linkage connections to the valve actuator rod 214' which is moved rearwardly to the position shown in Figure 62 to thus actuate the double arm lever 206' and move the valve element 276 to the position shown in Figure 64 so that the conduit 259 will be connected to the forward end of the power cylinder 69 prior to the accelerator reaching full released engine idling position to bring about the disengagement of the clutch and the shifting to low speed. As the accelerator pedal is released, the clutch will be re-engaged. The rate of re-engagement can be made rapidly by instantly releasing the pedal to some extent following such a shift. When high speed is again desired, all that is necessary is to fully release the accelerator pedal and the shift will be accomplished automatically provided, of course, that the speed of the vehicle is high enough.

If the speed of the vehicle should be above 45 M. P. H. it will be impossible to obtain low speed when high speed is operative, notwithstanding that the accelerator pedal may be depressed to its fullest extent. When the vehicle's speed goes above 45 M. P. H., the governor G, will be so conditioned that the bell crank lever 184 will be operated to open the valve element 276. This will admit air to the conduit 273 and consequently, even though the valve element 276 may be positioned to connect the conduit 259 with power cylinder 69, sub-atmospheric pressure cannot be established therein.

In the two control mechanisms shown in Figures 1 to 84 inclusive, the control functions of the actuators AC and AC' with respect to the rate of engagement of the vehicle friction clutch 19 may be interchangeably applied if desired. For example, if in the control mechanism illustrated in Figure 1 it is desired to control the rate of clutch engagement by operating the accelerator mechanism, then the structure comprising the valve means 112', conduit 290, and rod 214' of actuator AC' would be employed; while in the modified control system illustrated by Figure 57, if it is desired to have a "fixed" rate of clutch engagement, then the valve means 112 would be employed which eliminates conduit 290, and the rod 214 and finger 218 of actuator AC (Figure 54A) substituted for the rod 214' and finger 218' of actuator AC' (Figure 83A).

GOVERNOR REGULATOR

In the Figure 85, there is shown an enlarged detailed view of the governor G, employed in the different embodiments of the control system. The principal parts of this governor have already been described in detail, therefore the parts analagous to those already described are designated by like reference characters. In addition to this structure, there is incorporated a regulating or adjusting means for controlling the extent of movement of the centrifuge members at certain speeds of the vehicle. This regulating or adjusting means comprises a nut 296 which is threaded into the cap 166 and acts to vary the tension of the spring 182, there being provided a washer 297 between the spring and the nut. The nut also acts as a bearing for the upper end of the governor shaft 167. A lock nut 298 is employed to lock the adjusting means 296 in its adjusted position.

MODIFIED CONTROL MECHANISM
(Figures 86 to 96 incl.)

Referring now to Figures 86 to 96, inclusive, there is shown a modified control system for a primary torque-transmitting clutch and change speed gearing which is particularly designed for use with a transmission drive system in which the fluid-coupling 18 is not employed between the friction clutch and the engine. The control means shown in the various figures is a modification of the structure shown in Figures 1–56 wherein switches and conductors are employed to control the valves. Most of the structure shown in Figures 86–96 is identical with that previously described in connection with Figures 1 to 56, and therefore like parts are designated by the same reference numerals.

When the fluid-coupling 18 is eliminated as a component of the power transmitting system, provision must be made to insure disengagement of the friction 19 clutch when the vehicle is brought to a stop with a gear ratio established. This is accomplished by providing a means for bringing about power clutch disengagement when the governor comes to rest. Also when the fluid-coupling is eliminated means should also be provided for controlling proper re-engagement of the friction clutch after a selected gear ratio has been made operative. This is accomplished by controlling the clutch re-engagement by operation of the acceleration mechanism together with a control means for changing the rate of engagement in accordance with the selection of a gear ratio before it is established.

As shown particularly in Figures 92 and 93, the contacts 192 and 194 have associated therewith an element 299 of conducting material which is insulated from the contacts 192. This element 299 carries spaced contacts 300 and 301. The element is provided with a flange 302 adjacent contact 192, and slidably mounted in this flange is a plunger 303 of non-conducting material, actuated by an extension 304 of the U-shaped member 197 controlled by the governor. This plunger has secured to its upper end a tubular element 305 of conducting material which is slidable on a pin 306 secured in the cap 166' and extending downwardly therefrom. The outer end of this pin provides a terminal 307 to which is connected a conductor 308 connected to the conductor 126 (see the schematic view in Figure 96). The lateral flexible extensions 208' and 209' of the double arm lever 206 carry, besides the contacts 210 and 211, additional contacts 309 and 310 which cooperate with the contacts 300 and 301, respectively, carried by the element 299. The double arm lever 206 is rotated selectively to its contact closed positions by a modified switch actuator "AC'" as illustrated perspectively in Figure 95A. The tubular element 305 acts as a movable element of a switch to connect the conductor 308 through the element 299, and either of the contacts 300 and 301 carried thereby, to the double arm lever, the pin 195 and conductor 213. This switch will be closed when the vehicle is at rest, said closed condition being shown in Figure 87. When the vehicle is moving, the U-shaped member 197 moved by the governor G will so control the tubular element as to bring about the opening of the switch.

When the vehicle is brought to a stop in a forward speed it is necessary that the primary clutch 19 be disengaged in order to prevent stalling of the engine. This is accomplished automatically by the switch previously described. When the vehicle is moving, the governor will cause the tubular element 305 to be disengaged from the flange 302 of the element 299. However, when the vehicle is brought to a speed approaching a complete stop, as for example two or three miles per hour, the tubular element 305 will engage the flange 302 so that when the accelerator pedal is released a circuit will be established which is independent of the interrupter switch 140. Thus with the switch 140 open as the vehicle is brought to a stop and the accelerator pedal fully released, the solenoid 109 will nevertheless be energized and the clutch 19 automatically disengaged regardless of the shifted position of the motor 69. It makes no difference whether the release of the accelerator causes the finger 218' to rotate the double arm lever 206 either to the position shown in Figure 87 or to the position shown in Figure 89 the shunting circuit around switch 140 will be closed, as in one position the double arm lever, which is connected to the conductor 213, will bring the contacts 309 and 300 together or in the other position bring the contacts 310 and 301 together to establish the circuit. Thus, it is seen that when the accelerator pedal is released and the automobile is brought to a stop, the friction clutch 19 thereof will be held in disengaged condition to prevent stalling of the engine, whether the low or high speed is effective at the time.

The means for controlling the re-engagement of the friction clutch 19 during starting and ratio changing will now be described. The rod 214" of the switch actuator AC", on the inner end of which the finger 218' is pivoted, is arranged to control the bleeding off of the air from the clutch power cylinder 95 so that the time of engagement of the clutch and at what rate it should be engaged can be proper for the gear ratio that is selected to be established. The chamber at the rear of the diaphragm of the clutch power cylinder 95 is controlled by the same valve 112', as shown in Figure 72, in connection with the modified control means previously described, and the conduit 290 leads to that portion of the cap 166" in which the slidable rod 214" is of hollow construction having a chamber 311 connecting with the axial passage 312 leading to the rear end of the rod and the atmosphere. For controlling communication between the chamber and the passage there is a valve element 313 having a stem 314 extending to the rear end of the rod. This stem is provided with a head 315 adjacent the rear end of the finger 218', so that the valve will be held in an open position when the finger is caused to be connected to the upper arm of the double arm lever 206. When the finger is aligned with the axis of the rod or is connected to the lower arm of the double arm lever, the valve will be held in closed position under the action of a spring 316. The valve element is made of a yieldable material so as to fully seat and close passage 312. As best shown in Figure 91 the chamber 311 in the rod 214" is provided with a side port 317 and communicating with this port if a rearwardly extending wedge-shaped slot 318 which is so arranged as to be totally covered when the accelerator pedal is released and the rod 214" is in the position shown in Figure 87. Under such conditions the port 319 of conduit 290 will be in communication with the chamber 311 but cannot communicate with the atmosphere if the valve 313 is closed, which will be the case if the finger 218 is in the position shown in Figure 87. The surface of rod 214" also is provided with a wedge-shaped slot 320 which extends forwardly longitudinally. This slot is not connected with the chamber 311. It is of such length as to extend out of the forward end of cap 166" when the accelerator pedal is fully depressed and the rod 214" is in the position shown in Figure 90.

MODIFIED CONTROL OPERATION (*Figures 86 to 96 incl.*)

If the vehicle is stopped with the low speed gear clutched to the driven shaft as shown in Figure 7 and with the gear shifting lever in the "N" position the friction clutch 19 will be engaged and the accelerator pedal will be in released position. If the shifting lever is now set to the "F" position the clutch 19 will be automatically disengaged in a manner already described in connection with the control mechanism shown in Figures 1 to 56 and then the driven shaft of the gearing will be connected to the low speed ratio gear 35 by the double clutch element 44. The clutch 19 will remain disengaged since the switch comprising the tubular element 305 and the flange 302 is closed as previously described and shown in Figure 87. This establishes a circuit which maintains the solenoid 109 energized. The released position of the accelerator pedal also insures that the valve element 313 controlling communication between the chamber 311 and the atmosphere will be closed.

When the vehicle is to be started the accelerator pedal will be depressed from its fully released position and as the actuator rod 214" moves rearwardly the shallow end of the wedge-shaped slot 318 will become exposed to the atmosphere while at the same time the circuit which has been maintaining the solenoid 109 energized will be broken by the breaking of contacts 301 and 310. The friction clutch will now engage but the rate of engagement will be controlled through the wedge-shaped slot 318 and will be a function of the extent of the depressing of the accelerator pedal in starting the vehicle. In starting a vehicle the depressing of the accelerator pedal is generally performed slowly and, consequently, there will be an easy engagement of the clutch 19 in a manner simulating that obtained when the clutch is personally controlled by the operator's foot through a clutch pedal. The result is a smooth starting of the vehicle which is accomplished automatically by merely depressing the accelerator pedal.

When the vehicle has picked up sufficient speed that a shift to high speed can be made, such will be accomplished by merely a releasing of the accelerator pedal as already noted. The release of the accelerator pedal conditions the parts as shown in Figure 89, and the shift will be automatically made after the primary friction clutch 19 is caused to be disengaged. When the accelerator pedal assumes released position the finger 218' assumes the position shown in Figure 89. Under such conditions the valve 313 will be moved to an open position so that the chamber 311 is connected to atmosphere. Since this chamber is in communication with the conduit 290 when the accelerator pedal is released then the re-engagement of the clutch 19 will take place immediately following the shift as the auxiliary circuit to the solenoid 109 is not made when the vehicle is moving. This is the desired result in shifting from the low speed to the high speed. The vehicle will not be driven in high speed by depressing of the accelerator pedal in the manner already described.

From the foregoing it is seen that whenever the low speed is established the re-engagement of the primary clutch 19 will be under the control of the accelerator pedal and the rate of re-engagement will depend upon the rapidity and extent of depressing of the accelerator pedal from its fully released position. When a shift is to be made from low speed to high speed, the rate of re-engagement of the friction clutch 19 is controlled automatically by the admission of air to the clutch motor 95 through an opening provided for this purpose in the actuator AC" and connected with the conduit 290 which is the result desired.

If there should be a shift from high speed to low speed by fully depressing the accelerator pedal thus performing the "kick-down" shift, the rate of re-engagement of the clutch 19 after shifting has been accomplished can also be under the control of the accelerator pedal. Under such conditions where the accelerator pedal is fully depressed the wedge-shaped slot 320 will become positioned opposite the port 319 and this wedge-shaped slot will then control to some extent the rate of re-engagement of the clutch 19. As the accelerator pedal is released following the "kick-down" shift the rate of engagement of the clutch will be increased due to more of the slot being increasingly exposed to atmosphere.

In the last-described control for the re-engagement of the friction clutch, it is to be particularly noted that it is effective only when low speed drive is established. When the high speed is established, the control for the rate of re-engagement of the clutch is completely eliminated since under such conditions the conduit 290 will be in direct communication with the atmosphere through a fairly large opening established by the open condition of the valve element 313.

When the fluid-coupling 18 is eliminated and the clutch 19 engagement is controlled by the accelerator mechanism there should be provided means for preventing the operator from re-engaging the clutch until after the shift is accomplished. The operator should be prevented from so re-engaging the clutch as to "beat" the gear ratio changing operation. A mechanism that can be employed to effectively accomplish this is shown in Figures 94 and 95. As best shown in Figure 95 the lever 216' between the linkage rod 15 of the accelerator mechanism and the rod 214" is provided with an extension 321 for cooperation with a pin 322 carried by a bell crank lever 323 pivoted on the cover plate 45 of the gearing housing by means of a pin 324. A spring 325 normally biases the lever 323 against a stop pin 325' thus causing the pin 322 to be away from the extension 321 of the bell crank lever 216'. Below the bell crank lever 323, and also pivotally mounted on the cover 45, is an arm 326 which is connected by a link 327 with the short arm of the clutch arm 100 by means of which the clutch power cylinder piston rod is connected to the clutch actuating shaft. The free end of the arm 326 carries a dog 328 which is controlled by a light coil spring 329, said spring normally setting the dog in a locking position but accommodating the arm 326 to swing past the lower end of the lever 323 when the arm is moving in a clockwise direction.

Whenever the clutch 19 is engaged the arm 326 will be swung in a counterclockwise direction from the position shown in Figure 94. With such position the lever 323 is released to assume the position shown by the dashed lines in Figure 94. Under such conditions, the accelerator mechanism is free to be operated. When the clutch is disengaged during gear shifting by release of the accelerator pedal the arm 326 and the dog carried thereby will be rotated in a clockwise direction as seen in Figure 94. The dog will engage the lever 323 and cause a movement of said lever to the position shown in full lines. This will place the pin 322 beneath the extension 321 and lock up the accelerator mechanism so it cannot be depressed at this time. When the clutch reaches its fully engaged condition, as determined by the full stroke of the movable element of the power cylinder 95, the dog will slip past the lever 323 to free it so that pin 322 will assume a position wherein it will not lock the arm 216' against movement. The accelerator is now free to be operated to control re-engagement of the clutch. While the accelerator mechanism was locked the change in gear ratio was completed by the shifting motor 69. If the accelerator mechanism should be pushed substantially to the floor board to perform the "kick-down" shift, then when the clutch is disengaged, the pin 322 will be positioned on the upper side of the extension 321, as indicated in dash lines, to thus lock the accelerator mechanism until the shift has been completed.

MODIFIED CONTROL MECHANISM

(Figures 97 to 103 incl.)

In Figures 97 to 103, there is shown another modification of the control mechanism shown in Figures 57 to 84, said modification being employed for use on a vehicle where the fluid-coupling 18 has been eliminated. Most of the structure shown in Figures 97 to 103 is identical with that shown in Figures 57 to 84. In addition to this previously described structure, there is a control for varying the rate of clutch engagement and an acceleration mechanism lock which are the same as those shown in Figures 86 to 96. All parts previously described are indicated by the same reference numerals employed in connection with such previous description.

The cap 166''' of the governor auxiliary casing has connected thereto a conduit 330 which is a branch conduit of the conduit 253 and is part of a conduit means for by-passing the valve means 254 controlled by the shifting power cylinder piston rod. The conduit 330 communicates with a chamber 331 on the cap 166''', and this chamber in turn communicates with a conduit 332 which is connected into the selector valve chamber 275 so as to be controlled by the valve element 276'. In the chamber 331 and associated with the conduit 332 is a valve seat 333 which is adapted to be closed by a plunger valve element 334. This plunger valve element is connected to an arm 335 carried by the U-shaped member 197' controlled by the governor G. Between the arm and the plunger is a rod 336 and a spring 337 to enable the arm to close the valve and have movement against the spring after the valve plunger is seated. The valve plunger will be in open position when the governor is at rest; that is, when the vehicle is brought substantially to a stop. When the vehicle is moving the valve plunger will be closed, as shown in Figures 99, 100 and 101.

The selector valve element 276' is similar to the previously described valve element 276; differing only, however, in that there is provided two radial passages 338 and 339 which communicate with an axial passage 340 extending to the face of the valve element so that these two radial passages will be in constant communication with the conduit 253 coming from the valve B' opened by the gear shifting lever when placed in the "F" position. The valve element 276' also is arranged with a surface recess portion 341 to place the conduit 332 in constant communication with the annular groove 284' and the atmosphere by way of the small openings 286'. The radial passages 338 and 339 are adapted to communicate with the conduit 332 and thus place this conduit in communication with the conduit 259 whenever the valve element is actuated by the accelerator pedal to either of its two operative positions through an actuator similar to the switch actuator AC'' as illustrated in Figure 95A.

MODIFIED CONTROL OPERATION

(Figures 97 to 103 incl.)

With the above arrangement it is seen that when the governor G approaches the full rest position as a result of the bringing of the vehicle to a very slow speed approaching a stop, and the accelerator pedal is in released condition, a communication will be established between the conduit 253, which is connected to the clutch power cylinder 95, and the intake manifold 81' of the engine independently of the valve means 254, this communication comprising the conduit 332, the conduit 250 and the conduit 241. The released condition of the accelerator mechanism will insure that one or the other of the radial passages 338 and 339 will be connected to the conduit 332; so that regardless of the transmission drive established at the time the vehicle is brought to a stop, the primary clutch 19 will become disengaged and held disengaged as long as the accelerator pedal remains released. If the accelerator should be depressed slightly, of course, then the clutch will be re-engaged because the by-pass around the valve 254 will then be in communication with atmosphere by way of the annular groove 284' in the valve element.

Whenever the gear-shift lever 65 is moved back to its "N" position there is no necessity for maintaining the primary clutch 19 disengaged because then the gearing is neutralized. Thus the only time that the clutch should be held disengaged is when the vehicle is brought to a stop with the gear-shift lever still in the "F" position with the engine operating.

OPERATIONAL SUMMARY

From the foregoing description, taken in connection with the various illustrations of the different embodiments of my invention, it will be seen that certain inter-related components of the control systems possess similar functional characteristics such that interchangeability is readily effected, particularly in connection with the clutch controlling features. For example, the clutch and shift actuators (fluid pressure motors) 95 and 69 respectively may be controlled with equal efficiency by either electrically or mechanically operated valving (see Figures 1 and 57 respectively). The valves for controlling the fluid pressure to these motors may be actuated selectively by any one of the three accelerator-controlled actuators; namely, AC, AC', or AC'', which are perspectively illustrated in Figures 54A, 83A, and 95A respectively. If actuator AC is employed, the declutching motor 95 will be made operative to disengage the friction clutch 19 in response to a shift-inducing movement of the motor 69 or shift-lever 65, and upon completion of the selected shift thereby the clutch will, without operator attention, re-engage automatically. If actuator AC' is employed, operator-controlled re-engagement of the friction clutch from a full released position of the accelerator pedal or the fully depressed "kick-down" position thereof to shift to low speed only following a shift to any of the drives of the transmission 24 is available with or without the fluid-coupling 18 in the power driving line of the associated vehicle; while the use of actuator AC' places limited control of the re-engaging of the said clutch dependent on the will of the operator following a shift into either low or reverse speed drives only, and also provides the special feature of automatic re-engagement following a shift into high speed (direct drive). Furthermore, this latter actuator provides for the elimination of the fluid-coupling drive 18 such that the friction clutch 19 alone constitutes the sole means for transmitting torque from the engine 1 to the change-speed gearing 24 in driving the vehicle, thus simplifying the power driving system.

It is thus seen that the aforesaid actuators of the present construction afford desirable results by providing selective driving control of a motor vehicle according to the type of torque transmitting connection employed between the engine 1 and change-speed gear transmission 24, which may be (as above indicated, either the combination of a conventional friction-clutch and a fluid-coupling or the clutch alone).

Further beneficial results in the driving control of a motor vehicle equipped with my power driving system and control may also be realized in the selective use of the shift-lever controlled switches A and B, for valves A' and B' and vice versa; accelerator-governor controlled switches (210—194 and 211—192) for valve 276; switches (309—300 and 310—301) for valve 276'; switch (302—305) for valve 334; switch (186—187) for valve 269; and shifting motor controlled switch 140 for valve 254. For example, the switch mechanism associated with the governor G in Figures 1 to 56 inclusive is equally adaptable to controlling a power drive system wherein the source of torque (engine 1) may be transmitted to the gearing 24 through either the friction clutch 19, or both the clutch and the fluid-coupling 18, while the switch mechanism of Figures 86 to 96 inclusive eliminates the fluid-coupling 18 from the power drive line by providing novel automatic control of the clutch 19 simulating highly efficient operator control thereof by providing selective control of the clutch re-engaging operation according to the speed drive selected by the governor G; such that, following a shift to either low or reverse speed the operator by depressing the accelerator, controls the clutch into smooth engagement in starting the vehicle from a standstill, but once the vehicle is underway the shift from low to high speed is automatically accomplished followed by automatic re-engagement of the clutch merely by the operator releasing the accelerator 2 resulting in smooth increase in vehicle speed as the accelerator is subsequently depressed. The latter switch mechanism also incorporates another important controlling feature whereby automatic clutch disengagement results at lower vehicular speeds than ordinarily required for driving the vehicle in low speed, therefore maximum use of this lower gear for heavy pulls and rough terrain is available since the clutch is maintained engaged down to and as low as 2 to 3 miles per hour vehicular speed which is the lowest possible speed for satisfactory idling of the engine 1. The re-engaging control operations as above noted are effective on the release of the accelerator to substantially full engine idling position for causing a shift into reverse drive, or upshifting from low to high speed drive according to predetermined speed ranges of the vehicle, but automatic re-engagement of the clutch 19 can only occur following a downshift from high speed to low speed by a "kick-down" shifting operation of the accelerator pedal (fully depressed) as hereinbefore fully described providing, of course, that switch actuator AC is employed.

Further examples of the interchangeability of the above enumerated switches and valves and actuator controls therefor are apparent from a study of their structures and locations in the vehicle. For instance, switch A may be substituted for valve B, and switch A' for valve B'; switches (210—194 and 211—192) can replace valve 276; or switches (309—300 and 310—301) substituted for valve 276'; likewise switch (186—187) may be used in place of valve 269; switch (302—305) in place of valve 334, and switch 140 in place of valve 254. This interchangeable nature of these various control switches and valves provides for flexible installation of these control units for the servomotors 69 and 95 and remotely therefrom as the design of the vehicle may require.

The incorporation in the present structure of my novel yieldable force-transmitting connection between the movable element of the shifting motor 69 and blocker-synchronizer 37, and between the shift-lever 65 and the double clutch element 44 is also highly advantageous, inasmuch as it greatly accelerates the efficient shifting of the synchronizer and clutch element 37 and 44 respectively to effect a speed change thereby with attendant smoothness of engagement and reduction of wear on the parts, by applying a continuous shifting pressure against either of the aforesaid shiftable elements at the very inception of the energization of the motor elements 72—73 or movement of the shift-lever 65 and throughout their respective shifting strokes in effecting the selected speed change. Furthermore, this novel force-transmitting connection incorporates in addition to the above continuous pressure application feature to induce and then actually shift the above noted shiftable elements of the gearing 24, the highly important feature whereby the yielding characteristic thereof provides a sufficient predetermined relative movement of either the movable element 72—73, or shift-lever 65 with respect to their operably connected shiftable elements 37 and 44 respectively, which latter are restrained from movement while under torque load and during synchronization, to operate control means responsive to such initial shift-inducing movements thereof for substantially freeing the gearing 24 of torque load, thus facilitating rapid shifting of elements 37 and 44 to their respective operative positions following synchronization thereof, wherein a selected gear drive is established.

It is further important to note in connection with the shift-lever control of the friction clutch 19 that when employed to control the shifting of heavy-duty transmissions of the non-synchronous type, selective automotive disengagement of the clutch as the shift-lever passes through the neutral position of the gearing during an upshift from one speed to another, or, if the shift-lever is momentarily paused in the aforesaid neutral position, automatic re-engagement and disengagement, commonly known as "double-clutching," of the clutch, is available during a downshift from one speed to another so that smooth engagement of the selected gears will result as the shift-lever is advanced to the selected gear position from either neutral-gear position or a gear-engaged position of the transmission by bringing the mating gears to substantially the same speed. For example, reverse speed gearset 40 is a higher ratio than the low speed drive 30, therefore, when the double-clutch element 44 is shifted by the shift-lever 65 from low speed to reverse a downshift occurs, but upon a shift from reverse speed to low speed an upshift occurs, since low speed is a lower ratio than reverse speed. Upon initially moving the shift-lever 65 from low speed engaged position ("F" dial position), the friction clutch 19 is automatically disengaged to unload the gearing of torque to facilitate movement of the slidable clutch element 44 to neutral position which, when reached, if the shift-lever is continued to be advanced the clutch 19 will be maintained disengaged; but if the lever is momentarily released the clutch will automatically re-engage to cause the main drive gear 26 and connected countershaft gears to rotate therewith, thus substantially bringing these gears up to the speed of the rotation of clutch element 44 driven from the propeller shaft of the vehicle. If at this point the advancement of the shift-lever 65 is resumed toward the selected gear, which in this instance is reverse speed, the clutch 19 will again automatically disengage immediately prior to initial positive engagement of the double-clutch element 44 with the teeth 41 on the reverse gear, which will result in smooth engagement of the reverse speed gear, and upon completion of the reverse gear engagement the shift-lever control will accommodate automatic re-engagement of the clutch, so that upon depressing the accelerator pedal the vehicle will move in reverse.

It is thus seen that the present automotive drive system provides the operator with selective manual control of the friction clutch 19 to relieve torque to facilitate a gear change thereby at the neutral-gear position thereof during a shift from neutral or from one gear to another, according to whether an upshifting or downshifting speed change is involved, by continuing to advance the shift-lever to maintain switch A closed through the neutral position or momentarily pause or release said lever in neutral to open said switch, respectively. This feature is highly advantageous when downshifting heavy-duty transmissions such as used in trucks and busses, by eliminating the foot-hand shift and double-clutching operations so commonly employed in properly controlling vehicles of these types. The operator merely has to manipulate the shift-lever in the customary manner for all upshifting operations, and by momentarily pausing the lever in the neutral position, automatic "double-clutching" operations will be effected to facilitate quiet engagement of the positive gears or clutches, as the case may be, in establising the desired speed drive.

It will be understood that other modifications and variations will be readily apparent to those skilled in the art from the preceding description of presently preferred embodiments of the invention which are for illustrative purposes only, and it is not intended to limit the invention in its broader aspects except as set forth in one or more of the claims appended hereto.

I claim as my invention:

1. In a power drive system including a source of driving torque and transmitting means therefor, operating means for said transmitting means, a change-speed drive gearing subject to torque-load therefrom and incorporating an element shiftable when substantially free of torque-load to change the gearing drive thereof, energizable means including a movable element operable for shifting said shiftable element, a source of energy, means for controlling energization of said shifting means, and means operable in response to initial movement of said energized movable element in applying a force to shift said shiftable element for causing said operating means to interrupt transmission of torque to facilitate shifting of said shiftable element directly by said energized movable element to change the gearing drive as aforesaid.

2. In a power drive sysem including a torque transferring internal-combustion engine, a torque transmitting change-speed drive gearing incorporating an element subject to torque-load and shiftable when substantially free of torque-load to change the gearing drive thereof, energizable means including a movable element operable for shifting said shiftable element, a source of energy, means for controlling energization of said shifting means, and means operable in response to initial movement of said energized movable element in applying a force to shift said shiftable element for causing a cessation in the transfer of torque to said change-speed drive gearing to facilitate shifting of said shiftable element by said energized movable element to change the gearing drive as aforesaid.

3. In an automotive vehicle equipped with an accelerator-controlled engine coupled with a change-speed gear transmission including control mechanism therefor, said transmission comprising at least three different establishable gear set two-way drives including means operable to uncouple said engine therefrom: a driving shaft; a driven shaft; a sleeve rotatably mounted on said driven shaft; a gear rotatably mounted on said sleeve; means for driving said gear from said driving shaft; another gear rotatably mounted on said driven shaft; means for driving said other gear from said driving shaft; means comprising a double-clutch element non-rotatably mounted on said driven shaft and slidable thereon from a common disconnecting position, for connecting selectively said sleeve and other gear to said driven shaft to thus establish two of said gear drives; manually operable means for selectively sliding said clutch element at will; other means comprising a slidable double-clutch element non-rotatably mounted on said sleeve for alternately connecting said driving shaft and first-named gear to said sleeve by sliding movements therebetween in opposite directions through a common disconnecting zone, to thus esablish the remaining gear drive, and restore one of said two gear drives to its established condition; servomotor means energizable for sliding said last-named clutch element to either of its aforesaid connecting positions; a source of energy for said servomotor means; means for controlling the energization of said servomotor means; means operable during the sliding of said last-named clutch element by said energized motor for preventing it from coming to rest in said disconnecting zone and means responsive to initial and final portions of a complete unidirectional actuation of said servomotor means in effecting the aforesaid sliding of the said last-named clutch element, for operating the coupling means to uncouple and recouple respectively the said engine and transmission.

4. A motor vehicle power plant having a torque producing internal-combustion engine drivingly connected to a change-speed gear transmission comprsing at least three different establishable gear set drives subject to torque-load from said engine, and means operable to interrupt said driving connection; a driving shaft; a driven shaft; a sleeve rotatably mounted on said driven shaft; a gear rotatably mounted on said sleeve; means for driving said gear from said driving shaft; another gear rotatably mounted on said driven shaft, means for driving said other gear from said driving shaft; means comprising a double-clutch element non-rotatably mounted on said driven shaft and slidable thereon from a common disconnecting position for selectively connecting said sleeve and other gear to said driven shaft to thus establish two of said gear drives; manually operable means for selectively sliding said clutch element at will; other means comprising a slidable double-clutch element non-rotatably mounted on said sleeve for alternately connecting said driving shaft and first-named gear to said sleeve by sliding movements therebetween in opposite directions through a common disconnecting zone to thus establish the remaining gear drive and restore one of said two gear drives to its established condition; energizable servo-mechanism operable for sliding said last-named clutch element to either of its aforesaid connecting positions; energizing means for said servo-mechanism; means for controlling the energization of said servo-mechanism; means operable during a sliding movement of said last-named clutch element by said servo-mechanism for preventing it from coming to rest in a disconnected position in said zone from both the said driving shaft and first-named gear, and means operable in response to initial operation of said servo-mechanism to induce a sliding movement of said last-named clutch element for interrupting the driving connection between said engine and transmission, and thereby substantially remove the torque-load from said gear sets to facilitate the sliding of said last-named clutch element by said servo-mechanism when energized.

5. In a motor vehicle power plant having a torque producing internal-combustion engine drivingly connected to a change-speed gear transmission comprising establishable two forward gear set drives and one reverse gear set drive subject to torque-load from said engine; a driving shaft; a driven shaft; a sleeve rotatably mounted on said driven shaft; a forward gear rotatably mounted on said sleeve; means for driving said gear from said driving shaft; a reverse gear rotatably mounted on said driven shaft; means for driving said reverse gear from said driving shaft; means comprising a double-clutch element non-rotatably mounted on said driven shaft and slidable thereon from a common disconnecting position for selectively connecting said sleeve and reverse gear to said driven shaft to thus establish forward and reverse gear drives; manually-operable means for selectively sliding said clutch element at will; other means comprising a slidable double-clutch element non-rotatably mounted on said sleeve for alternately connecting said driving shaft and forward gear to said sleeve by sliding movements therebetween in opposite directions through a common disconnecting zone to thus establish the other forward gear drive and restore said first-named forward gear drive to its established condition; energizable servo-mechanism operable for sliding said last-named clutch element to either of its connecting positions; energizing means for said servo-mechanism; means for controlling the energization of said servo-mechanism; means operable during a sliding movement of said last-named clutch element by said servo-mechanism for preventing said clutch element from effecting an at rest disconnected position in said zone with respect to both the said driving shaft and forward gear; and means operable in response to initial operation of said servo-mechanism to induce a sliding movement of said last-named clutch element for interrupting the driving connection between said engine and transmission to thereby relieve torque-load on said gear sets thereof so that said servo-mechanism can slide said last-named clutch element when energized.

6. In a vehicular drive system including a torque-producing prime mover and a torque-transmitting friction clutch for transferring engine torque to a change-speed gearing having two different gear ratios; the improvements which comprise a member movable to two different positions for establishing the gear ratios, power means for alternately moving said member to its two positions, control means for the power means, means accommodating a force applying movement of said power means relative to the movable member prior to a movement causing either gear ratio to be neutralized, power means for disengaging the clutch and accommodating its re-engagement, control means for the clutch power means including an electrical circuit and a control switch, and means for so controlling the switch by said prior relative movement of the first-named power means as to cause disengagement of the clutch, and means for so controlling the switch after a gear ratio is established as to accommodate re-engagement of the clutch.

7. In a drive system for a vehicle having a steering column, a torque-producing internal-combustion engine and a clutch for transferring engine torque to a change-speed gearing having a pair of gear ratios; the improvements which comprise power means operable for disengaging the clutch and accommodating its re-engagement, an operator-operated rotatable shaft mounted parallel to the steering column and operatively connected with said gearing through a force-transmitting connection accommodating limited initial relative movement of said shaft with respect to said gearing, means for establishing a gear ratio by manual effort only upon a rotation of said shaft, a control means for the power means including a control element carried on the shaft, and means for actuating the control means by initial rotation of the rotatable shaft and movement of the control element to effect operation of the power means to disengage the clutch prior to establishing the gear ratio and to accommodate clutch re-engagement after the gear ratio is established.

8. In a vehicular drive system including a torque-producing prime mover and a torque-transmitting friction clutch for transferring engine torque to a change-speed gearing having two different gear ratios; the improvements which comprise a source of fluid pressure different from atmosphere, a fluid pressure actuated motor having its movable element operably connected to control the clutch, conduit means between the motor and source, valve means including a rotatable valve element for the conduit means, an operator-operated rotatable member operatively connected with said gearing through a force-transmitting connection accommodating limited initial relative movement of said member with respect to said gearing, means for establishing a gear ratio by manual effort only upon a rotation of said member, and means for operating the valve means by rotation of said valve element with the rotatable member when initially rotated to connect the fluid motor to the source for power disengagement of the clutch prior to establishing of the gear ratio and to disconnect the fluid motor from the source for accommodating clutch re-engagement after the gear ratio is established.

9. In a vehicular drive system including a torque-producing prime mover and a torque-transmitting friction clutch for transferring engine torque to a change-speed gearing having two different gear ratios; the improvements which comprise a source of fluid pressure different from atmosphere, a fluid pressure actuated motor having its movable element operatively connected to the clutch for disengaging the clutch and for accommodating re-engagement thereof, conduit means between the motor and source, valve means for the conduit means, an operator-operated rotatable member operatively connected with said gearing through a force-transmitting connection accommodating limited initial relative movement of said member with respect to said gearing, means for establishing a gear ratio by manual effort upon rotation of said member, means for operating the valve means comprising an electrical circuit and a switch, and means for actuating the switch upon initial rotation of said rotatable member to cause the valve means to connect the fluid motor to the source for disengaging the clutch prior to establishment of the gear ratio and for further actuating the switch upon coninued rotation of said member to cause the valve means to disconnect the motor from the source to accommodate clutch re-engagement after the gear ratio is established.

10. In a vehicular drive system including a torque-producing prime mover and a torque-transmitting friction clutch comprising co-rotational members for transmitting torque and adapted to be separated to interrupt transferal of torque to a change-speed gearing having two different gear ratios; the improvements which comprise power means operatively connected to separate said clutch members and accommodate their co-rotational torque-transmitting relation, an operator-operated member operably connected to the gearing to establish one of the gear ratios by operator effort, means controlled by the operator-operated member for causing the power means to separate the clutch members prior to the establishment of the gear ratio and for accommodating their co-rotational relation after the gear ratio is established, means for neutralizing the said gear ratio and establishing the other gear ratio without operating the operator-operated member, and control means for causing the power means to separate the clutch members prior to the neutralizing of the said first gear ratio and accommodating their co-rotational torque-transmitting relation after the gear ratio is established.

11. In a vehicular drive system including a torque-producing prime mover and a torque-transmitting friction clutch comprising co-rotational members for transmitting torque and adapted to be separated to interrupt transferal of torque to a change-speed gearing having two different gear ratios; the improvements which comprise power means operatively connected to separate said clutch members and accommodate their co-rotational torque-transmitting relation, an operator-operated rotatable member, means operably connecting said member to the gearing to partially establish or neutralize a gear ratio by a rotation thereof in opposite directions, said connecting means including relative movable parts and a yieldable means interposed therebetween for accommodating limited initial relative rotation of the member prior to a gear ratio establishing or neutralizing movement of said connecting means, control means for the power means, means for operating the control means including a control element carried by the rotatable member for rotation therewith to cause the clutch members to be separated during the initial relative rotation of the rotatable member, and means for operating the control means to cause the clutch members to transmit torque in co-rotational relation after the gear ratio is established or after it is neutralized, said yieldable means being capable of restoring the initial relative movement of the parts and completing the establishing of said gear ratio or neutralizing said gear ratio if established.

12. In a vehicular drive system including a torque-producing prime mover and a torque-transmitting friction clutch for transferring engine torque to a change-speed gearing having two different gear ratios; the improvements which comprise power means for disengaging the clutch, an operator-operated member operably connected to the gearing to establish one of the gear ratios by operator effort, means controlled by the operator-operated member for causing the power means to disengage the clutch prior to the establishment of the gear ratio and accommodating its re-engagement after the gear ratio is established, power-operated means for neutralizing the said gear ratio and establishing the other gear ratio, and control means for the last-named power means including a second operator-operated member.

13. In a vehicular drive system including a torque-producing prime mover and a torque-transmitting friction clutch for transferring engine torque to a change-speed gearing having two different gear ratios; the improvements which comprise power means for disengaging the clutch and accommodating its re-engagement, an operator-operated member operably connected to the gearing to establish one of the gear ratios by operator effort, means controlled by the operator-operated member for causing the power means to disengage the clutch prior to the establishment of the gear ratio and accommodate its re-engagement after the gear ratio is established, a second power-operated means having a movable element for neutralizing said gear ratio and establishing the other gear ratio, control means for the last-named power means and means controlled by movement of the movable element of the last-named power means for causing the clutch power means to be operated to disengage the clutch prior to the neutralizing of said gear ratio and for accommodating re-engagement of the clutch after the other gear ratio is established.

14. In a vehicular drive system including a torque-producing prime mover and a torque-transmitting friction clutch for transferring engine torque to a change-speed gearing having two different gear ratios; the improvements which comprise power means for disengaging the clutch and accommodating its re-engagement, control means for the power means including an electrical circuit and a switch, an operator-operated member operably connected to the gearing to establish one of the gear ratios by operator effort, means for controlling the switch by the operator-operated member to cause the power means to disengage the clutch prior to the establishment of the gear ratio and to accommodate re-engagement of the clutch after the gear ratio is established, power-operated means including a movable element for alternately establishing the two gear ratios after said one gear ratio has been established by operator effort, means comprising a second electrical circuit and a second switch for also controlling the clutch power means, and means for controlling said second switch by the movable element of the second power means to cause the clutch power means to disengage the clutch prior to the neutralizing of an established gear ratio and to accommodate re-engagement after the establishing of the other gear ratio and a second operator-operated member for controlling the second power-operated means.

15. In a vehicular drive system including a torque-producing prime mover and a torque-transmitting friction clutch for transferring engine torque to a change-speed gearing having two different gear ratios; the improvements which comprise a source of fluid pressure different from atmosphere, a fluid pressure actuated motor connected to the source and having a movable element for controlling the engaging and disengaging of the clutch, control valve means for the fluid motor, an operator-operated member, means for establishing one of the gear ratios by movement of said operator-operated member from one position to a second position, means for so operating the control valve means by the operator-operated member that the clutch will be disengaged prior to the establishing of the said gear ratio and re-engaged after the gear ratio is established, a second fluid pressure actuated motor connected to the source having a movable element operably connected to alternately establish the gear ratios after said first gear ratio is established by the operator-operated member, a second operator-operated member, and control means controlled by the second operator-operated member for causing the second fluid motor to be actuated at will to bring about the alternate establishment of the gear ratios and without changing the second position setting of the first operator-operated member, and control means controlled by the movement of the movable element of the second fluid motor for causing the first fluid motor to disengage the clutch prior to the neutralizing of either gear ratio and to accommodate its re-engagement after the establishment of the other gear ratio.

16. In a vehicular drive system including a torque-producing prime mover and a torque-transmitting friction clutch for transferring engine torque to a change-speed gearing having two different gear ratios; the improvements which comprise a source of fluid pressure different from atmosphere, a fluid pressure actuated motor connected to the source and having a movable element for controlling the engaging and disengaging of the clutch, control valve means for the fluid motor, an operator-operated member, means for establishing one of the gear ratios by movement of said operator-operated member from one position to a second position, means for so operating the control valve means by the operator-operated member that the clutch will be disengaged prior to the establishing of the said gear ratio and re-engaged after the gear ratio is established, a second fluid pressure actuated motor connected to the source and having a movable element operably connected to alternately establish the gear ratios after said first gear ratio is established by the operator-operated member, a second operator-operated member, and control means comprising means controlled by a speed-responsive device and means controlled by the second operator-operated member for causing the second fluid motor to be actuated to bring about the alternate establishment of the gear ratios and without changing the second position setting of the first operator-operated member, and control means controlled by the movement of the movable element of the second fluid motor for causing the first fluid motor to disengage the clutch prior to the neutralizing of either gear ratio and to accommodate its re-engagement after the establishment of the other speed ratio.

17. In a vehicular drive system including a torque-producing prime mover and a torque-transmitting friction clutch for transferring engine torque to a change speed gearing having two different gear ratios; the improvements which comprise an operator-operated member; means for establishing one of the gear ratios by a movement of the operator-operated member from a first position to a second position, power means for disengaging and accommodating reengagement of the clutch, control means for the power means operable by the operator-operated member for causing the clutch to be disengaged before the one gear ratio is established and reengaged after the said gear ratio is established, other power means for alternately establishing the gear ratios after the one gear ratio is established by the operator-operated means, control means for the other power means, means controlled by the operation of the second power means to cause the power means for the clutch to disengage the clutch before a gear ratio is neutralized and to accommodate reengagement after a gear ratio is established and without disturbing the second position setting of the operator-operated means, and means for neutralizing the gearing at will by returning the operator-operated member to its first position.

18. In a vehicular drive system including a torque-producing prime mover and a torque-transmitting friction clutch for transferring engine torque to a change-speed gearing having two different gear ratios; the improvements which comprise power-operated means for disengaging the clutch and accommodating its re-engagement, an operator-operated member, means for establishing a gear ratio by manual effort when the member is moved from one position and set in a second position, control means operable by the member for causing the power-operated means to disengage the clutch prior to the gear ratio being established and accommodate re-engagement after the gear ratio is established, means for alternately establishing the two gear ratios after the said one speed ratio is established, and means for causing the power-operated means to disengage the clutch when the vehicle is brought substantially to a stop and without moving the operator-operated member from its second position setting.

19. In a vehicular drive system including a torque-producing prime mover and a torque-transmitting friction clutch for transferring engine torque to a change-speed gearing having two different gear ratios; the improvements which comprise a member movable to two different positions for establishing two different gear ratios, means for moving said member including a movable actuating element operatively connected to said member through a yieldable connection accommodating limited initial relative movement therebetween and later joint movement to actuate said member toward said two different positions, power means for disengaging the clutch and accommodating its re-engagement, control means for the power means, means for controlling said control means during initial relative movement of said element and movable member to neutralize one gear ratio and establish the other gear ratio so that the clutch will be disengaged prior to the gear ratio being neutralized by movement of said member and then re-engaged after the said other gear ratio is established by continued movement of said member, and means including additional control means for the power means for automatically causing the power means to operate to disengage the clutch when the vehicle is brought substantially to a stop with either gear ratio established.

20. In a vehicular drive system having a torque-producing internal-combustion engine operatively controlled by an associated accelerator mechanism and a clutch for transferring engine torque to a change-speed gearing having a pair of different gear ratios; the improvements which comprise power-operated means operable for disengaging the clutch and accommodating its re-engagement, an operator-operated member, means for establishing a gear ratio by manual effort when the member is moved from one position and set in a second position, control means operable by the member for causing the power-operated means to disengage the clutch prior to the gear ratio being established and to accommodate clutch re-engagement after the gear ratio is established, means controlled by the accelerator mechanism for alternately establishing the two gear ratios after the said one gear ratio is established, and means for causing the power-operated means to disengage the clutch when the vehicle is brought substantially to a stop and without moving the operator-operated member from its second position setting.

21. In a vehicular drive system including a torque-producing prime mover and a torque-transmitting friction clutch for transferring engine torque to a change-speed gearing having two different gear ratios; the improvements which comprise power-operated means operable for disengaging the clutch and accommodating its re-engagement, a second power-operated means operably connected to the gearing for alternately establishing two gear ratios thereof, an operator-operated member, control means for the second power-operated means including selecting means for determining which gear ratio will be established, means for causing the control means to be operated by a predetermined positioning of the operator-operated member, means responsive to the speed of a member driven by the gearing for controlling the selecting means and means controlled by the connection between the second power-operated means and the gearing and operable by the operation of the second power-operated means for causing the first power-operated means to disengage the clutch prior to the neutralizing of a gear ratio and operable by the final operation of the second power-operated means for accommodating its engagement after the other gear ratio is established, and means for automatically causing the first power-operated means to disengage the clutch when the speed of the driven member of the gearing is below a predetermined value and without operation of the second power-operated means.

22. In a vehicular drive system having a torque-producing internal-combustion engine operatively controlled by an associated accelerator mechanism and a clutch for transferring engine torque to a change-speed gearing having a pair of different gear ratios; the improvements which comprise power-operated means operable for disengaging the clutch and accommodating its re-engagement, a second power-operated means operably connected to alternately establish two gear ratios of the gearing, control means for the second power-operated means including selecting means for determining which gear ratio will be established, means for causing the control means to be operated when the accelerator mechanism is released to inoperative condition, a speed-responsive device driven by a driven member of the gearing for controlling the selecting means, means operable by the operation of the second power-operated means for causing the first power-operated means to disengage the clutch prior to the neutralizing of a gear ratio and to accommodate re-engagement of the clutch after the other gear ratio is established, and other means for causing the first power-operated means to automatically disengage the clutch without operation of the second power-operated means, said other means being controlled by the speed-responsive device when the speed of the member driving said device falls below a predetermined value.

23. In a vehicular drive system including a torque-producing prime mover and a torque-transmitting friction clutch for transferring engine torque to a change-speed gearing having two different gear ratios; the improvements which comprise power-operated means operable for disengaging the clutch and accommodating its re-engagement, control means for the power-operated means, means for changing the gear ratios including pre-selective means for determining which gear ratio will be established thereby, means for varying the rate of re-engagement of the clutch, and means for causing said rate varying means to be operative in response to pre-selection of one gear ratio while another gear ratio is active and to be inoperative in response to pre-selection of said another gear ratio while the said one gear ratio is active.

24. In a vehicular drive system including a torque-producing prime mover and a torque-transmitting friction clutch for transferring engine torque to a change-speed gearing having two different gear ratios; the improvements which comprise power-operated means operable for disengaging the clutch and accommodating its re-engagement, control means for the power-operated means including an operator-operated member movable to a predetermined position for causing the power means to disengage the clutch and to another position for causing the power-operated means to be conditioned to accommodate re-engagement of the clutch, means for changing the gear ratios including pre-selective means, means for varying the rate of re-engagement of the clutch, and means for causing said rate varying means to be operative in response to pre-selection of one gear ratio by the pre-selective means prior to being established and to be inoperative in response to pre-selection of another gear ratio by the pre-selective means prior to being established.

25. In a vehicular drive system having a torque-producing internal-combustion engine operatively controlled by an associated accelerator mechanism and a clutch for transferring engine torque to a change-speed gearing having a pair of gear ratios; the improvements which comprise power-operated means operable for disengaging the clutch and accommodating its re-engagement, control means for the power-operated means, means for changing the gear ratios, means for varying the rate of re-engagement of the clutch, means for controlling said rate varying means by the accelerator mechanism, and pre-selective means for causing said rate varying means to be conditioned for operation prior to one gear ratio being established and to be conditioned to be inoperative prior to another gear ratio being established.

26. In a vehicular drive system including a torque-producing prime mover and a torque-transmitting friction clutch for transferring engine torque to a change-speed gearing having two different gear ratios; the improvements which comprise power-operated means operable for disengaging the clutch and accommodating its re-engagement, control means for the power-operating means, an operator-operated member, means for changing the gear ratios of the gearing, means for controlling said speed changing means by the movement of the operator-operated member to a predetermined position, pre-selective means for determining which gear ratio will be established by the operation of the changing means, and means controlled by predetermined conditions of the pre-selective means and the operator-operated member for varying the rate of re-engagement of the clutch when re-engagement is accommodated by the power-operated means.

27. In a vehicular drive system including a torque-producing prime mover and a torque-transmitting friction clutch for transferring engine torque to a change-speed gearing having two different gear ratios; the improvements which comprise a power cylinder for operably disengaging the friction clutch and for accommodating re-engagement thereof, a source of fluid pressure different from atmosphere, conduit means between the source and power cylinder, a control valve, an operator-operated member, means for operating the control valve and causing the power cylinder to disengage the clutch when the operator-operated member is moved to a predetermined position, means associated with the power cylinder and the operator-operated member for controlling the rate of re-engagement of the clutch when the power cylinder is conditioned to accommodate re-engagement and the operator-operated member is moved from the predetermined position, and means operable in response to pre-selection of one gear ratio of the gearing for controlling the disabling of the means for controlling the rate of clutch re-engagement.

28. In a vehicular drive system including a torque-producing prime mover and a torque-transmitting friction clutch for transferring engine torque to a change-speed gearing having two different gear ratios; the improvements which comprise power-operated means operable for disengaging the clutch and accommodating its re-engagement, control means for the power-operated means, an operator-operated member, a second power-operated means operably connected to establish different gear ratios when operated, pre-selective means for the different ratios, means for controlling the second power-operated means by the operator-operated member, means for varying the rate of re-engagement of the clutch by the operator-operated member and means for causing said rate varying means to be operative when a predetermined gear ratio of the gearing has been pre-selected to be established and inoperative when another predetermined gear ratio of the gearing is pre-selected to be established.

29. In a vehicular drive system including a torque-producing prime mover and a torque-transmitting friction clutch for transferring engine torque to a change-speed gearing having two different gear ratios; the improvements which comprise power-operated means operable for disengaging the clutch and accommodating its re-engagement, a control means for the power means, a second power-operated means operably connected to the gearing to alternately establish the gear ratios, means operable by the operation of the second power means to cause the control means to control the first-named power means to disengage the clutch prior to the neutralizing of one gear ratio and to accommodate re-engagement of the clutch after the other gear ratio is established, control means for the second power means, operator-operated means for controlling the last-named control means, means for varying the rate of reengagement of the clutch, and means for controlling said last-named means by the operator-operated means.

30. In a vehicular drive system, including a torque-producing prime mover and a torque-transmitting friction clutch for transferring engine torque to a change-speed gearing having two different gear ratios; the improvements which comprise a source of fluid pressure different from atmosphere, a fluid pressure actuated motor operably connected to disengage the clutch and accommodate its re-engagement, control means for the fluid motor, power means operably connected to alternately establish the two gear ratios, control means for the power means, an operator-operated member for the control means for causing the control means to be operated at will, means controlled by the operation of the power means to cause the control means for the fluid motor to be so controlled that the clutch will be disengaged prior to the neutralizing of a gear ratio and re-engaged after the other gear ratio is established, and means controlled by the operator-operated member for varying the rate of re-engagement of the clutch only after the lowest of the two gear ratios has been established.

31. In a vehicular drive system having a torque-producing internal-combustion engine operatively controlled by an associated accelerator mechanism and a clutch for transferring engine torque to a change-speed gearing having a pair of different gear ratios; the improvements which comprise power-operated means operable for disengaging the clutch and accommodating its re-engagement, control means for the power-operated means, means for changing the gear ratios including selecting means, means for controlling said changing means by the accelerator mechanism, means for varying the rate of re-engagement of the clutch when the power means accommodates re-engagement, means for controlling said rate varying means by the accelerator mechanism, and means for disabling the rate varying means when a predetermined gear ratio is selected to be established.

32. In a vehicular drive system having a torque-producing internal-combustion engine operatively controlled by an associated pedal-operated accelerator mechanism and a clutch for transferring engine torque to a change-speed gearing having a pair of different geat ratios; the improvements which comprise power-operated means for operatively disengaging the clutch and accommodating its re-engagement, control means for the power-operated means, means for changing the gear ratios when the accelerator pedal is moved to released position, selecting means for the ratios, means for preventing re-engagement of the clutch when the accelerator pedal is in released position and a predetermined gear ratio is established, means for disabling said preventing means when another gear ratio is selected to be established, and means controlled by depression of the accelerator pedal for accommodating clutch re-engagement, the rate of re-engagement being varied in accordance with the extent of pedal depression.

33. In a vehicular drive system having a torque-producing internal-combustion engine operatively controlled by an associated pedal-operated accelerator mechanism and a clutch for transferring engine torque to a change-speed gearing having a pair of different gear ratios; the improvements which comprise power-operated means for operatively disengaging the clutch and accommodating its re-engagement, control means for the power-operated means, means for changing the gear ratios of the gearing from an established ratio by fully depressing the accelerator mechanism, means for causing the power means to have an additional operation and to disengage the clutch by initial operation of the power means during said shifting and to accommodate clutch re-engagement after said shifting, and means controlled by the release of the accelerator pedal from its fully depressed position for varying the rate of re-engagement of the clutch.

34. In a vehicular drive system having a torque-producing internal-combustion engine operatively controlled by an associated accelerator mechanism and a clutch for transferring engine torque to a change-speed gearing having a pair of different gear ratios; the improvements which comprise a fluid pressure actuated motor having a movable element for operatively disengaging the clutch and accommodating its re-engagement, a source of fluid pressure different from atmosphere, means comprising valve means for connecting the fluid motor with the source, means for causing said valve means to be so controlled by the accelerator mechanism when in released position that the fluid motor will actuate to disengage the clutch, a fluid checking chamber associated with the movable element of the fluid motor, means comprising a valve for controlling the rate of flow of fluid from the fluid checking chamber, means for operating the valve to increase its extent of opening when the accelerator mechanism is operated from the released position, means for changing the gear ratios when the accelerator mechanism is placed in released position, selecting means, and means operable by a predetermined condition of the selecting means for preventing said last-named valve from controlling the rate of flow of fluid from the chamber.

35. In a vehicular drive system having a torque-producing internal-combustion engine operatively controlled by an associated accelerator mechanism and a clutch for transferring engine torque to a change-speed gearing having a pair of different gear ratios; the improvements which comprise a power cylinder for operably disengaging the clutch and accommodating its re-engagement, a source of fluid pressure different from atmosphere, means comprising valve means for connecting the power cylinder with the source, means for causing said valve means to be so controlled by the accelerator mechanism when in released position that the power cylinder will operatively disengage the clutch, a fluid checking chamber associated with the movable element of the power cylinder and separate from the chamber connected to the source, means comprising a valve for controlling the rate of flow of fluid from the chamber, means for changing the gear ratio of the gearing from an established ratio to the other ratio by a conditioning of the accelerator mechanism to fully depressed position, and means for operating the rate of flow valve to increase its extent of opening when the acceleration mechanism is released from its fully depressed position.

36. In a vehicular drive system having a torque-producing internal-combustion engine operatively controlled by an associated accelerator mechanism and a clutch for transferring engine torque to a change speed gearing having a pair of different gear ratios; the improvements which comprise a power cylinder for disengaging the clutch and accommodating its reengagement, a source of fluid pressure different from atmosphere, means comprising valve means for connecting the power cylinder with the source, means for causing said valve means to be controlled by the accelerator mechanism when in released position so that the power cylinder will disengage the clutch, means for controlling the rate of engagement of the clutch and comprising a fluid checking chamber and a valve for controlling the rate of flow of fluid from the chamber, means for varying the rate of flow through the control valve when the accelerator mechanism is operated from a released position, means for changing the gear ratios including selecting means for determining which gear ratio will be established, and means controlled by the condition of the selecting means for causing the rate of flow from the control valve to be ineffective in controlling the rate of reengagement of the clutch.

37. In a vehicular drive system having a torque-producing internal-combustion engine operatively controlled by an associated accelerator mechanism and a clutch for transferring engine torque to a change-speed gearing having a pair of different gear ratios; the improvements which comprise a source of fluid pressure different from atmosphere, a fluid pressure actuated motor operably connected to disengage the clutch and accommodate its re-engagement, control means for the fluid motor, power means operably connected to alternately establish the two gear ratios, control means for the power means, means comprising means operated by the accelerator for causing the control means to be operated at will, means controlled by the operation of the power means to cause the control means for the fluid motor to be so controlled that the clutch will be disengaged prior to the neutralizing of a gear ratio and re-engaged after the other gear ratio is established, and means for varying the rate of re-engagement of the clutch only after the lower of the two gear ratios has been established.

38. In a vehicular drive system having a torque-producing internal-combustion engine operatively controlled by an associated accelerator mechanism and a clutch for transferring engine torque to a change-speed gearing having a pair of different gear ratios; the improvements which comprise power-operated means operable for disengaging the clutch and accommodating its re-engagement, control means for the power means, means for varying the rate of re-engagement of the clutch, a second power-operated means operably connected to alternately establish the two gear ratios, control means for said second power-operated means including means for selecting the gear ratio to be established and means operable by the accelerator mechanism to cause the said second power-operated means to establish the selected gear ratio, means responsive to the speed of a driven member of the gearing to control the selecting means, and means for causing said clutch re-engaging varying means to be effective only when the speed-responsive means so controls the selecting means that the first gear ratio of said different gear ratios will be established.

39. In a vehicular drive system including a torque-producing prime mover and a torque-transmitting friction clutch for transferring engine torque to a change-speed gearing having two different gear ratios; the improvements which comprise power-operated means for operatively disengaging the clutch and accommodating its re-engagement, control means for the power-operated means, means for changing the gear ratios including speed-responsive means and means controlled thereby for pre-selecting a gear ratio, means for varying the rate of speed of re-engaging of the clutch, and means effective for rendering said rate controlling means controllable in response to the speed-responsive means operating at or below a predetermined speed value.

40. In a vehicular drive system including a torque-producing prime mover and a torque-transmitting friction clutch for transferring engine torque to a change-speed gearing having two different gear ratios; the improvements which comprise power-operated means for operatively disengaging the clutch and accommodating its re-engagement, control means for the power-operated means, means for changing the gear ratios including speed-responsively controlled gear ratio selecting means, means for varying the rate of speed of re-engaging of the clutch, means controlled by said speed-responsive selecting means for rendering the varying means effective upon selection of a predetermined gear ratio thereby, actuatable means for controlling the effectiveness of the varying means, and means for actuating the actuatable means.

41. In a vehicular drive system having a torque-producing internal-combustion engine operatively controlled by an associated accelerator mechanism and a clutch for transferring engine torque to a change-speed gearing having a pair of different gear ratios; the improvements which comprise power-operated means operatively disengaging the clutch and accommodating its re-engagement, control means for the power-operated means, means for changing the gear ratios including selecting means for determining the gear ratio to be established, means for controlling said changing means by the accelerator mechanism in accordance with the condition of the selecting means, means for varying the rate of re-engagement of the clutch when the power means accommodates re-engagement, means for controlling said rate varying means by the accelerator mechanism, and means for disabling the rate varying means when a predetermined gear ratio has been selected to be established.

42. In a vehicular drive system having a torque-producing internal-combustion engine operatively controlled by an associated accelerator mechanism and a clutch for transferring engine torque to a change-speed gearing having a pair of different gear ratios; the improvements which comprise power-operated means for operatively disengaging the clutch and accommodating its re-engagement, control means for the power-operated means, means for changing the gearing from first gear ratio to the second gear ratio including means controlled by release of the accelerator mechanism, means for causing the power-operated means to disengage the clutch and accommodate its re-engagement in coordination with the gear ratio changing, means controlled by the accelerator mechanism during its movement into its operating range for varying the rate of re-engagement of the clutch after said first gear ratio is established as a result of release of the accelerator mechanism, and means for causing the clutch to be disengaged and the gear ratio to be changed from the second gear ratio, if established, to the said first gear ratio by operating the accelerator mechanism to an extreme position.

43. In a vehicular drive system having a torque-producing internal-combustion engine operatively controlled by an associated pedal-operated accelerator mechanism and a clutch for transferring engine torque to a change-speed gearing having a pair of different gear ratios; the improvements which comprise a power cylinder for operatively disengaging the clutch and accommodating its re-engagement, a source of fluid-pressure different from atmosphere, means comprising valve means for connecting the power cylinder with the source, means for causing said valve to be so controlled by the accelerator mechanism that upon actuation of the accelerator pedal to an extreme position the power cylinder will disengage the clutch and then subsequently accommodate its re-engagement as the accelerator mechanism is moved from the extreme position, means for changing the gear ratio of the gearing in coordination with the engaging and disengaging of the clutch and including means controlled by the accelerator mechanism when in released position and for also changing the gear ratio from second gear ratio, if established, to first gear ratio when the accelerator mechanism is in a position beyond its normal operating range, a fluid checking chamber associated with the movable element of the power cylinder, and means for controlling the communication of the checking chamber with the atmosphere comprising a slidable valve rod movable with the accelerator pedal and provided with separated recesses, means for connecting one recess of the checking chamber when the accelerator pedal is in one extreme position and the other when the accelerator pedal is in another extreme position, means providing an increasing area opening to the atmosphere from the one recess when the accelerator pedal is depressed from said one extreme position, and means for providing an increasing area opening to the atmosphere from the other recess when the accelerator pedal is returned to its normal operating range from said another extreme position.

44. In a vehicular drive system including a torque-producing prime mover and a torque-transmitting friction clutch for transferring engine torque to a change-speed gearing having a member movable to two alternate operative positions to establish two different gear ratios; the improvements which comprise motor-power means operable for alternately moving said member to its two positions, control means for the motor power means, means including yieldable means accommodating relative movement of the movable element of the power means with respect to the movable member by a stressing of the yieldable means prior to a movement causing either gear ratio to be neutralized, and means controlled by said relative movement of the movable element of the power means for causing disengagement of said clutch, said yieldable means upon the disengagement of said clutch and relief of torque load on said gearing reestablishing the relative movement.

45. In a vehicular drive system including an internal-combustion engine, a clutch and change-speed gearing including torque-transmitting elements shiftable to and from interengaged relation, which elements resist engagement while rotating asynchronously and resist disengagement while torque is being transmitted therethrough; the improvements which comprise motor-power-shifting means having a movable element operable for effecting shifting movement of one of said elements to and from interengaged relation with another, yieldable limited relative motion force transmitting connecting means interposed between the movable element of said power-shifting means and the element shiftable thereby, means for relieving the torque applied to said shiftable element to facilitate shifting thereof, and means responsive to said relative movement of the shifting means provided by said relative motion connecting means for actuating the torque-relieving means to unload said torque-transmitting elements.

46. In a vehicular drive system including an internal-combustion engine, a clutch and change-speed gearing including torque-transmitting elements shiftable to and from interengaged relation, which elements resist engagement while rotating asynchronously and resist disengagement while torque is being transmitted therethrough; the improvements which comprise power-operative means for the clutch motor-power-shifting means having a movable element operable for moving one of said elements to and from interengaged relation with another, yieldable relative motion force transmitting connecting means interposed between the movable element of said power-shifting means and the shiftable element movable thereby and accommodating limited relative movement of the shifting means with respect to said element, and means responsive to such relative movement for actuating said power-operative means for the clutch.

47. In a vehicular drive system including an internal-combustion engine, a clutch and change-speed gearing including torque-transmitting elements shiftable to and from interengaged relation, which elements resist engagement while rotating asynchronously and resist disengagement while torque is being transmitted therethrough; the improvements which comprise motor-power shifting means having a movable element operable for moving one of said elements to and from interengaged relation with another, yieldable force-transmitting means interposed between the movable element of said power-shifting means and the shiftable element movable thereby and providing limited relative movement of the shifting means with respect to said element, and means for actuating said clutch to relieve the torque applied to said shiftable element to facilitate shifting thereof, said last-mentioned means being responsive to said relative movement.

48. In a vehicular drive system including an internal-combustion engine, a clutch and change-speed gearing including torque transmitting elements shiftable to and from interengaged relation, which elements resist engagement while rotating asynchronously and resist disengagement while torque is being transmitted therethrough; the improvements which comprise power-operating means for the clutch, motor-power shifting means having a movable element operable for shifting one of said elements to and from interengaged relation with another, yieldable force-transmitting means interposed between the movable element of said power-shifting means and the element shiftable thereby and accommodating limited relative movement of the power shifting means with respect to said element without disrupting power-shifting force thereagainst, and means responsive to such relative movement for actuating said power-shifting means to release the clutch substantially at completion of such limited relative movement, whereby said element is relieved of torque, or freed to synchronize, and thereby rendered movable upon release of the clutch, and whereby said element is concurrently rendered directly shiftable by further movement of the power-shifting means after completion of the limited relative movement thereof.

49. In a vehicular drive system including an internal-combustion engine, a clutch and change-speed gearing including at least two torque-transmitting elements shiftable to and from interengaged relation, which elements resist engagement while rotating asynchronously and resist disengagement while torque is being transmitted therethrough; the improvements which comprise power-shifting means including a member mechanically connected to one of said elements and movable relatively with respect thereto while applying a shifting-force thereagainst to induce shifting movement of said element toward interengaged and disengaged relation with another, manual-shifting means including a member mechanically connected to the other of said elements and movable relatively with respect thereto while applying a shifting-force thereagainst to induce shifting movement of said last-named element toward interengaged and disengaged relation with another, and means selectively responsive to the aforementioned movements of the power-shifting means and the manual-shifting means for causing power-actuation of said clutch to interrupt the delivery of torque to said shiftable elements to thus release the same for synchronization and/or shifting movement.

50. Means as set forth in claim 49 in which one of said elements is movable by the power-shifting means and is effective to change the driving ratio and another of said elements is shiftable by the manual-shifting means and is effective to change the direction of drive.

51. Means as set forth in claim 49 in which one of said elements is movable by the power-shifting means to provide either of two drives of differing ratios in accordance with the position it occupies, and another of said elements is shiftable by the manual-shifting means to either a driving or a neutral position.

52. Means as set forth in claim 49 in which one of said elements is movable by the power-shifting means to provide either of two positive two-way drives of differing ratios in accordance with the position it occupies, and another of said elements is shiftable by the manual-shifting means to change the direction of drive.

53. In a vehicular drive system including an internal-combustion engine, a clutch and change-speed gearing including torque-transmitting elements shiftable to and from interengaged relation, which elements resist engagement while torque is being transmitted therethrough; the improvements which comprise power-shifting means for inducing shifting movement of one of said elements to and from interengaged relation with another, personally-operable means for inducing shifting movement of another of said elements to and from interengaged relation with another, means for interrupting the delivery of torque to said elements to free the same for synchronization and/or movement and including power-operating means for said clutch, and means responsive to either the power-shifting means or the personally-operable means while inducing a shifting movement for causing the power-operating means to actuate said clutch.

54. In a vehicular drive system including an internal-combustion engine, a clutch and change-speed gearing including torque-transmitting elements shiftable to and from interengaged relation, which elements resist engagement while rotating asynchronously and resist disengagement while torque is being transmitted therethrough; the improvements which comprise power-shifting means for inducing shifting movement of one of said elements to and from interengaged relation with another, personally-operable means for inducing shifting movement of another of said elements to and from interengaged relation with the one of said elements, means for interrupting the delivery of torque to said elements to free the same for synchronization and/or movement and including power-operating means for said clutch, and means responsive selectively to actuation of the power-shifting means and the operable means while inducing a shifting movement for causing the power-operating means to actuate said clutch to released position and then to engaged position.

55. In a vehicular drive system including an internal-combustion engine, a clutch and change-speed gearing including torque-transmitting elements shiftable to and from interengaged relation, which elements resist engagement while rotating asynchronously and resist disengagement while torque is being transmitted therethrough; the improvements which comprise power-shifting means for inducing shifting movement of one of said elements to and from interengaged relation with another, personally-operable means for inducing shifting movement of another of said elements to and from interengaged relation with another, means for interrupting the delivery of torque to said elements to free the same for synchronization and/or movement and including power-operating means for said clutch, means selectively responsive to actuation of the power-shifting means and the personally-operable means while inducing a shifting movement for causing the power-operating means to actuate said clutch to disengaged position, and means for preventing re-engagement of the clutch until an element to be shifted has completed its shifting movement.

56. In a drive for a motor vehicle having an engine and a transmission operable to provide a drive between the engine and the vehicle, said mechanism including positively engageable drive-control elements one of which is movable into engaging relationship with the other to effectuate said drive and into disengaging relationship with respect to said other element to neutralize said drive, said elements when relatively engaged being subject to torque-thrust therebetween during said drive so as to resist relative disengagement thereof until said torque-thrust is relieved; the improvements of a control element operable between two predetermined positions of control, means for operating said control element, and means operating automatically in response to operation of said control element from one of its said positions to the other of its said positions during said drive in continuous application of a force to move said drive-control element toward said disengaging relationship to relieve said torque-thrust as aforesaid.

57. In a drive for a motor vehicle having an engine provided with torque-transmitting mechanism and a change-speed transmission adapted to be driven by said engine through said torque-transmitting mechanism and operable upon momentary relief of input torque thereto to provide a change in the speed ratio drive for the vehicle; the improvements of pressure fluid-control means operable to apply a thrust-force to change the speed ratio drive, and means operable in response to the operation of the said pressure fluid-control means without disrupting application of said thrust-force to change the speed ratio drive to interrupt delivery of torque through the torque-transmitting means, thereby relieving the input torque as aforesaid.

58. In a drive for a motor vehicle having an engine and transmission mechanism operable to provide a drive between the engine and the vehicle, said mechanism including positively engageable drive-control elements one of which is movable into engaging relationship with the other to effectuate said drive and into disengaging relationship with respect to said other element to neutralize said drive, said elements when relatively engaged being subject to torque-thrust therebetween during said drive so as to resist relative disengagement thereof until said torque-thrust is relieved; the improvements of a control element operable relatively into two predetermined positions of control with respect to a fixed element, means for operating said control element, means operating automatically in response to operation of said control element from one of its said positions to the other of its said positions during said drive while applying a force to move said drive-control element toward said disengaging relationship, and means responsive to the relief of torque-thrust by operation of said last-mentioned means for establishing a drive condition which becomes effective upon re-engagement of said drive-control elements.

59. In a vehicular drive system including a torque-producing internal-combustion engine, a change-speed gearing having a pair of gear ratios selectively established by a shift-lever when in one of two active positions and both disestablished when said shift-lever is in a neutral position, and a torque-transmitting friction clutch interposed between said engine and said gearing for transferring torque therebetween; the improvements which comprise a force-transmitting spring interposed between said shift-lever and gearing and adapted to yield a predetermined degree upon initial relative movement of said shift-lever with respect to said gearing, energizable power means operable for disengaging and controlling re-engagement of said clutch, means for energizing said power means, and control means for effecting the energization of said power means including means responsive to the aforementioned initial movement of said shift-lever from an established one of said active positions to disengage said clutch, and accommodate re-engagement of said clutch upon positioning said shift-lever in neutral position and restoration of said relative movement by said spring, said last-named means being responsive upon said movement from neutral position to cause disengagement of said clutch and accommodate re-engagement of said clutch upon positioning said shift-lever in its other active position without restoration of said relative movement by said spring.

60. In a vehicular drive system including a torque-producing internal-combustion engine, a change-speed gearing having a pair of gear ratios selectively established by a shift-lever when in one of two active positions and both disestablished when said shift-lever is in a neutral position, and a torque-transmitting friction clutch interposed between said engine and said gearing for transferring torque therebetwen; the improvements which comprise a member movable to different positions to establish certain gear ratios and to a neutral position to disestablish said ratios, said shift-lever and last-mentioned member being operatively connected by spring means confined therebetwen to normally accommodate limited relative movement of said shift-lever with respect to said member in force-transmitting relation, energizable power means operable for interrupting torque transmission through said clutch and for controlling re-establishment of torque transmission therethrough, means for energizing said power means, and control means responsive to said initial movement of said shift-lever for controlling energization of said power means, said last-mentioned means including means for energizing said power means to interrupt torque-transmission each time said shift-lever is moved initially from an established one of its active positions and from its neutral position without restoration of said relative movement, and means causing said power means to control clutch re-engagement each time said shift-lever is placed in one of its active positions and in its neutral position.

61. In a vehicular drive system including a torque-producing internal-combustion engine, a change-speed gearing having a pair of gear ratios adapted to be selectively established by a shift-lever movable to a pair of separated active positions and to be both disestablished when said shift-lever is in an intermediate neutral position, and a torque-transmitting friction clutch interposed between said engine and said gearing to transmit torque therebetween; the improvements which comprise an operative connection including spring means adapted to normally accommodate limited initial relative movement of said shift-lever with respect to said gearing in force-transmitting relation, energizable power means having a movable element operatively connected to said clutch for disengaging said clutch and controlling clutch re-engagement, means for energizing said power means to cause movement of said movable element, and control means for energizing said power means including means responsive to said relative and a continuous movement of said shift-lever from one of said active positions to the other of said active positions to interrupt and re-establish clutch engagement only before and after, respectively, a gear ratio selected during such movement is established, said last named means being responsive to interrupted movement of said shift-lever from said one active position to the other active position with a time delay at said neutral position to accommodate restoration of said relative movement by said spring means to cause establishment of clutch engagement and subsequently cause clutch dis-engagement prior to the establishment of the gear ratio selected by said shift-lever when initially moved toward its other active position corresponding to established position of said selected gear ratio.

62. In a vehicular drive system including a torque-producing internal-combustion engine, a change-speed gearing having a pair of gear ratios selectively established by a shift-lever movable from a first active position at which one of said gear ratios is established through a neutral position at which neither of said gear ratios is established to a second active position where the second of said gear ratios is established, and a torque-transmitting friction clutch interposed between said engine and said gearing to transmit torque therebetween; the improvements which comprise means interconnecting said shift-lever and gearing including spring means to normally accommodate limited relative movement therebetween in force-transmitting relation, means actuable for disengaging said clutch and controlling clutch re-engagement, and control means for actuating said first-mentioned means including means responsive to uninterrupted movement of said shift-lever from said first active position to said second active position to cause actuation of said first-mentioned means to disengage the clutch only upon the initial movement of said shift-lever from said first active position and to re-engage said clutch only after movement of said shift-lever to said second active position without restoring the relative movement, said last-mentioned means also being responsive to intermittent movement of said shift-lever with a time delay at its neutral position to cause an additional clutch re-engagement by said spring means restoring the relative movement and subsequent disengagement prior to establishment of said second gear ratio when said shift-lever is again initially moved relatively from said neutral position to its second active position to "double-clutch" the drive system.

63. In a vehicular drive system including a torque-producing internal-combustion engine, a change-speed gearing having a pair of gear ratios selectively established by a shift-lever movable from a first active position at which one of said gear ratios is established through a neutral position at which neither of said gear ratios is established to a second active position where the second of said gear ratios is established, and a torque-transmitting friction clutch interposed between said engine and said gearing to transmit torque therebetween; the improvements which comprise means interconnecting said shift-lever and gearing including spring means to normally accommodate limited relative movement therebetween in force-transmitting relation, a fluid pressure-actuated motor having a movable element for operably disengaging said clutch and controlling clutch re-engagement, a source of fluid pressure different from that of the atmosphere for energizing said motor, means operatively connecting said movable members to said clutch, and means for controlling energization of said motor and said source including means responsive to uninterrupted movement of said shift-lever from said first active position to said second active position to cause actuation of said first-mentioned means to disengage the clutch only upon the initial movement of said shift-lever from said first active position and to accommodate re-engagement of said clutch only upon movement of said shift-lever to said second active position, said last-mentioned means also being responsive to intermittent movement of said shift-lever with a time delay at its neutral position to cause an additional clutch re-engagement coincidentally with the restoration of the relative movement by said spring means and a subsequent disengagement by relatively moving said shift-lever prior to establishment of said second gear ratio from said neutral position to its second active position to "double-clutch" the drive system.

64. An automotive vehicle according to claim 3, wherein the means for controlling the said servomotor means comprise means responsive to said accelerator, and a speed-responsive governor device drivable from said driven shaft at speeds proportionate thereto.

65. An automotive vehicle according to claim 3, wherein said last-named means includes a single controlling device controlled by said servomotor means.

66. An automotive vehicle according to claim 3, wherein said last-named means includes a single switch device controlled by said servomotor means.

67. An automotive vehicle according to claim 3, wherein said last-named means includes a single valve device controlled by said servomotor means.

68. An automotive vehicle according to claim 3, wherein the first-named rotatable gear is a forward directional drive gear, and the second-named rotatable gear is a reverse directional drive gear.

69. In a vehicular power drive system including a torque producing internal-combustion engine and a coupling means for transferring engine torque to a change-speed drive mechanism having a plurality of different speed drives; means operable for interrupting transferal of torque through said coupling means; means including an operator-operated member for conditioning said speed drives to be selectively establishable; energizable power means actuatable for establishing said speed drives including force-transmitting mechanism adapted to accommodate limited initial relative actuation of said power means with respect to said drive mechanism; means for energizing said power means; control means for causing energization of said power means to actuate said drive mechanism; and means actuated by said power means during initial actuation thereof while applying a force through said force-transmitting mechanism, to establish a selected speed drive of the said drive mechanism, for causing operation of said torque interrupting means to interrupt transferal of torque thereby.

70. A vehicular power drive system according to claim 69 including means effective to restore said relative movement upon completion of the actuation of said power means, and to complete the establishment of the selected speed drive.

71. A vehicular power drive system according to claim 69 including means operable upon completion of the actuation of said power means in establishing a selected speed drive for restoring effective transferal of torque by said torque transmitting means.

72. A vehicular power drive system according to claim 69 wherein the means actuated by said operator-operated member is a slidable unitary gear adapted for establishing at least one of said speed drives, and for disestablishing any established speed drive.

73. In an automotive vehicle powered with a torque producing internal-combustion engine controlled by an accelerator-operated throttle device, said accelerator having an operating range of movement between two extreme positions thereof; and a change-speed transmission drivingly connected with said engine, and having mechanism for selectively activating at least three positive-drive speeds of different ratios between a driving and driven shaft thereof; a transmission control element manually-operable from a common ineffective drive position to a first predetermined position at which a first speed is activatable thereby, and to a second predetermined position at which a second and third speed are activatable; a speed-responsive device drivingly operated from said driven shaft to first and second stage controlling positions, at speed proportionate thereto; means conditioned for operation by said speed-responsive device operating alternately from one controlling position to the other, to control the alternate activating of said second and third speeds by energizable means upon said control element being operated in the manner aforestated to its last-named position; energizing means for said energizable means; means for controlling the operation of said conditioned means to pre-energize said energizable means for applying a force releasable to activate second and third speeds alternately upon interruption of transferal of engine-torque to said transmission, according to change in vehicular speed and co-ordinated operations of said accelerator successively through like movements short of an extreme position thereof; and means effective to interrupt transferal of engine-torque to said transmission in response to the pre-energization of said energizable means whereupon maximum energized force is released to activate second and third speeds in the manner aforestated upon operating said accelerator into an extreme position wherein minimum engine-torque condition is produced.

74. Means as set forth in claim 73 including means operable for disabling the energizable means and rendering the speeds activatable thereby ineffective to transmit engine torque upon said control element being manually-operated into its ineffective drive position.

75. Means as set forth in claim 73 including means operable to pre-energize said energizable means for subsequently effecting a downshift from third speed to second speed upon operating said accelerator through a movement short of producing substantially maximum engine-torque condition at or below a predetermined maximum vehicular speed, and without disturbing the last-named position of said control element wherein second and third speeds are activatable by said energizable means when energized.

76. In an automotive power-drive system including a torque producing prime-mover and a torque-transmitting friction clutch for transferring or interrupting the torque to a change-speed gearing having a shiftable member operatively connected directly to a control element movable therewith for engaging and disengaging at least a pair of gear sets comprising rotatable driving and drivable elements to establish two different forward speed drives and a neutral-drive condition therebetween, said control element resisting movement when under torque-load and when rotating asynchronously in abutting neutral-drive relationship with an element of said gear sets: the improvements comprising controllable power means for operating said clutch; control means for said power means including a source of power; shift-actuating means having a working-stroke substantially proportionate to the full-throw of said shiftable member from one speed drive establishing position to the other, and operatively adapted to effect directly only partial movement of said shiftable member toward a selected speed drive establishing position when actuated; a force-transmitting pre-energized spring connecting means operatively interposed between the shift-actuating means and said shiftable member to accommodate predetermined relative movement therebetween when said control element is under torque-load in speed drive establishing position whereby the spring means is additionally energized for subsequent release to complete the movement of said shiftable member from one speed drive establishing position to the other; a single control device responsive to the relative movement operation of the shift-actuating means with respect to said shiftable member for causing operation of the clutch operating power means by its control means to interrupt transferal or torque to remove the torque-load from said control element to enable the shift-actuating means to effect directly partial movement of said shiftable member toward a selected speed drive establishing position and to release the additionally energized spring means for completing the movement of said shiftable member relatively with respect to the shift-actuating means to thus fully establish the selected speed drive and restore said shiftable member into normal relative movement relationship with the shift-actuating means.

77. In an automotive power-drive system including a torque producing prime-mover and a torque-transmitting friction clutch for transferring or interrupting the torque to a change-speed gearing having a shiftable member operatively connected directly to a control element movable therewith for engaging and disengaging at least a pair of gear sets comprising rotatable driving and drivable elements to establish two different forward speed drives and a neutral-drive position therebetween, said control element resisting movement when under torque-load and when rotating asynchronously in abutting neutral-drive relationship with an element of said gear sets: the improvements comprising controllable power means for operating said clutch; control means for said power means including a source of power; shift-actuating means having a working-stroke substantially proportionate to the full-throw of said shiftable member from one speed drive established position to neutral-drive position thereof, and operatively adapted to effect directly only partial movement of said shiftable member toward the neutral-drive position when actuated; a force-transmitting pre-energized spring connecting means operatively interposed between the shift-actuating means and said shiftable member to accommodate predetermined relative movement therebetween when said control element is under torque-load in speed drive established position whereby the spring means is additionally energized for subsequent release to complete the movement of said shiftable member from one speed drive establishing position to the neutral-drive position thereof, a single control device responsive to the relative movement operation of the shift-actuating means with respect to said shiftable member for causing operation of the clutch operating power means by its control means to interrupt transferal of torque to remove the torque-load from said control element to enable the shift-actuating means to effect directly partial movement of said shiftable member toward neutral-drive position and to release the additionally energized spring means for completing the movement of said shiftable member relatively with respect to the shift-actuating means to thus fully establish the neutral-drive position and restore said shiftable member into normal relative movement relationship with the shift-actuating means.

78. In an automotive power-drive system including a torque producing prime-mover and a torque-transmitting friction clutch for transferring or interrupting the torque to a change-speed gearing having a shiftable member operatively connected directly to a control element movable therewith for engaging and disengaging at least a pair of gear sets comprising rotatable driving and drivable elements to establish two different forward speed drives and a neutral drive position therebetween, said control element resisting movement when under torque-load or when rotating asynchronously in abutting neutral-drive relationship with an element of said gear sets: the improvements comprising controllable power means for operating said clutch; control means for said power means including a source of power; shift-actuating means having a working-stroke substantially proportionate to the full-throw of said shiftable member from one speed drive establishing position to the other, and operatively adapted to effect directly only partial movement of said shiftable member toward a selected speed drive establishing position when actuated; a force-transmitting pre-energized spring connecting means operatively interposed between the shift-actuating means and said shiftable member to accommodate predetermined relative movement therebetween when said control element is rotating asynchronously in abutting neutral-drive whereby the spring relationship with an element of a selected speed drive gear set means is additionally energized for subsequent release to complete the movement of said shiftable member from neutral-drive position thereof to the selected speed drive position; a single control device responsive to the relative movement operation of the shift-actuating means with respect to said shiftable member for causing operation of the clutch operating power means by its control means to interrupt transferal of torque to remove the torque-load from said control element to enable the shift-actuating means to effect directly partial movement of said shiftable member toward a selected speed drive establishing position and to release the additionally energized spring means for completing the movement of said shiftable member relatively with respect to the shift-actuating means upon said control element and gear set element being rotationally synchronized substantially thereby to thus fully establish the selected speed drive and restore said shiftable member into normal relative movement relationship with the shift-actuating means.

79. An automotive power-drive system according to claim 76 including synchronizing means operably associated with at least one element of each of said gear sets to facilitate engagement of the cooperating elements to establish a speed drive, and wherein the force-transmitting pre-energized spring connecting means is effective to accommodate direct application of a shifting-force from the shift-actuating means against the synchronizing means to operate the same to synchronize said cooperating elements during the aforementioned relative movement operation of the shift-actuating means with respect to said shiftable member, but not preventing partial advance completion of the full working-stroke of the shift-actuating means toward the position at which the selected speed drive will be fully established upon full engagement of the aforesaid cooperating elements by release of the additionally energized spring means in the manner aforestated.

80. An automotive power-drive system according to claim 76 including means effective upon completion of the working-stroke of the shift-actuating means for controlling the single control device to cause the control means for the clutch operating power means to controllably restore effective transferal of torque from said prime-mover by said clutch to said gearing.

81. An automotive power-drive system according to claim 80 wherein the shift-actuating means includes a manually-controlled member.

82. An automotive power-driven system according to claim 80 wherein the single control device comprises a switch.

83. An automotive power-drive system according to claim 80 wherein the single control device comprises a valve.

84. An automotive power-drive system according to claim 80 wherein the shift-actuating means includes servo-power means energizable from a source of fluid pressure different from atmosphere, said energization thereof being controlled by a plurality of mechanically-operated valves interposed between the source and the servo-power means.

85. An automotive power-drive system according to claim 80 wherein the shift-actuating means includes servo-power means energizable from a source of fluid pressure different from atmosphere, said energization thereof being controlled by a plurality of electrically-operated valves interposed between the source and the servo-power means.

86. An automotive power-drive system according to claim 84 including vehicle driven speed-responsively controlled valve means operable to cause the control means to operate the clutch operating power means to interrupt transferal of torque to said gearing, at or below a minimum vehicular speed.

87. An automotive power-drive system according to claim 85 including vehicle drive speed-responsively controlled switch means operable to cause the control means to operate the clutch operating power means to interrupt transferal of torque to said gearing, at or below a minimum vehicular speed.

GLENN T. RANDOL.

REFERENCES CITED

The following references are of record in the file of this patent:

UNITED STATES PATENTS

| Number | Name | Date |
|---|---|---|
| 2,033,572 | Follis | Mar. 10, 1936 |
| 2,051,894 | Price et al. | Aug. 25, 1936 |
| 2,058,586 | Heiss et al. | Oct. 27, 1936 |
| 2,062,104 | Prince | Nov. 24, 1936 |
| 2,074,476 | Kolb | Mar. 23, 1937 |
| 2,086,575 | Price et al. | July 13, 1937 |
| 2,086,576 | Price et al. | July 13, 1937 |
| 2,092,580 | Kelley | Sept. 7, 1937 |
| 2,104,061 | Surdy | Jan. 4, 1938 |
| 2,127,752 | Price et al. | Aug. 23, 1938 |
| 2,130,848 | Kliesrath | Sept. 20, 1938 |
| 2,132,721 | Clarke | Oct. 11, 1938 |
| 2,137,953 | Rowley | Nov. 22, 1938 |
| 2,169,216 | Bloxsom | Aug. 15, 1939 |
| 2,173,080 | Randol | Sept. 12, 1939 |
| 2,177,428 | Flesichel | Oct. 24, 1939 |
| 2,180,154 | Lenz | Nov. 14, 1939 |
| 2,195,365 | Getaz | Mar. 26, 1940 |
| 2,222,913 | Pescara | Nov. 26, 1940 |
| 2,234,463 | Brewer | Mar. 11, 1941 |
| 2,261,898 | Barkeij | Nov. 4, 1941 |
| 2,263,047 | Newton | Nov. 18, 1941 |
| 2,263,400 | Schwarz | Nov. 18, 1941 |
| 2,277,914 | Kesling | Mar. 31, 1942 |
| 2,296,290 | Mayrath | Sept. 22, 1942 |
| 2,314,554 | Pennington | Mar. 23, 1943 |
| 2,341,756 | Avila | Feb. 15, 1944 |
| 2,344,399 | Eaton | Mar. 14, 1944 |